United States Patent
Teruyama et al.

(10) Patent No.: US 8,031,208 B2
(45) Date of Patent: Oct. 4, 2011

(54) DRAWING APPARATUS AND METHOD FOR PROCESSING PLURAL PIXELS IN PARALLEL

(75) Inventors: Tatsuo Teruyama, Kawasaki (JP); Jin Satoh, Tokyo (JP)

(73) Assignees: Kabushiki Kaisha Toshiba, Tokyo (JP); Sony Computer Entertainment, Inc., Tokyo (JP)

( * ) Notice: Subject to any disclaimer, the term of this patent is extended or adjusted under 35 U.S.C. 154(b) by 864 days.

(21) Appl. No.: 11/645,317

(22) Filed: Dec. 22, 2006

(65) Prior Publication Data
US 2007/0182750 A1  Aug. 9, 2007

(30) Foreign Application Priority Data

Dec. 26, 2005 (JP) ................ 2005-371735
Dec. 26, 2005 (JP) ................ 2005-371736
Dec. 26, 2005 (JP) ................ 2005-371737

(51) Int. Cl.
G09G 5/00 (2006.01)
(52) U.S. Cl. ........ 345/629; 345/581; 345/501; 345/502; 345/503; 345/504; 345/505; 345/506; 345/418; 345/427; 345/440; 345/441; 345/442; 345/611; 345/633
(58) Field of Classification Search .......... 345/501–506, 345/629, 556–558, 552, 582–588, 611, 633, 345/441, 443, 429, 581
See application file for complete search history.

(56) References Cited

U.S. PATENT DOCUMENTS

| | | | |
|---|---|---|---|
| 6,731,301 B2 | 5/2004 | Sato et al. | |
| 6,940,512 B2 | 9/2005 | Yamaguchi et al. | |
| 7,526,634 B1 * | 4/2009 | Duluk et al. | 712/216 |
| 7,542,043 B1 * | 6/2009 | Lindholm et al. | 345/506 |
| 7,594,095 B1 * | 9/2009 | Nordquist | 712/22 |
| 2002/0190984 A1 * | 12/2002 | Seiler et al. | 345/424 |
| 2005/0248578 A1 * | 11/2005 | Meeker | 345/505 |
| 2006/0053189 A1 * | 3/2006 | Mantor | 708/490 |
| 2006/0236075 A1 * | 10/2006 | Hara | 712/22 |
| 2007/0030280 A1 * | 2/2007 | Paltashev et al. | 345/506 |

FOREIGN PATENT DOCUMENTS

| | | |
|---|---|---|
| JP | 6-149757 | 5/1994 |
| JP | 6-162206 | 6/1994 |
| JP | 2005301902 | 10/2005 |

OTHER PUBLICATIONS

Official Action mailed Feb. 22, 2011 from by Japanese Patent Office for Japanese Patent Application No. JP 2005-371735, 2 pages.
English language translation of Official Action mailed Feb. 22, 2011 from by Japanese Patent Office for Japanese Patent Application No. JP 2005-371735, 2 pages.

* cited by examiner

*Primary Examiner* — Jin-Cheng Wang
(74) *Attorney, Agent, or Firm* — Sprinkle IP Law Group

(57) ABSTRACT

A drawing apparatus includes a reception unit, a first holding unit and a drawing processing unit. The reception unit receives graphic information. The first holding unit holds a plurality of first data which is a part of the graphic information received by the reception unit, in association with identification numbers assigned to the first data. The drawing processing unit draws a graphic on the basis of the first data held in the first holding unit. The drawing processing unit uses the plurality of the first data in a same task to draw the graphic. The reception unit records the identification numbers of the first data and a synchronization flag in order of reception. The synchronization flag is set for the first data received first among the plurality of first data processed by the same task in the drawing processing unit.

21 Claims, 59 Drawing Sheets

|       |       |       |       |       |       |       |
|-------|-------|-------|-------|-------|-------|-------|
| BLK0  | BLK1  | BLK2  | BLK3  | BLK4  | ...... | BLK19 |
| BLK20 | BLK21 | BLK22 | BLK23 | BLK24 | ...... | BLK39 |
| BLK40 | BLK41 | BLK42 | BLK43 | BLK44 | ...... | BLK59 |
| BLK60 | BLK61 | BLK62 | BLK63 | BLK64 | ...... | BLK79 |
| ⋮ | ⋮ | ⋮ | ⋮ | ⋮ | ⋱ | ⋮ |
| BLK580 | BLK581 | BLK582 | BLK583 | BLK584 | ...... | BLK599 |

$(m+1)=20$ (horizontal), $(l+1)=30$ (vertical)

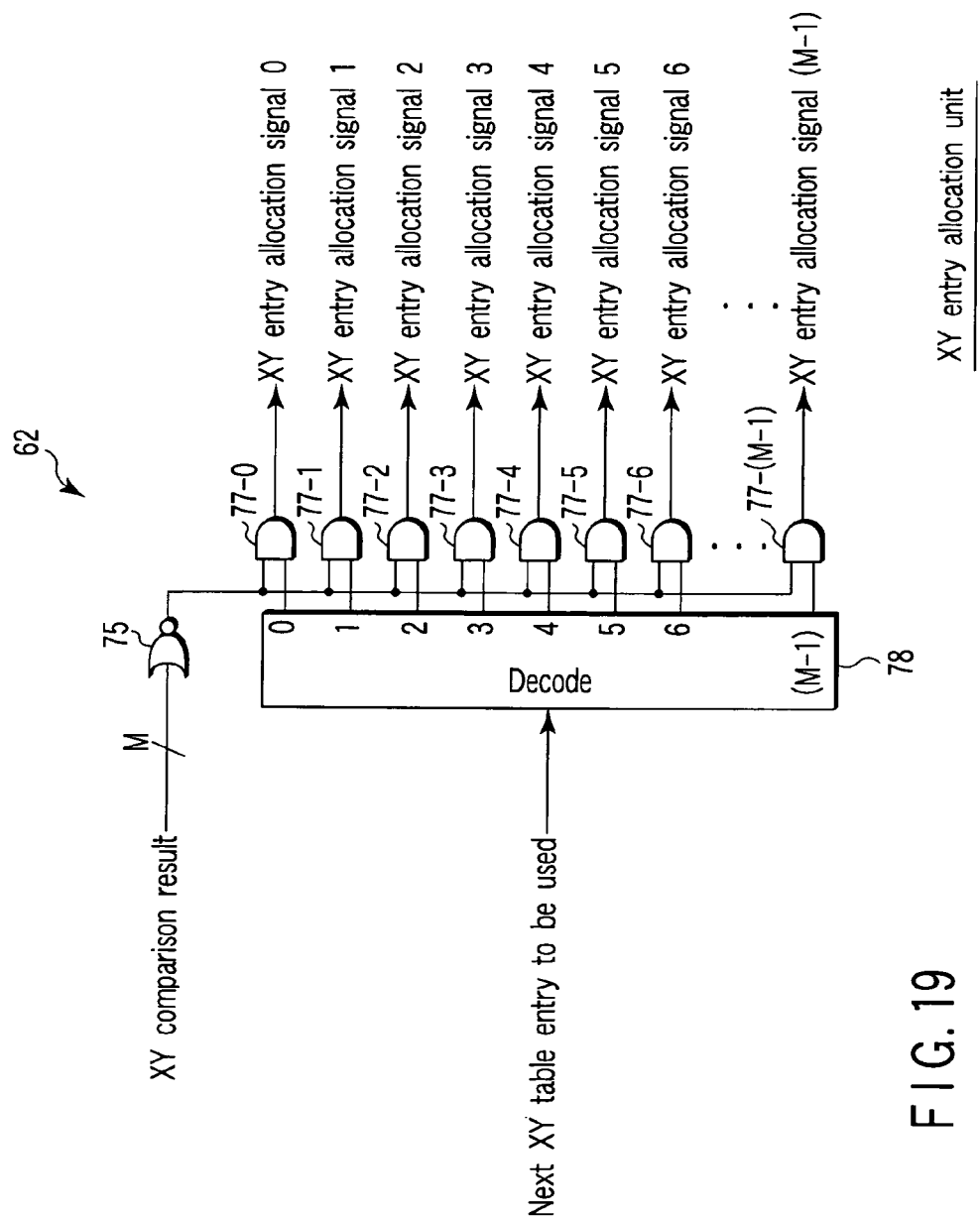
F I G. 19

| | ENV | END | NEWT | RDY | RUN | PLCNT | PL | SPID | TDID | PC | LCK | TLC | XYtag | STN0 | STN1 | QV | STNUM | QNUM |
|---|---|---|---|---|---|---|---|---|---|---|---|---|---|---|---|---|---|---|
| Entry (M-1) | | | | | | | | | | | | | | | | | | |
| ... | ... | ... | ... | ... | ... | ... | ... | ... | ... | ... | ... | ... | ... | ... | ... | ... | ... | ... |
| Entry 5 | | | | | | | | | | | | | | | | | | |
| Entry 4 | | | | | | | | | | | | | | | | | | |
| Entry 3 | | | | | | | | | | | | | | | | | | |
| Entry 2 | | | | | | | | | | | | | | | | | | |
| Entry 1 | | | | | | | | | | | | | | | | | | |
| Entry 0 | | | | | | | | | | | | | | | | | | |

Thread holding unit

F I G. 25

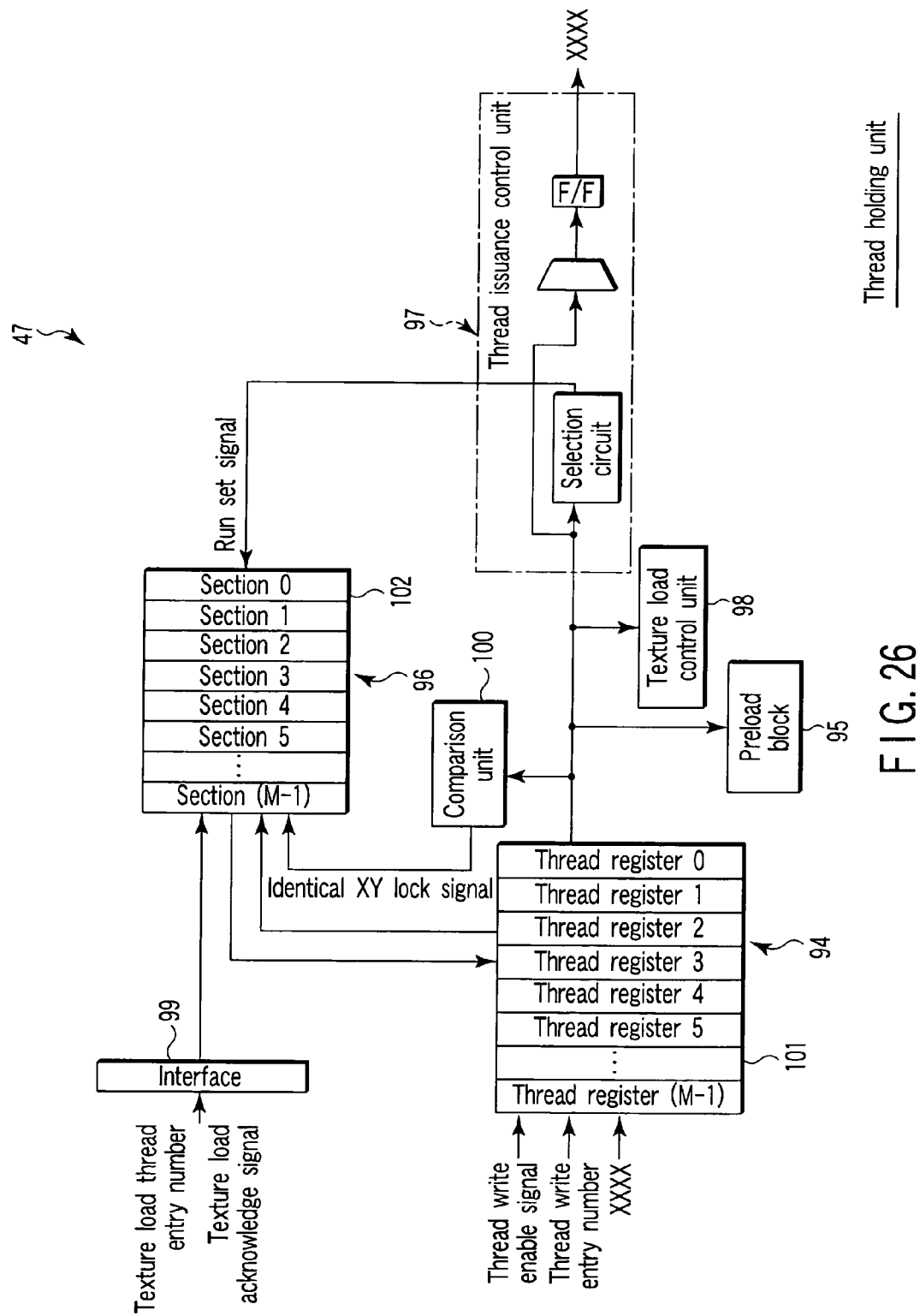
F I G. 26

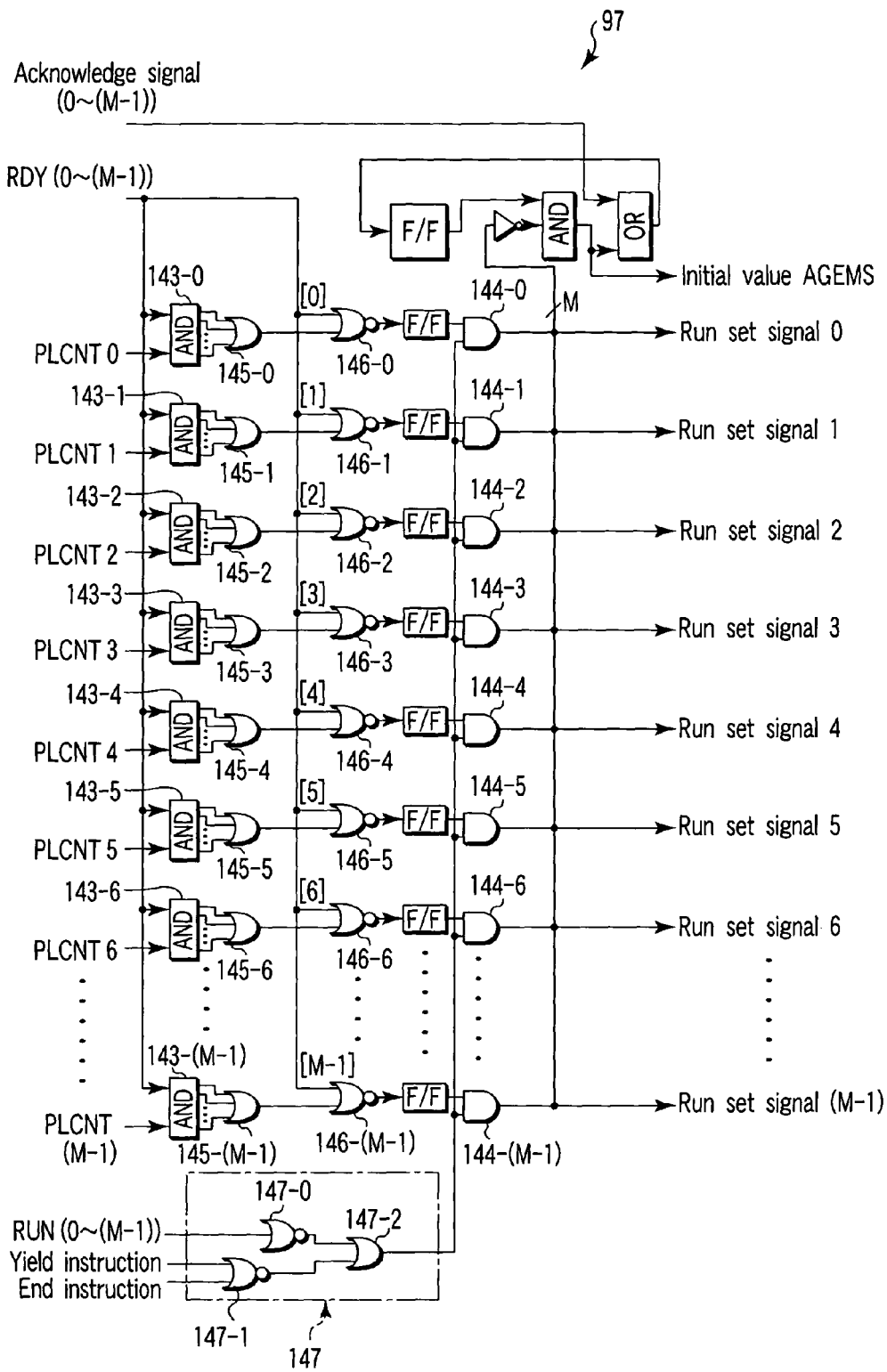
F I G. 40

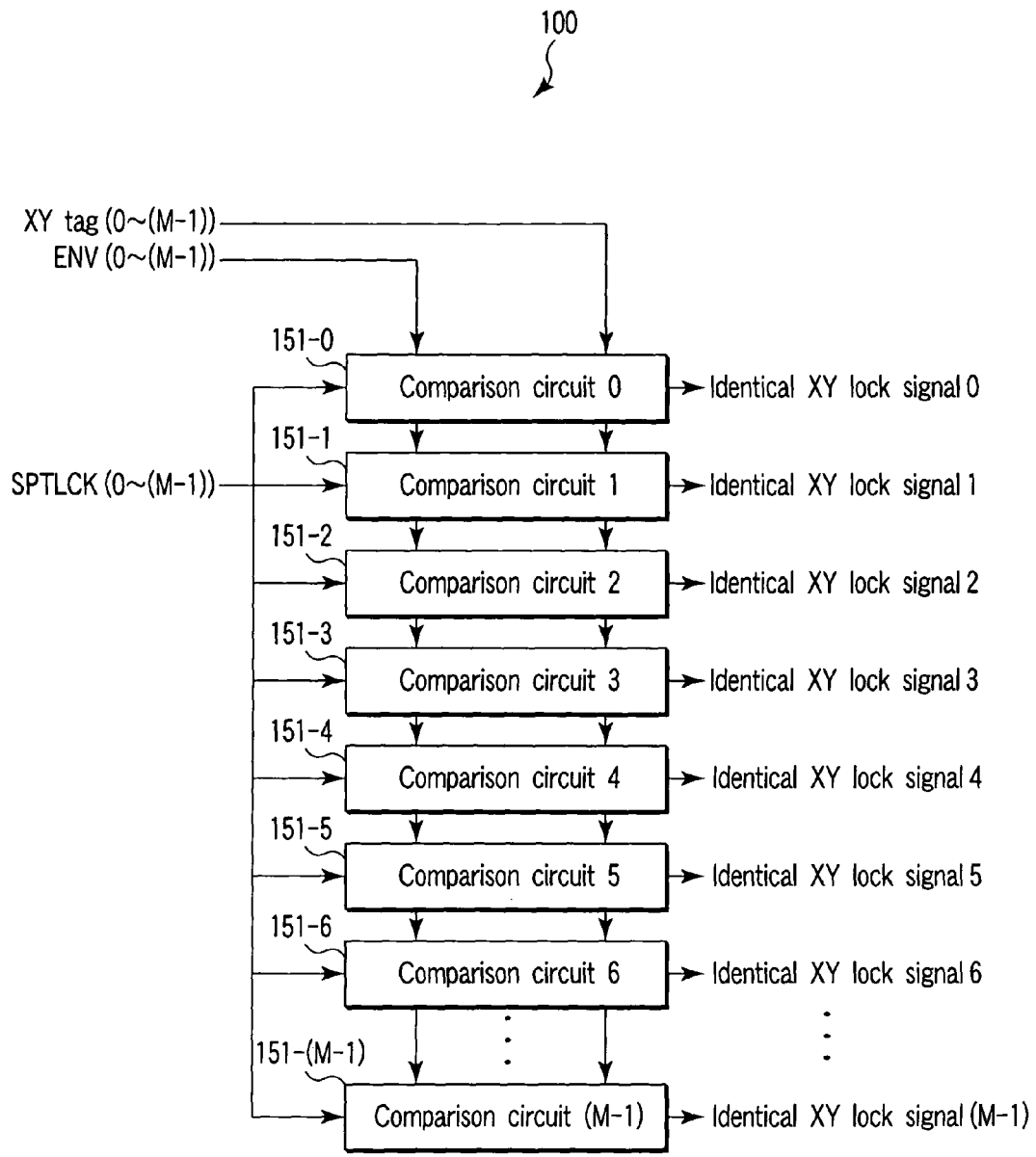
F I G. 44

| | ENV | SPRDY | SPID | TDENTNO | SPTLCK | |
|---|---|---|---|---|---|---|
| Entry (M-1) | 0 | 1 | 0 | 0 | 0 | Newest |
| Entry 6 | 0 | 1 | 0 | 0 | 0 | |
| WRPTR → Entry 5 | 0 | 1 | 0 | 0 | 0 | |
| Entry 4 | 1 | 1 | 0 | 6 | 0 | |
| Entry 3 | 1 | 0 | 1 | 4 | 0 | |
| Entry 2 | 1 | 1 | 1 | 2 | 0 | |
| Entry 1 | 1 | 1 | 2 | 7 | 1 | |
| Entry 0 | 1 | 1 | 3 | 5 | 0 | Oldest |

Ready queue table

F I G. 46

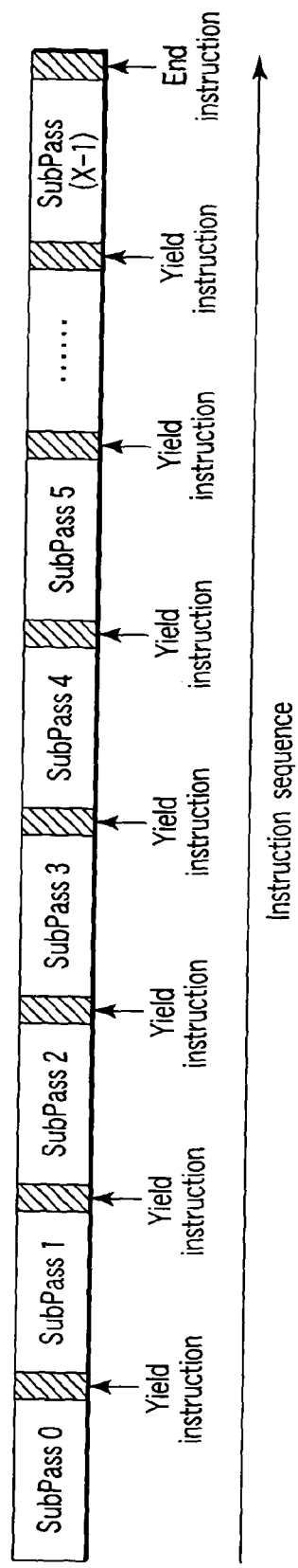
F I G. 47

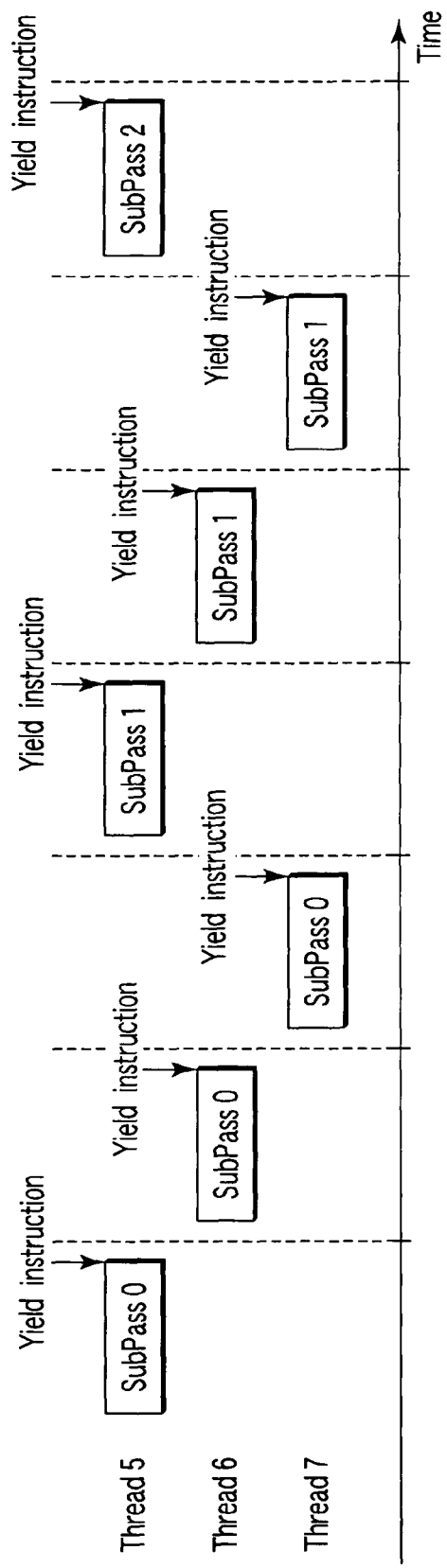
F I G. 48

FIG. 51　Read circuit

| Cycle | First data | XY coordinate | Pixel valid | Third data | Second data [0:31] | Second data [32:63] |
|---|---|---|---|---|---|---|
| 0 | Data 1-0 | X0 | PV0 | Data 3-0 | Data 2-0 | Data 2-1 |
| 1 | Data 1-1 | X1 | PV1 | Data 3-1 | Data 2-2 | Data 2-3 |
| 2 | Data 1-2 | X2 | PV2 | Data 3-2 | Data 2-4 | Data 2-5 |
| 3 | Data 1-3 | X3 | PV3 | Data 3-3 | Data 2-6 | Data 2-7 |
| 4 | Data 1-4 | Y0 | PV4 | Data 3-4 | Data 2-8 | Data 2-9 |
| 5 | Data 1-5 | Y1 | PV5 | Data 3-5 | Data 2-10 | Data 2-11 |
| 6 | Data 1-6 | Y2 | PV6 | Data 3-6 | Data 2-12 | Data 2-13 |
| 7 | Data 1-7 | Y3 | PV7 | Data 3-7 | Data 2-14 | Data 2-15 |

F I G. 53

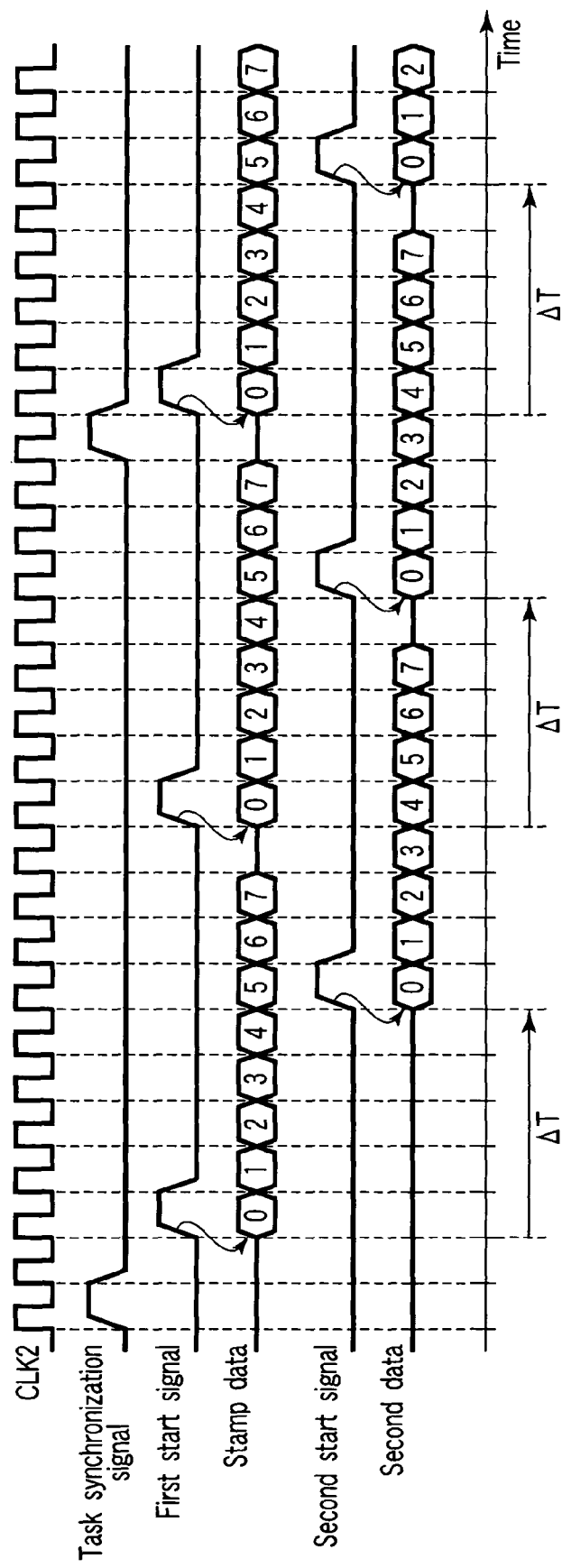
F I G. 54

|  | ENV | DIV | XY | QV | PV |
|---|---|---|---|---|---|
| Entry (M-1) | 0 |  |  |  |  |
| ⋮ | ⋮ | ⋮ | ⋮ | ⋮ | ⋮ |
| Entry 13 | 0 |  |  |  |  |
| Entry 12 | 0 |  |  |  |  |
| Entry 11 | 0 |  |  |  |  |
| Entry 10 | 0 |  |  |  |  |
| Entry 9 | 0 |  |  |  |  |
| Entry 8 | 0 |  |  |  |  |
| Entry 7 | 0 |  |  |  |  |
| Entry 6 | 0 |  |  |  |  |
| Entry 5 | 0 |  |  |  |  |
| STN=4 → Entry 4 | 0 |  |  |  |  |
| Entry 3 | 1 | /// | /// | /// | /// |
| Entry 2 | 1 | /// | /// | /// | /// |
| Entry 1 | 1 | /// | /// | /// | /// |
| Entry 0 | 1 | /// | /// | /// | /// |

FIG. 55 — Stamp holding unit

|  | Pix15 | Pix14 | Pix13 | ...... | Pix4 | Pix3 | Pix2 | Pix1 | Pix0 |
|---|---|---|---|---|---|---|---|---|---|
| Entry (M-1) |  |  |  |  |  |  |  |  |  |
| ⋮ | ⋮ | ⋮ | ⋮ | ⋮ | ⋮ | ⋮ | ⋮ | ⋮ | ⋮ |
| Entry 13 |  |  |  |  |  |  |  |  |  |
| Entry 12 |  |  |  |  |  |  |  |  |  |
| Entry 11 |  |  |  |  |  |  |  |  |  |
| Entry 10 |  |  |  |  |  |  |  |  |  |
| Entry 9 |  |  |  |  |  |  |  |  |  |
| Entry 8 |  |  |  |  |  |  |  |  |  |
| Entry 7 |  |  |  |  |  |  |  |  |  |
| Entry 6 |  |  |  |  |  |  |  |  |  |
| Entry 5 |  |  |  |  |  |  |  |  |  |
| STN=4 → Entry 4 |  |  |  |  |  |  |  |  |  |
| Entry 3 | /// | /// | /// | /// | /// | /// | /// | /// | /// |
| Entry 2 | /// | /// | /// | /// | /// | /// | /// | /// | /// |
| Entry 1 | /// | /// | /// | /// | /// | /// | /// | /// | /// |
| Entry 0 | /// | /// | /// | /// | /// | /// | /// | /// | /// |

FIG. 56 — Second data holding unit

| | ENV | STN | RDY2 | SYNC |
|---|---|---|---|---|
| Entry (N-1) | 0 | ⋮ | ⋮ | ⋮ |
| ⋮ | ⋮ | | | |
| Entry 13 | 0 | | | |
| Entry 12 | 0 | | | |
| Entry 11 | 0 | | | |
| Entry 10 | 0 | | | |
| Entry 9 | 0→1 | 4 | 0→1 | 1 |
| Entry 8 | 1 | | | |
| Entry 7 | 1 | | | |
| Entry 6 | 1 | | | |
| Entry 5 | 1 | | | |
| Entry 4 | 1 | | | |
| Entry 3 | 1 | | | |
| Entry 2 | 1 | | | |
| Entry 1 | 1 | | | |
| Entry 0 | 1 | | | |
Memory 54
F I G. 57
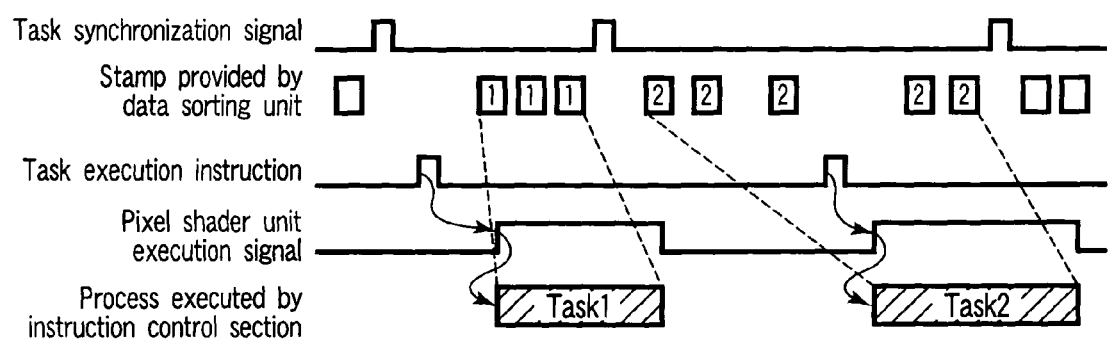
F I G. 58

| | ENV | STN | RDY2 | SYNC | |
|---|---|---|---|---|---|
| Entry (N-1) | 0 | | | | |
| ⋮ | ⋮ | ⋮ | ⋮ | ⋮ | |
| Entry 13 | 0 | | | | |
| Entry 12 | 1 | | | 1 | ← SYNC="1" |
| Entry 11 | 1 | | | 0 | |
| Entry 10 | 1 | | | 0 | |
| Entry 9 | 1 | 0100 | 1 | 1 | ← SYNC="1" |
| Entry 8 | 1 | | | | |
| Entry 7 | 1 | | | | |
| Entry 6 | 1 | | | | |
| Entry 5 | 1 | | | | |
| Entry 4 | 1 | | | | |
| Entry 3 | 1 | | | | |
| Entry 2 | 1 | | | | |
| Entry 1 | 1 | | | | |
| Entry 0 | 1 | | | | |

Memory 54

F I G. 59

| | ENV | XY | STN |
|---|---|---|---|
| Entry (M−1) | 0 | 0 | |
| ⋮ | ⋮ | ⋮ | ⋮ |
| Entry 6 | 1 | F | |
| Entry 5 | 0 | 0 | |
| Entry 4 | 1 | E | |
| Entry 3 | 1 | D | |
| XYtag ← Entry 2 | 0→1 | C | 4 |
| Entry 1 | 1 | B | |
| Entry 0 | 1 | A | |

XY comparison result="all 0"
XY allocation signal="1"
Signal for next XY table entry to be used="1"

XY table

F I G. 62

| | ENV | XY | STN |
|---|---|---|---|
| Entry (M−1) | 0 | 0 | |
| ⋮ | ⋮ | ⋮ | ⋮ |
| Entry 6 | 1 | F | |
| Entry 5 | 0 | 0 | |
| Entry 4 | 1 | E | |
| Entry 3 | 1 | D | |
| Entry 2 | 1 | C | 4→5 |
| Entry 1 | 1 | B | |
| Entry 0 | 1 | A | |

XY comparison result="1" (entry 2)
XY allocation number="1"

XY table

F I G. 63

| Unmerged | | Merged | | | Unmerged | | Merged | | |
|---|---|---|---|---|---|---|---|---|---|
| MGBUF | NEWST | MGBUF | NEWST | Leftover | MGBUF | NEWST | MGBUF | NEWST | Leftover |
| 0--- | ---- | 0--- | ---- | ---- | 01-3 | ---- | 01-3 | ---- | ---- |
| 0--- | 0--- | 0--- | -0-- | ---- | 01-3 | 0--- | 01-3 | --0- | ---- |
| 0--- | -1-- | 0--- | -1-- | ---- | 01-3 | -1-- | 1-03 | -1-- | ---- |
| 0--- | --2- | 0--- | --2- | ---- | 01-3 | --2- | 01-3 | --2- | ---- |
| 0--- | ---3 | 0--- | ---3 | ---- | 01-3 | ---3 | 01-3 | --3- | ---- |
| 0--- | 01-- | 0--- | -10- | ---- | 01-3 | 01-- | 01-3 | --0- | -1-- |
| 0--- | 0-2- | 0--- | -02- | ---- | 01-3 | 0-2- | 01-3 | --2- | 0--- |
| 0--- | 0--3 | 0--- | -0-3 | ---- | 01-3 | 0--3 | 01-3 | --0- | ---3 |
| 0--- | -12- | 0--- | -12- | ---- | 01-3 | -12- | 01-3 | --2- | -1-- |
| 0--- | --23 | 0--- | --23 | ---- | 01-3 | --23 | 01-3 | --2- | ---3 |
| 0--- | -1-3 | 0--- | -1-3 | ---- | 01-3 | -1-3 | 01-3 | --3- | -1-- |
| 0--- | 012- | 0--- | -012 | ---- | 01-3 | 012- | 01-3 | --2- | 01-- |
| 0--- | 01-3 | 0--- | -103 | ---- | 01-3 | 01-3 | 01-3 | --0- | -1-3 |
| 0--- | 0-23 | 0--- | -023 | ---- | 01-3 | 0-23 | 01-3 | --2- | 0--3 |
| 0--- | -123 | 0--- | -123 | ---- | 01-3 | -123 | 01-3 | --2- | -1-3 |
| 0--- | 0123 | 0--- | -123 | 0--- | 01-3 | 0123 | 01-3 | --2- | 01-3 |
| -12- | ---- | -12- | ---- | ---- | 0123 | ---- | 0123 | ---- | ---- |
| -12- | 0--- | -12- | -0-- | ---- | 0123 | 0--- | 0123 | ---- | 0--- |
| -12- | -1-- | -12- | -1-- | ---- | 0123 | -1-- | 0123 | ---- | -1-- |
| -12- | --2- | -12- | --2- | ---- | 0123 | --2- | 0123 | ---- | --2- |
| -12- | ---3 | -12- | ---3 | ---- | 0123 | ---3 | 0123 | ---- | ---3 |
| -12- | 01-- | -12- | 0--1 | ---- | 0123 | 01-- | 0123 | ---- | 01-- |
| -12- | 0-2- | -12- | 0--2 | ---- | 0123 | 0-2- | 0123 | ---- | 0-2- |
| -12- | 0--3 | -12- | 0--3 | ---- | 0123 | 0--3 | 0123 | ---- | 0--3 |
| -12- | -12- | -12- | 1--2 | ---- | 0123 | -12- | 0123 | ---- | -12- |
| -12- | --23 | -12- | 2--3 | ---- | 0123 | --23 | 0123 | ---- | --23 |
| -12- | -1-3 | -12- | 1--3 | ---- | 0123 | -1-3 | 0123 | ---- | -1-3 |
| -12- | 012- | -12- | 0--1 | --2- | 0123 | 012- | 0123 | ---- | 012- |
| -12- | 01-3 | -12- | 0--3 | -1-- | 0123 | 01-3 | 0123 | ---- | 01-3 |
| -12- | 0-23 | -12- | 0--3 | --2- | 0123 | 0-23 | 0123 | ---- | 0-23 |
| -12- | -123 | -12- | 1--3 | --2- | 0123 | -123 | 0123 | ---- | -123 |
| -12- | 0123 | -12- | 0--3 | -12- | 0123 | 0123 | 0123 | ---- | 0123 |

F I G. 64

| | ENV | XYtag | TDID | STN0 | STN1 | QV | STNUM0 | STNUM1 | STNUM2 | STNUM3 | QNUM0 | QNUM1 | QNUM2 | QNUM3 |
|---|---|---|---|---|---|---|---|---|---|---|---|---|---|---|
| Entry (M-1) | 0 | ... | - | - | - | - | - | - | - | - | - | - | - | - |
| ... | | | | | | | | | | | | | | |
| Entry 5 | 0 | ... | - | - | - | - | - | - | - | - | - | - | - | - |
| Entry 4 | 1 | 2 | 7 | 4 | 5 | (1111) | 1 | 0 | 0 | 0 | 00 | 01 | 10 | 11 |
| Entry 3 | 1 | | | | | | | | | | | | | |
| Entry 2 | 1 | | | | | | | | | | | | | |
| Entry 1 | 1 | | | | | | | | | | | | | |
| Entry 0 | 1 | | | | | | | | | | | | | |

Thread holding unit

F I G. 66

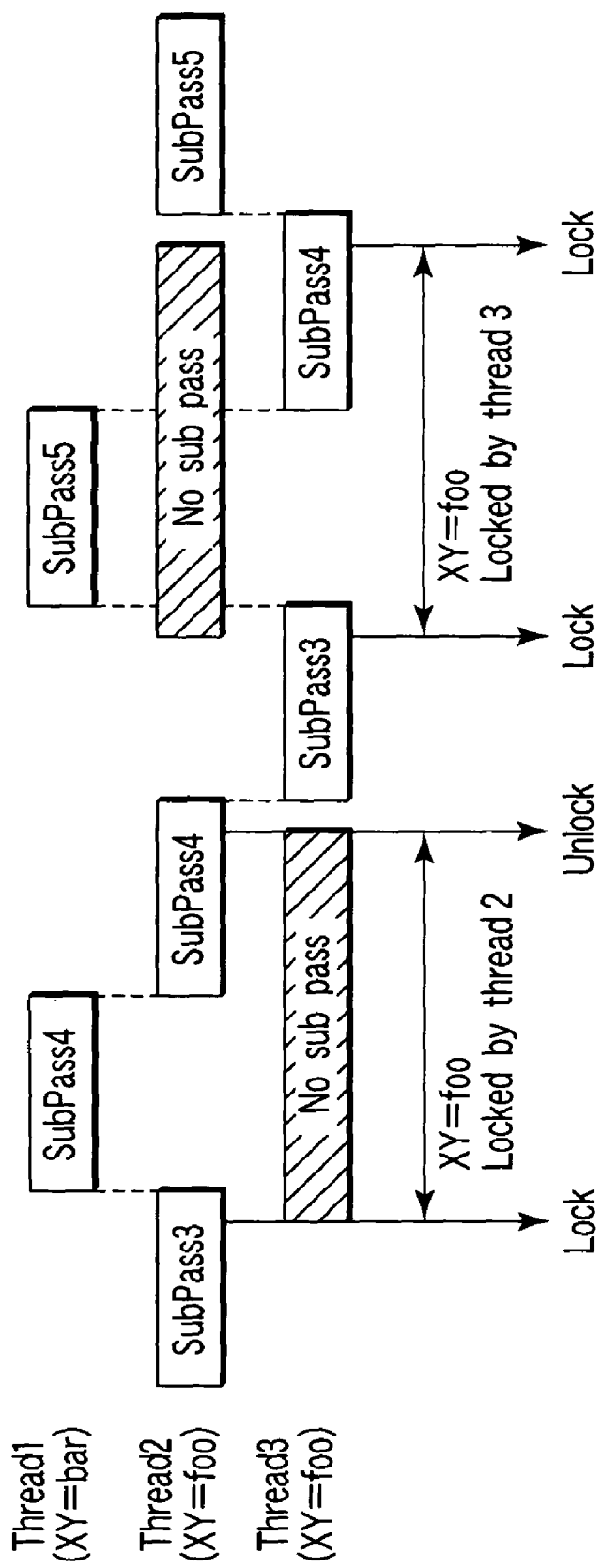
F I G. 67

| | TDID | END | RDY | RUN | PL | SPID | PC | LCK | TLC |
|---|---|---|---|---|---|---|---|---|---|
| Entry 2 | 3 | 0 | 0 | 0 | 00 | 3 | INSTBASE +3 | 0 | Count Down |
| Entry 1 | 2 | 0 | 1 | 0 | 10 | 3 | INSTBASE +3 | 0 | 0 |
| Entry 0 | 1 | 0 | 0 | ? | ? | 4 | INSTBASE +4 | 0 | ? |

Thread holding unit

FIG. 68

| | ENV | SPRDY | SPID | TDENTNO | SPTLCK | |
|---|---|---|---|---|---|---|
| Entry (M−1) | 0 | 1 | 0 | 0 | 0 | Newest |
| ⋮ | ⋮ | ⋮ | ⋮ | ⋮ | ⋮ | |
| Entry 6 | 0 | 1 | 0 | 0 | 0 | |
| Entry 5 | 0 | 1 | 0 | 0 | 0 | |
| Entry 4 | 0 | 1 | 0 | 0 | 0 | |
| WRPTR → Entry 3 | 0 | 1 | 0 | 0 | 0 | |
| Entry 2 | 1 | 0 | 3 | 2 | 0 | |
| Entry 1 | 1 | 1 | 3 | 1 | 0 | |
| Entry 0 | 1 | 1 | 4 | 0 | 0 | Oldest |

Ready queue table

Thread holding unit

| | TDID | END | RDY | RUN | PL | SPID | PC | LCK | TLC |
|---|---|---|---|---|---|---|---|---|---|
| Entry 2 | 3 | 0 | 0 | 0 | 00 | 3 | INSTBASE+3 | 0 | CountDown |
| Entry 1 (Issued) | 2 | 0 | 1→0 | 0→1 | 11 | 3→4 | INSTBASE+3+1 | 0→1 | 0→CountUp |
| Entry 0 | 1 | 0 | 1 | 0 | 01→10 | 4 | INSTBASE+4 | 0 | 0 |

FIG. 72

Thread holding unit

| | TDID | END | RDY | RUN | PL | SPID | PC | LCK | TLC |
|---|---|---|---|---|---|---|---|---|---|
| Entry 2 | 3 | 0 | 0 | 0 | 01 | 3 | INSTBASE+3 | 0 | CountDown |
| Entry 1 | 2 | 0 | 1 | 0 | 00→01→10 | 4 | INSTBASE+4 | 1 | CountDown→0 |
| Entry 0 (Issued) | 1 | 0 | 1→0 | 0→1 | 11 | 4→5 | INSTBASE+4+1 | 0 | 0→CountUp |

|  | ENV | SPRDY | SPID | TDENTNO | SPTLCK |  |
|---|---|---|---|---|---|---|
| Entry (M-1) | 0 | 1 | 0 | 0 | 0 | Newest |
| ⋮ | ⋮ | ⋮ | ⋮ | ⋮ | ⋮ |  |
| Entry 6 | 0 | 1 | 0 | 0 | 0 |  |
| Entry 5 | 0 | 1 | 0 | 0 | 0 |  |
| Entry 4 | 0 | 1 | 0 | 0 | 0 |  |
| WRPTR → Entry 3 | 0 | 1 | 0 | 0 | 0 |  |
| Entry 2 | 1 | 1 | 3 | 2 | 0 |  |
| Entry 1 | 1 | 0 | 4 | 1 | 1 |  |
| Entry 0 | 1 | 1 | 4 | 0 | 0 | Oldest |

Ready queue table

F I G. 71

|  | ENV | SPRDY | SPID | TDENTNO | SPTLCK |  |
|---|---|---|---|---|---|---|
| Entry (M-1) | 0 | 1 | 0 | 0 | 0 | Newest |
| ⋮ | ⋮ | ⋮ | ⋮ | ⋮ | ⋮ |  |
| Entry 6 | 0 | 1 | 0 | 0 | 0 |  |
| Entry 5 | 0 | 1 | 0 | 0 | 0 |  |
| Entry 4 | 0 | 1 | 0 | 0 | 0 |  |
| WRPTR → Entry 3 | 0 | 1 | 0 | 0 | 0 |  |
| Entry 2 | 1 | 1 | 3 | 2 | 0 |  |
| Entry 1 | 1 | 1 | 4 | 1 | 1 |  |
| Entry 0 | 1 | 1 | 5 | 0 | 0 | Oldest |

Ready queue table

Thread holding unit

| | TDID | END | RDY | RUN | PL | SPID | PC | LCK | TLC |
|---|---|---|---|---|---|---|---|---|---|
| Entry 2 | 3 | 0 | 1 | 0 | 10 | 3 | INSTBASE +3 | 0 | 0 |
| Issued ← Entry 1 | 2 | 0 | 1→0 | 0→1 | 11 | 4→5 | INSTBASE +4+1 | 1→0 | 0→ CountUp |
| Entry 0 | 1 | 0 | 0 | 0 | 00 | 5 | INSTBASE +5 | 0 | CountDown |

FIG. 76

Thread holding unit

| | TDID | END | RDY | RUN | PL | SPID | PC | LCK | TLC |
|---|---|---|---|---|---|---|---|---|---|
| Entry 2 | 3 | 0 | 1→0 | 0→1 | 11 | 3→4 | INSTBASE +3+1 | 0→1 | 0→ CountUp |
| Entry 1 | 2 | 0 | 0 | 0 | 00 | 5 | INSTBASE +5 | 0 | CountDown |
| Issued ← Entry 0 | 1 | 0 | 1 | 0 | 01→10 | 5 | INSTBASE +5 | 0 | 0 |

| | ENV | SPRDY | SPID | TDENTNO | SPTLCK | |
|---|---|---|---|---|---|---|
| Entry (M-1) | 0 | 1 | 0 | 0 | 0 | Newest |
| ⋮ | ⋮ | ⋮ | ⋮ | ⋮ | ⋮ | |
| Entry 6 | 0 | 1 | 0 | 0 | 0 | |
| Entry 5 | 0 | 1 | 0 | 0 | 0 | |
| Entry 4 | 0 | 1 | 0 | 0 | 0 | |
| WRPTR → Entry 3 | 0 | 1 | 0 | 0 | 0 | |
| Entry 2 | 1 | 1 | 3 | 2 | 0 | |
| Entry 1 | 1 | 1 | 5 | 1 | 0 | |
| Entry 0 | 1 | 1 | 5 | 0 | 0 | Oldest |

Ready queue table

F I G. 75

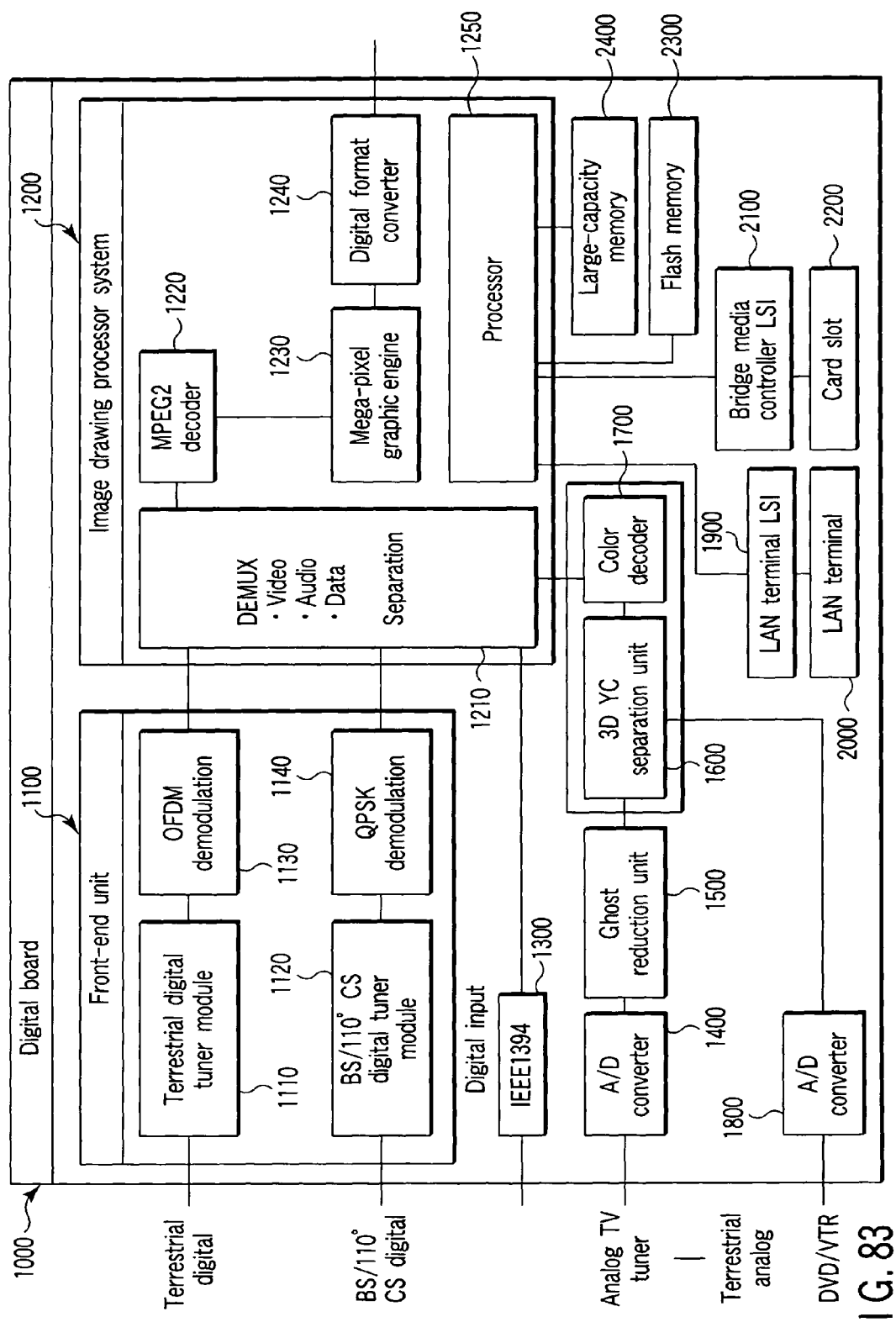
F I G. 83

DRAWING APPARATUS AND METHOD FOR PROCESSING PLURAL PIXELS IN PARALLEL

CROSS-REFERENCE TO RELATED APPLICATIONS

This application is based upon and claims the benefit of priority from prior Japanese Patent Applications No. 2005-371735, filed Dec. 26, 2005; No. 2005-371736, filed Dec. 26, 2005; and No. 2005-371737, filed Dec. 26, 2005, the entire contents of all of which are incorporated herein by reference.

BACKGROUND OF THE INVENTION

1. Field of the Invention

The present invention relates to drawing apparatuses and methods for processing plural pixels in parallel. For example, the present invention relates to image processing LSIs that simultaneously process plural pixels in parallel.

2. Description of the Related Art

The recently increased operation speed of CPUs (Central Process Units) has emphasized the need for an increase in the operation speed of image drawing apparatuses.

The image drawing apparatus generally includes a graphic drawing means for decomposing an introduced graphic into pixels, pixel processing means for executing a drawing process on the pixels, and storage means to and from which drawing results are written and read. The recent progress of the CG (Computer Graphics) technology has led to the frequent use of complicated pixel processing techniques. This increases loads on the pixel processing means. Consequently, a structure having pixel processing means arranged in parallel has been proposed in, for example, U.S. Pat. No. 6,532,013.

BRIEF SUMMARY OF THE INVENTION

A drawing apparatus according to an aspect of the present invention includes:

a reception unit which receives graphic information;

a first holding unit which holds a plurality of first data which is a part of the graphic information received by the reception unit, in association with identification numbers assigned to the first data; and a drawing processing unit which draws a graphic on the basis of the first data held in the first holding unit, the drawing processing unit using the plurality of first data in a same task to draw the graphic, the reception unit recording the identification numbers of the first data and a synchronization flag in order of reception, the synchronization flag being set for the first data received first among the plurality of first data processed by the same task in the drawing processing unit.

A drawing method according to an aspect of the present invention includes:

receiving a task synchronization signal repeatedly transmitted at time intervals;

receiving a plurality of temporally successive first data;

providing each of the first data with an identification number and saving the first data;

in saving the first data, providing a synchronization flag for firstly received one of the plurality of the first data after receiving the task synchronization signal first;

after starting the reception of the first data, receiving a plurality of temporally successive second data;

saving the second data in association with the identification numbers of the first data; and drawing a graphic using the first and second data.

BRIEF DESCRIPTION OF THE SEVERAL VIEWS OF THE DRAWING

FIG. 2 is a conceptual drawing of a frame buffer in the graphic processor in accordance with the first embodiment of the present invention;

FIG. 4 is a conceptual drawing of the frame buffer in the graphic processor in accordance with the first embodiment of the present invention;

FIG. 19 is a block diagram of an entry allocation unit of the overlap detection unit provided in the graphic processor in accordance with the first embodiment of the present invention;

FIG. 25 is a block diagram of an XY table of a thread holding unit provided in the graphic processor in accordance with the first embodiment of the present invention;

FIG. 26 is a block diagram of the thread holding unit provided in the graphic processor in accordance with the first embodiment of the present invention;

FIG. 40 is a circuit diagram of a thread issuance control unit of the thread holding unit provided in the graphic processor in accordance with the first embodiment of the present invention;

FIG. 44 is a circuit diagram of a comparison unit of the thread holding unit provided in the graphic processor in accordance with the first embodiment of the present invention;

FIG. 46 is a conceptual drawing of an instruction management unit provided in the graphic processor in accordance with the first embodiment of the present invention;

FIG. 47 is a conceptual drawing of an instruction sequence executed by the graphic processor in accordance with the first embodiment of the present invention;

FIG. 48 is a timing chart showing how subpasses are executed by the graphic processor in accordance with the first embodiment of the present invention;

FIG. 53 is a table showing stamp data for the graphic processor in accordance with the first embodiment of the present invention;

FIG. 54 is a timing chart of the stamp data for the graphic processor in accordance with the first embodiment of the present invention;

FIG. 55 is a conceptual drawing of a stamp holding unit provided in the graphic processor in accordance with the first embodiment of the present invention;

FIG. 56 is a conceptual drawing of a second data holding unit provided in the graphic processor in accordance with the first embodiment of the present invention;

FIG. 57 is a conceptual drawing of the memory of the reception unit provided in the graphic processor in accordance with the first embodiment of the present invention;

FIG. 58 is a timing chart showing the relationship between various signals and tasks in the graphic processor in accordance with the first embodiment of the present invention;

FIG. 59 is a conceptual drawing of the memory of the reception unit provided in the graphic processor in accordance with the first embodiment of the present invention;

FIG. 62 is a conceptual drawing of the XY table provided in the graphic processor in accordance with the first embodiment of the present invention;

FIG. 63 is a conceptual drawing of the XY table provided in the graphic processor in accordance with the first embodiment of the present invention;

FIG. 64 is a truth table for a quad merge operation performed by the graphic processor in accordance with the first embodiment of the present invention;

FIG. 66 is a conceptual drawing of the thread holding unit provided in the graphic processor in accordance with the first embodiment of the present invention;

FIG. 67 is a timing chart showing how subpasses are executed by the graphic processor in accordance with the first embodiment of the present invention;

FIG. 68 is a conceptual drawing of the thread holding unit provided in the graphic processor in accordance with the first embodiment of the present invention;

FIG. 69 is a conceptual drawing of the instruction management unit provided in the graphic processor in accordance with the first embodiment of the present invention;

FIG. 70 is a conceptual drawing of the thread holding unit provided in the graphic processor in accordance with the first embodiment of the present invention;

FIG. 71 is a conceptual drawing of the instruction management unit provided in the graphic processor in accordance with the first embodiment of the present invention;

FIG. 72 is a conceptual drawing of the thread holding unit provided in the graphic processor in accordance with the first embodiment of the present invention;

FIG. 73 is a conceptual drawing of the instruction management unit provided in the graphic processor in accordance with the first embodiment of the present invention;

FIG. 74 is a conceptual drawing of the thread holding unit provided in the graphic processor in accordance with the first embodiment of the present invention;

FIG. 75 is a conceptual drawing of the instruction management unit provided in the graphic processor in accordance with the first embodiment of the present invention;

FIG. 76 is a conceptual drawing of the thread holding unit provided in the graphic processor in accordance with the first embodiment of the present invention;

FIG. 83 is a block diagram of a digital board of a digital television including the graphic processor in accordance with the first and second embodiments of the present invention.

DETAILED DESCRIPTION OF THE INVENTION

Figure 1:
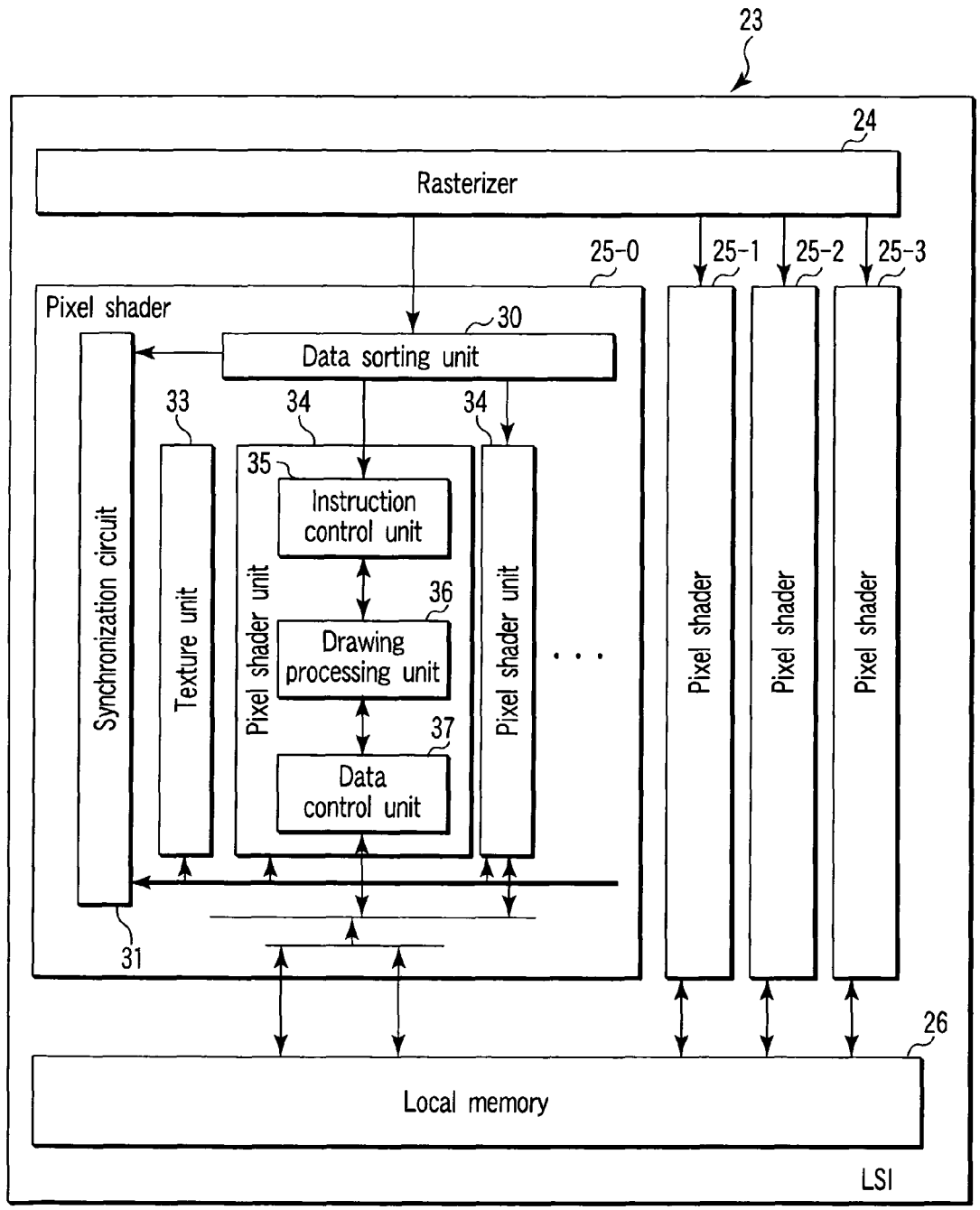
FIG. 1 is a block diagram of a graphic processor in accordance with a first embodiment of the present invention.

A graphic processor in accordance with a first embodiment of the present invention will be described with reference to FIG. 1. FIG. 1 is a block diagram of the graphic processor in accordance with the first embodiment.

As shown in the figure, a graphic processor 23 includes a rasterizer 24, plural pixel shaders 25-0 to 25-3, and a local memory 26. The present embodiment uses four pixel shaders but this is only illustrative. Eight, sixteen, or thirty-two pixel shaders may be provided in the graphic processor 23; the number of pixels shaders is not limited. The rasterizer 24 generates pixels in accordance with input graphic information. The term "pixel" refers to a minimum unit area used in association with the drawing of a predetermined graphic, which is drawn using a set of pixels. Pixels generated are loaded into the pixel shaders 25-0 to 25-3.

The pixel shaders 25-0 to 25-3 execute an arithmetic process on the pixels that are input from the rasterizer 24 to generate image data on the local memory (described later). Each of the pixel shaders 25-0 to 25-3 includes a data sorting unit 30, a synchronization circuit 31, a texture unit 33, and plural pixel shader units 34.

The data sorting unit 30 receives data from the rasterizer 24. The data sorting unit 30 sorts the received data to the pixel shaders 25-0 to 25-3.

The synchronization circuit 31 synchronizes the operation of the pixel shader unit 34.

The texture unit 33 executes a texture process to attach texture data to data processed by the pixel shader unit 34.

The pixel shader unit 34 is a shader engine unit that executes a shader program on pixel data. Each pixel shader unit 34 executes an SIMD (Single Instruction Multiple Data) operation to simultaneously process four pixels. Each pixel shader unit 34 includes an instruction control unit 35, a drawing process unit 36, and a data control unit 37.

The instruction control unit 35 will be described below in detail. The drawing process unit 36 executes an arithmetic process on pixels. The data control unit 37 controls reading of data from the local memory 26.

The local memory 26 is, for example, eDRAM (embedded DRAM) and stores pixel data drawn by the pixel shaders 25-0 to 25-3.

Now, description will be given of concept of graphic drawing by the graphic processor in accordance with the present embodiment. FIG. 2 is a conceptual drawing showing the entire space in which graphics are to be drawn. The drawing area shown in FIG. 2 corresponds to a memory space in the local memory which holds pixel data; the memory space is hereinafter referred to as a frame buffer.

Figure 3:
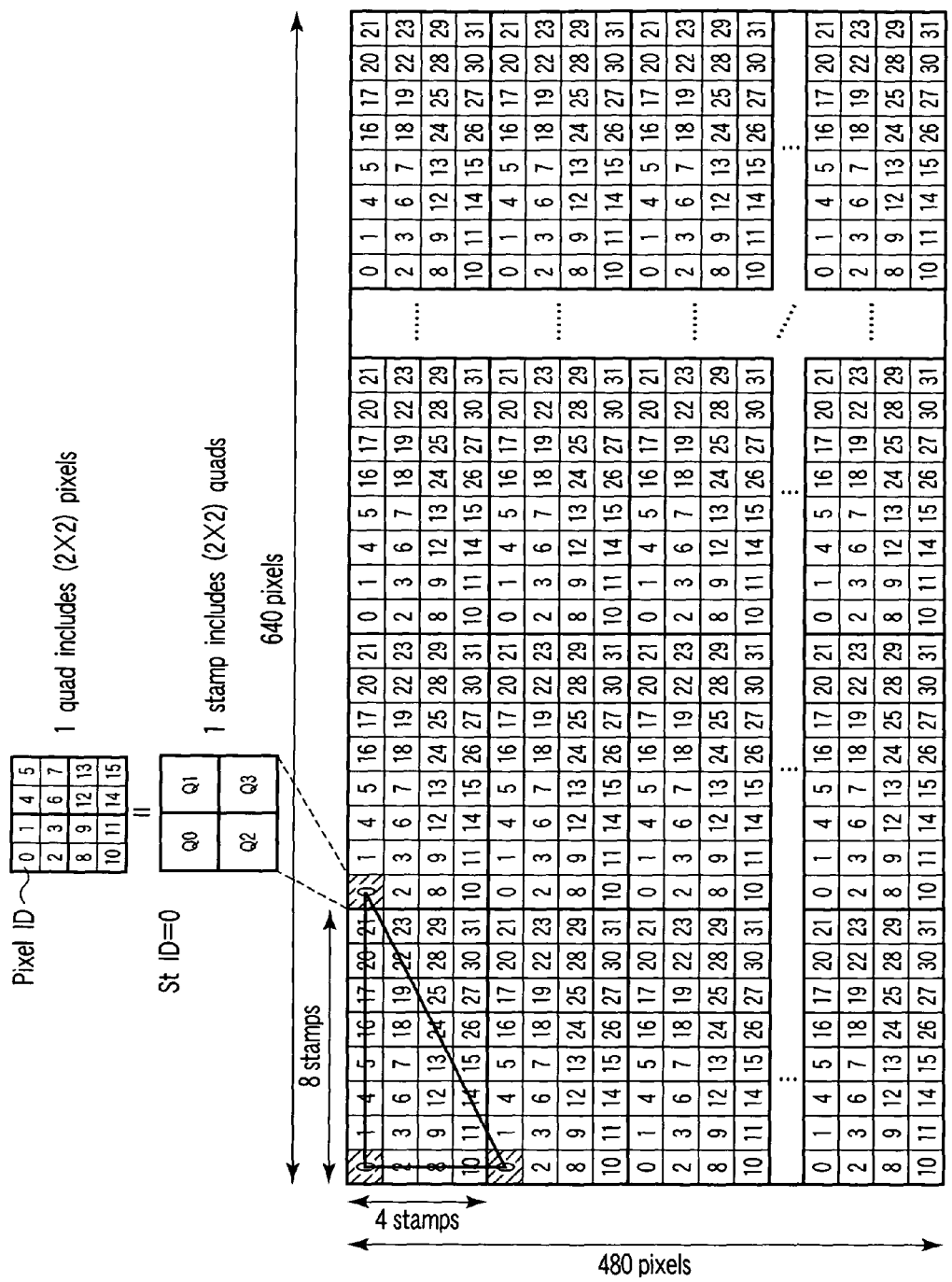
FIG. 3 is a conceptual drawing of the frame buffer in the graphic processor in accordance with the first embodiment of the present invention.

As shown in the figure, the frame buffer contains, for example, (40×15) blocks BLK0 to BLK599 arranged in a matrix. Each of the blocks is a set of pixels. The number of blocks is only illustrative and the present embodiment is not limited to the number (40×15). The pixel shaders 25-0 to 25-3 generate pixels in order of the blocks BLK0 to BLK599. Each of the blocks BLK0 to BLK599 contains a set of plural pixels arranged in a matrix. The set of pixels contains, for example, (4×4)=16 pixels. This set is hereinafter referred to as a stamp. Each of the blocks BLK0 to BLK599 has, for example, 32 stamps. FIG. 3 shows that each of the blocks shown in FIG. 2 has plural stamps.

Each stamp is a set of plural pixels as described above. The pixels contained in the same stamp are drawn by the same pixel shader. The number of pixels contained in the stamp is not limited to 16 but may be, for example, 1, 4, . . . ; the number of pixels in the stamp is not limited. If the stamp contains only one pixel, it may be called a pixel. In FIG. 3, the numbers (=0 to 31) shown in each stamp are hereinafter referred to as stamp IDs (STIDs) and identify the stamps. The number (=0 to 15) shown on each pixel is hereinafter referred to as a pixel ID (PIXID) and identifies each pixel. A set of (2×2) pixels in each stamp is called a quad. One stamp contains (2×2) quads. These four quads are hereinafter referred to as quads Q0 to Q3. These reference numerals are called quad IDs and identify the quads. Each of the blocks BLK0 to BLK599 contains (4×8)=32 stamps. Accordingly, the entire space in which the graphic is to be drawn is formed of (640× 480) pixels.

Figure 5:
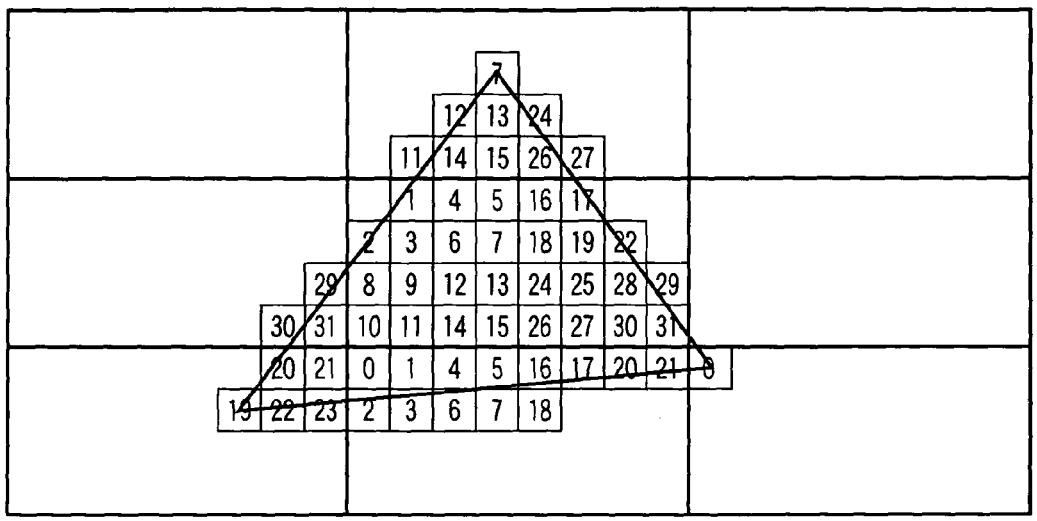
FIG. 5 is a conceptual drawing of the frame buffer in the graphic processor in accordance with the first embodiment of the present invention.

Now, graphics drawn in the frame buffer will be described. First, to draw a graphic, graphic information is input to the rasterizer 24. The graphic information is, for example, the coordinates of vertexes of the graphic and color information. By way of example, drawings of a triangle will be described. The triangle input to the rasterizer 24 occupies such a position in the drawing space as shown in FIG. 4. It is assumed that the coordinates of three vertexes of the triangular are located in a stamp with STID=7 in the block BLK1, a stamp with STID=19 in the block BLK40, and a stamp with STID=0 in the block BLK42. The rasterizer 55 generates stamps corresponding to the positions occupied by the triangle to be drawn. FIG. 5 shows this. The stamp data generated are sent to the respective pre-associated pixel shaders 25-0 to 25-3.

The pixel shaders 25-0 to 25-3 execute drawing processes on the respective pixels on the basis of the input stamp data. As a result, such a triangle as shown in FIG. 5 is drawn with the plural pixels. The pixel data drawn by the pixel shaders 25-0 to 25-3 is stored in the local memory for each stamp.

Figure 6:
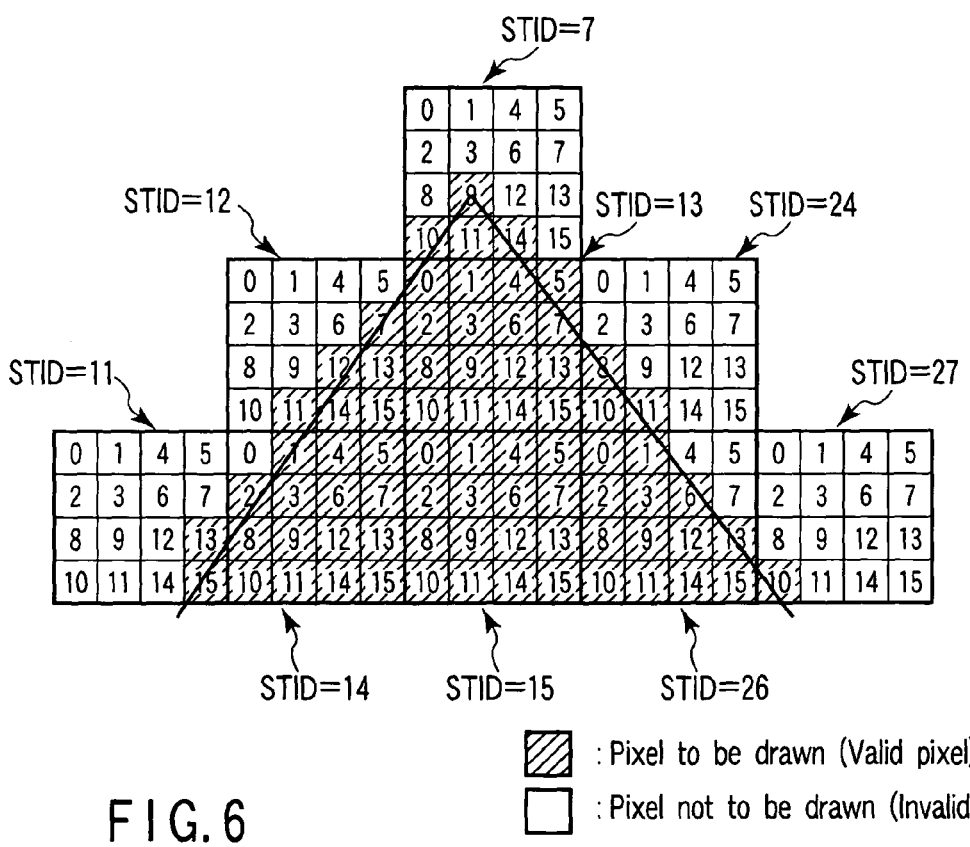
FIG. 6 is a conceptual drawing of the frame buffer in the graphic processor in accordance with the first embodiment of the present invention.

FIG. 6 is an enlarged view of the block BLK1 in FIG. 5. As shown in the figure, the rasterizer 24 generates eight stamps for the block BLK1. These stamps have stamp IDs STIDs=7, 11 to 15, 24, 26, and 27. As previously described, each stamp generated by the rasterizer 24 contains (4×4)=16 pixels. However, for certain types of graphics, not all the pixels in an issued stamp need to be drawn. For example, in FIG. 6, a stamp with STID=15 is inside the triangle. Accordingly, all the pixels contained in this stamp need to be drawn. However, for example, for a stamp with STID=7, pixels with PIXIDs=0 to 8, 12, 13, and 15 are outside the triangle and need not be drawn. Only the pixels with PIXIDs=9 to 11 and 14 need to be drawn. Thus, pixels that need to be drawn are hereinafter referred to as "valid" pixels, whereas pixels that need not be drawn are hereinafter referred to as "invalid" pixels.

Figure 7:
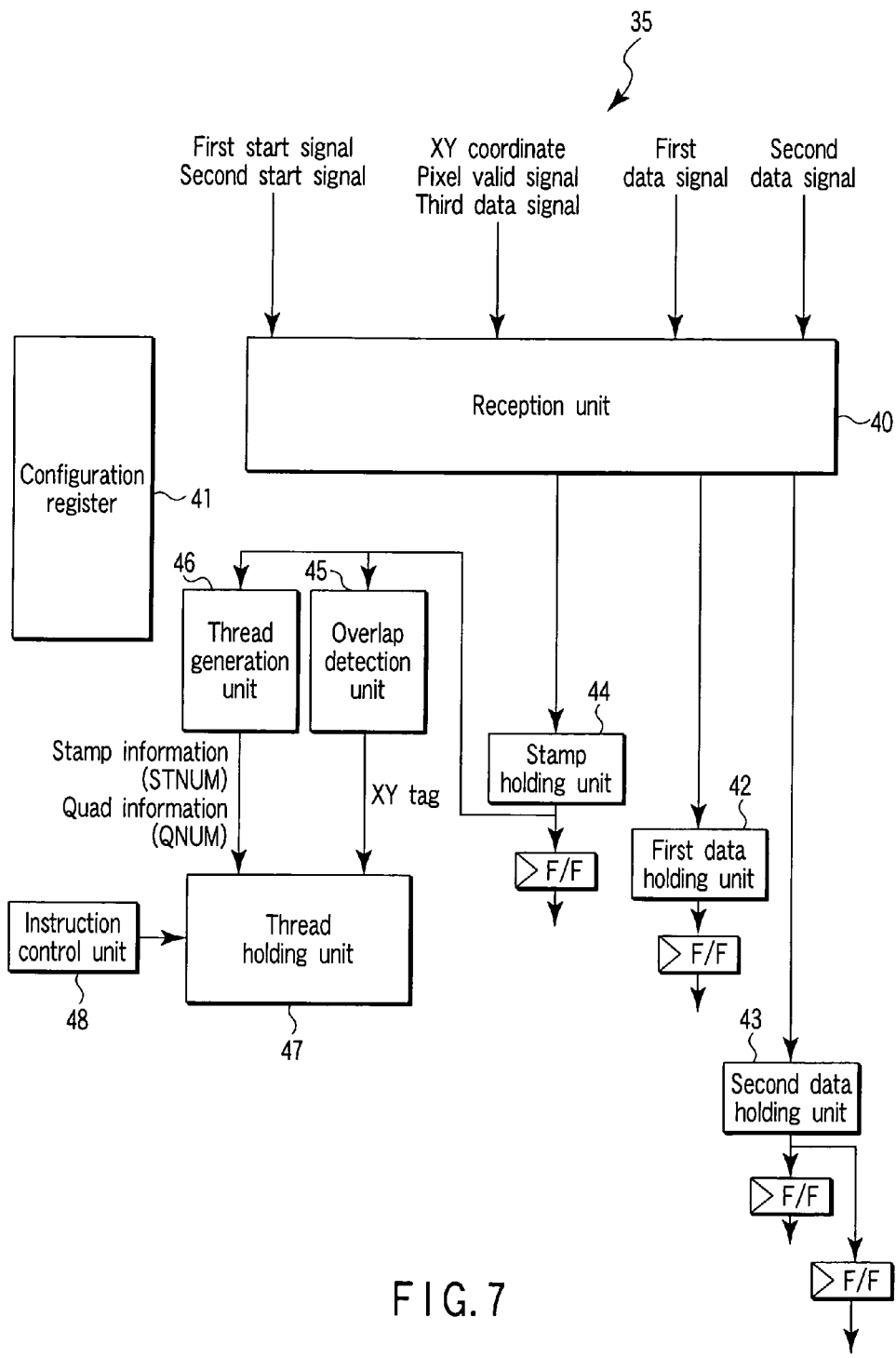
FIG. 7 is a block diagram of an instruction control unit provided in the graphic processor in accordance with the first embodiment of the present invention.

Now, a detailed description will be given of configuration of the instruction control unit 35, included in each pixel shader unit 34. FIG. 7 is a block diagram of the instruction control unit 35. As shown in the figure, the instruction control unit 35 includes a reception unit 40, a configuration register 41, a first data holding unit 42, a second data holding unit 43, a stamp holding unit 44, an overlap detection unit 45, a thread generation unit 46, a thread holding unit 47, and an instruction management unit 48.

The instruction control unit 35 receives plural data from the data sorting unit 30. The data are required to draw the graphic and include, for example, XY coordinates, first to third data, and a pixel valid signal. The XY coordinates are for the stamp. The third data is information on drawing directions and polygon faces. The first data indicate the typical values of parameters for the graphic to be drawn. The second data is graphic depth information. The pixel valid signal is information indicating whether or not the pixel is valid. These data are hereinafter sometimes collectively referred to as "stamp data".

Figure 8:
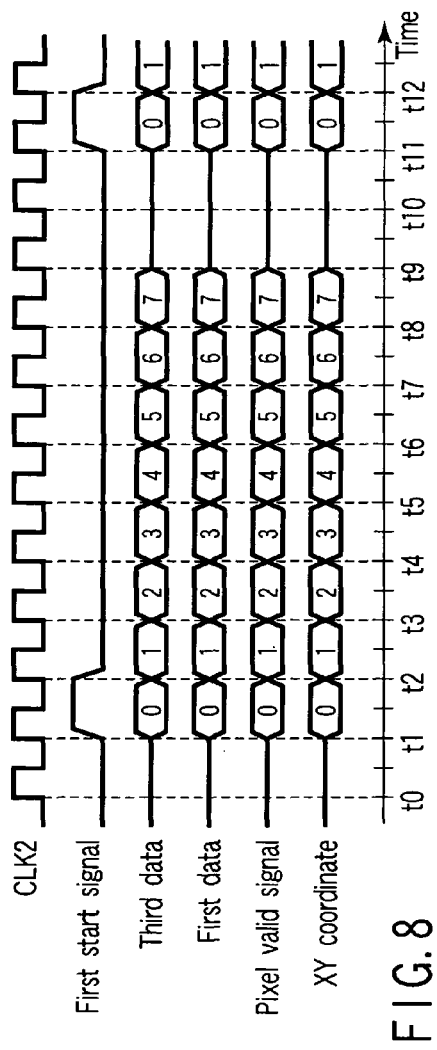
FIG. 8 is a timing chart of stamp data signals received in the graphic processor in accordance with the first embodiment of the present invention.

The stamp data is input to the instruction control unit 35 in synchronism with a clock signal CLK2. The data other than the second data are input to the input control unit 35 in response to a first start signal. FIG. 8 is a timing chart of data signals.

As shown in FIG. 8, at time t1, a first start signal is asserted and the instruction control unit 35 starts to receive third data, first data, a pixel valid signal, and XY coordinates. This stamp data is divided into eight clock cycles before being sent to the instruction control unit 35. The instruction control unit 35 can hold, for example, data on up to 16 stamps.

Figure 9:
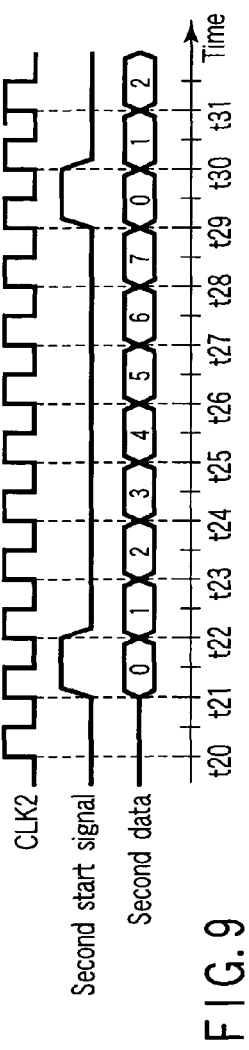
FIG. 9 is a timing chart of stamp data signals received in the graphic processor in accordance with the first embodiment of the present invention.

The second data is input to the instruction control unit 35 in response to a second start signal instead of the first start signal. FIG. 9 is a timing chart of the clock CLK2, second start signal, and second data. As shown in the figure, at time t21, the second start signal is asserted and the second data is received. The second start signal is asserted a few cycles later than the first start signal for transferring the stamp data other than the second data. The instruction control unit 35 thus receives the second data later than the other stamp data.

Roughly speaking, the instruction control unit 35 executes the following operation. The instruction control unit 35 writes data provided through an external chip selecting or addressing operation, to the configuration register 41. The configuration register 41 includes, for example, plural registers holding signals INSTBASE and PRELDTIME, respectively.

The INSTBASE indicates the address of the first instruction required to start processing a stamp (thread). The PRELDTIME indicates a preload timing. That is, PRELDTIME specifies the number of clock cycles from the execution of a yield instruction by the thread until the issuance of a request for preloading executed by the thread. Preloading is as follows. The pixel shader unit 34 internally has a cache memory (not shown). The pixel shader unit 34 uses data read into the cache memory to execute a drawing process. Before an actual drawing process, data may be read from the local memory 26. This is the preloading. The yield instruction will be described below.

Now, each block of the instruction control unit 35 will be described. First, the configuration of the reception unit 40 will be described with reference to FIG. 10 that is a block diagram of the reception unit 40. As shown in the figure, the reception unit 40 includes a first state machine 50, a second state machine 51, a quad valid (QV) generator 52, shift registers 53-0 to 53-4, and a memory 54.

The reception unit 40 latches the first start signal, second start signal, XY coordinates, pixel valid signal, third data, second data, and first data sent by the data sorting unit 30, in a flip flop F/F. Further, simultaneously with or before the input of the above data signals, the reception unit 40 latches a task synchronization signal in F/F. The task synchronization signal is generated by the synchronization circuit 31.

The first state machine 50 then generates a first data write enable signal and a stamp data write enable signal on the basis of the first start signal. The first data write enable signal enables a write operation on the first data holding unit 42. The stamp data write enable signal enables a write operation on the stamp holding unit 44. A first data write address signal is also generated on the basis of a stamp number STN sent by the stamp holding unit 44. The stamp number STN is an identification number uniquely provided for each stamp. The first data write address signal indicates an address in the first data holding unit 42 at which the first data is written.

The first state machine 50 contains a counter and starts up the counter when the first start signal is asserted. The counter is initialized to zero during a cycle in which the first start signal is asserted. Subsequently, the counter is sequentially incremented in synchronism with the clock. When the counter value is, for example, 7, a data write end signal is asserted. The data write end signal indicates the end of data transfer. Once the data transfer is finished, the first state machine 50 stops operation.

Figure 11:
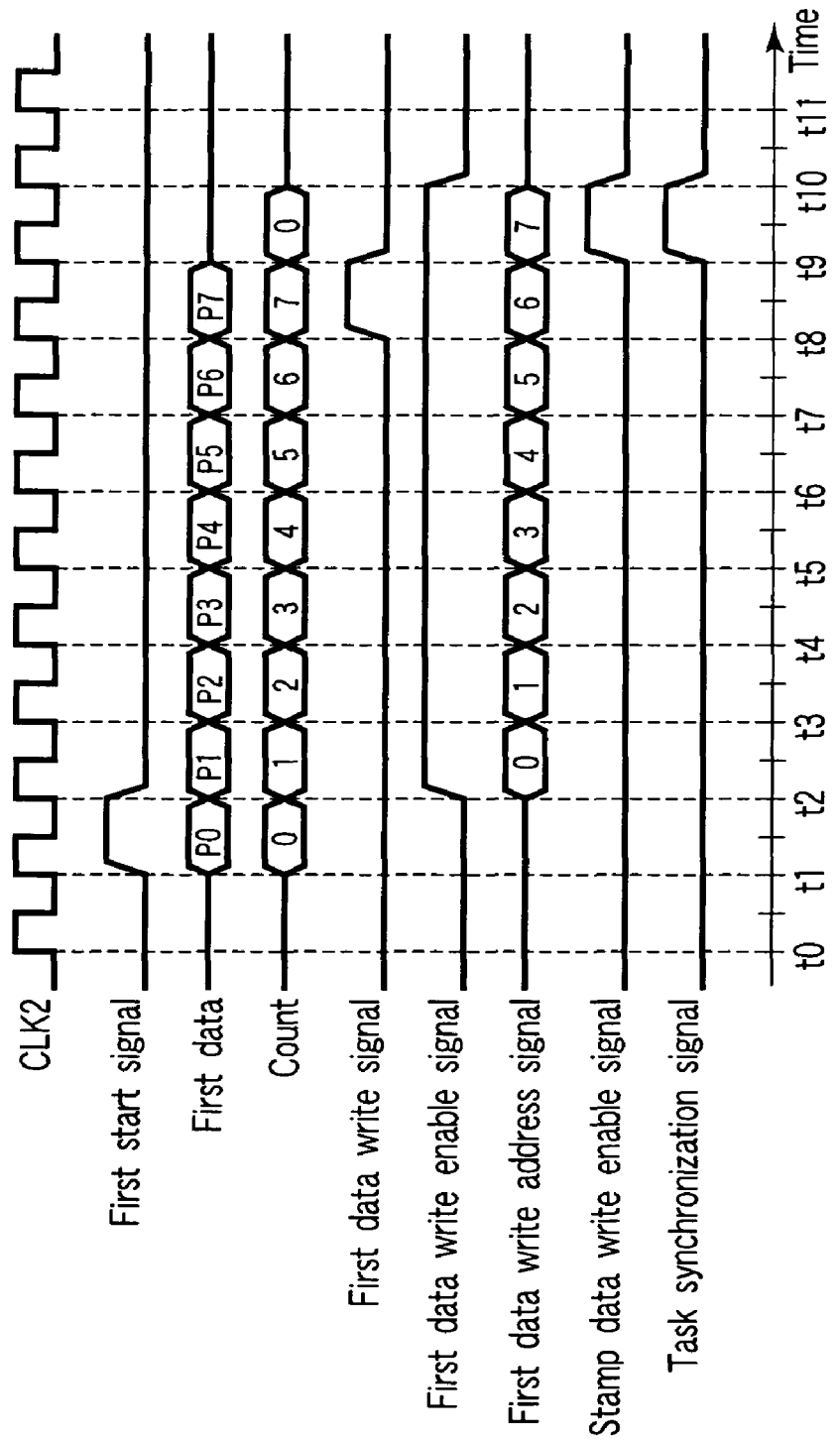
FIG. 11 is a timing chart of signals received by the reception unit provided in the graphic processor in accordance with the first embodiment of the present invention.

The first data is written to the first data holding unit 42 during each of eight cycles from the assertion of the first start signal until the stop of operation of the first state machine 50. FIG. 11 shows an operation of writing the first data to the first data holding unit 42. FIG. 11 is a timing chart of various signals.

As shown in the figure, at time t0, the first start signal is asserted, and at the same time, the first data is input and the counter of the first state machine 50 starts counting ("count number" in FIG. 11). The first data is continuously input over eight cycles. At time t2 during a cycle after the one in which the first start signal is asserted, the first state machine 50 asserts the first data write enable signal to permit data to be written to the first data holding unit 42. At the same time, the first state machine 50 generates addresses (first data write address signal) at which the first data is to be written, over eight cycles from time t2. Consequently, during eight cycles from time t2, the first data is sequentially written at the addresses in the first data holding unit 42 which are indicated by the first data write address signal. When the counter value in the counter reaches 7 (time t8), the first state machine 50 asserts a data write end signal to end the data transfer. Further, during the cycle following time t8, the stamp data write enable signal is asserted. This permits data to be written to the stamp holding unit 44. The task synchronization signal is also asserted.

Further, the quad valid generator 52 generates a quad valid signal QV on the basis of the pixel valid signal. The quad valid signal QV indicates whether or not any of the four pixels contained in the quad is valid.

The shift registers 53-0 to 53-2 receives the XY coordinates, third data, and pixel valid signal, respectively. The shift registers 53-0 to 53-4 hold the respective received data, while shifting the data leftward every cycle by the number of bits received. Accordingly, when the counter value in the first state machine 50 reaches "7", in other words, when the data write end signal is asserted, all the bits in the stamp are contained in the shift registers 53-0 to 53-4. During the next cycle, this data is written to the stamp holding unit 44. At this time, the stamp number STN is written to the memory 54, in which a valid flag ENV for the corresponding entry is set. This will be described below.

A predetermined clock cycles after the assertion of the first start signal, the second start signal is asserted and the second data is input to the reception unit 40. Asserting the second start signal allows the reception unit to recognize the start of transmission of the second data. The second state machine 51 starts operation. During the transmission of the second data, the shift register 53-4 holds the received signal, while shifting the data toward an MSB (Most Significant Bit) every cycle by the number of bits received. The second state machine 51 contains a counter similarly to the first state machine 50. Asserting the second start signal allows the second state machine 51 to start counting. When the counter value reaches "7", the second state machine 51 asserts the second data write end signal to end the transfer of the second data.

Now, the memory 54 will be described with reference to FIG. 12. The memory 54 is, for example, a semiconductor memory based on an FIFO (First In First Out) scheme. The memory 54 has N (natural number of at least 2; 8, 16, or more) entries. Each of the entries can hold a valid flag ENV, a stamp number STN, a second data ready flag RDY2, and a synchronization flag SYNC. ENV is a flag written when the entry is used (ENV is set to "1"). STN is a stamp number that is an identification number uniquely provided for the stamp corresponding to the entry. RDY2 is a flag indicating whether or not the second data on the stamp corresponding to the entry has been written to the second data holding unit 43. SYNC is a flag which allows a task to synchronize with the data and which indicates whether or not the stamp corresponding to the entry is the first within the task.

When the stamp data write enable signal (see FIG. 11) is asserted and the stamp data is written to the stamp holding unit 44, the stamp number STN corresponding to the stamp holding unit 44 is written to the memory 54. In this case, the oldest entry in the memory 54 is used for which the valid flag ENV is not set. This entry is specified by a first write pointer (see FIG. 10). Writing the stamp number STN sets the valid flag ENV for that entry to "1". This indicates that the entry is in use. The first write pointer is then incremented.

Figure 10:
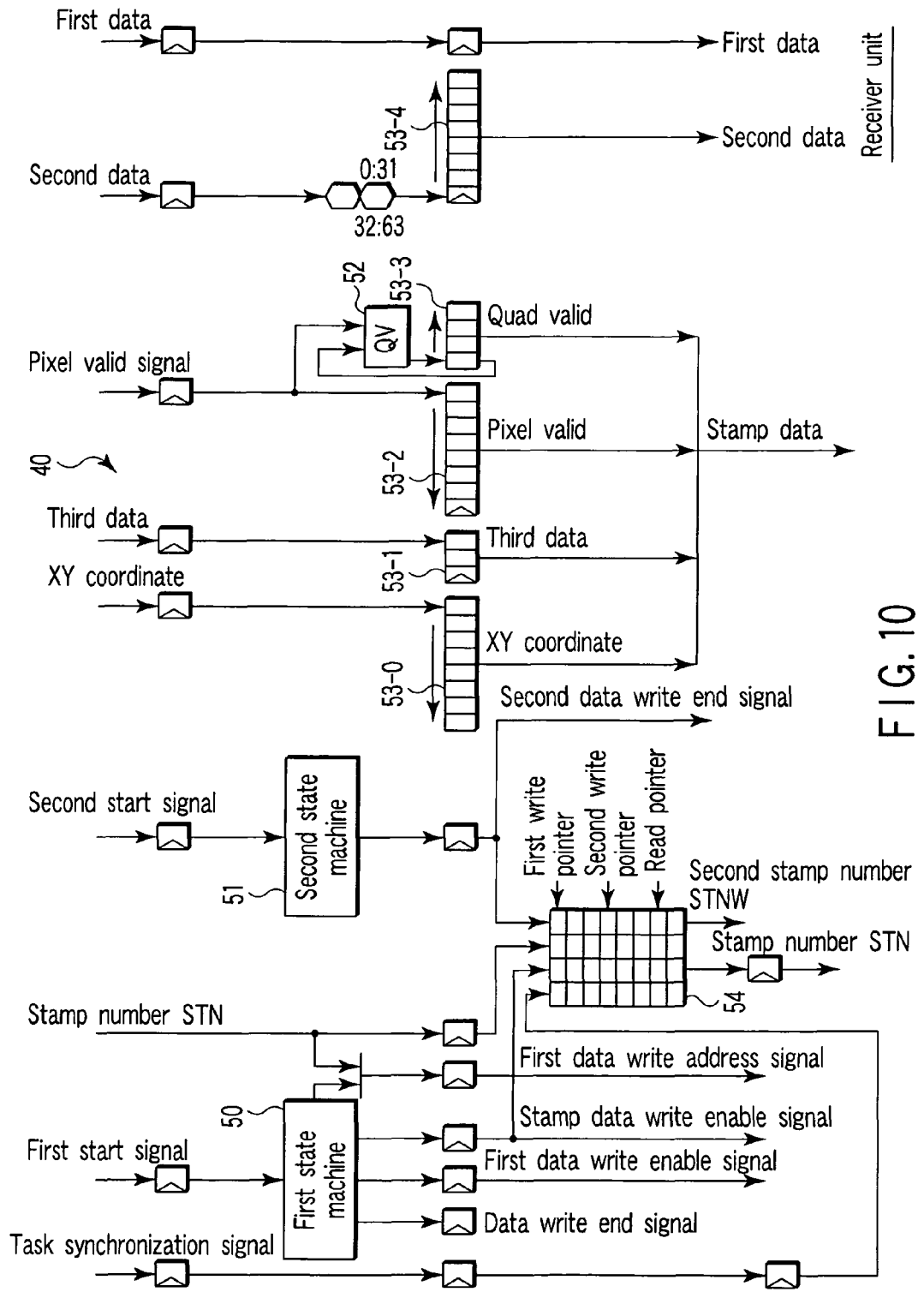
FIG. 10 is a block diagram of a reception unit provided in the graphic processor in accordance with the first embodiment of the present invention.

Then, the second start signal is asserted, and the oldest entry in the memory 54 is set (to "1") for which RDY2 is not set (see FIG. 10). The stamp number STN held in that entry is the same as the entry number of an entry in the second data holding unit 43 to which the second data is to be written. Setting RDY2 increments the second write pointer.

Under the following conditions, QV and XY coordinate are read from the stamp holding unit 44 and sent to the thread generation unit 46, which then performs a quad merge operation: the thread holding unit 47 is not full, the valid flag ENV is set for an entry indicated by a read pointer into the memory 54, the second data ready flag RDY2 is set, and a read port in the stamp holding unit is free (no read instruction). The read pointer specifies an entry in the memory 54 which holds the data to be read.

The quad merge operation is such a process as described below with reference to FIG. 13. FIG. 13 is a conceptual drawing of a quad merge operation. The quad merge operation involves merging two temporally successive stamps with the same XY coordinates into one stamp. By the quad merge, valid quads in two stamps can be compounded into one stamp and can be processed at a time. Thus, the amount of data to be subjected to the rendering process can be compressed.

Figures 12, 13:
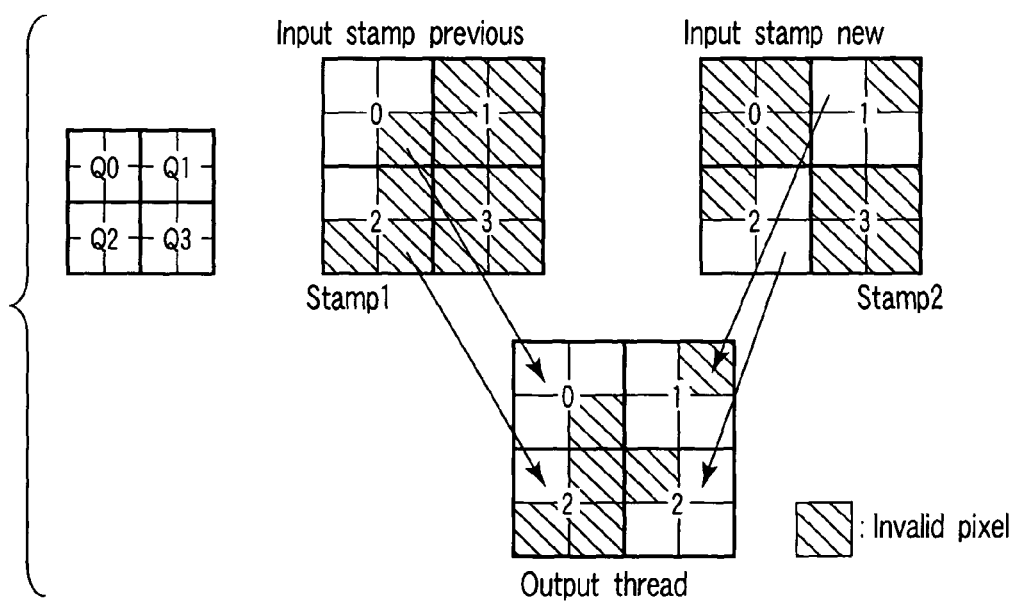
FIG. 12 is a conceptual drawing of a memory space in a memory of the reception unit provided in the graphic processor in accordance with the first embodiment of the present invention.
FIG. 13 is a conceptual drawing of a quad merge operation performed by the graphic processor in accordance with the first embodiment of the present invention.

As shown in FIG. 13, the four quads contained in one stamp are hereinafter referred to as quads Q0 to Q3. It is assumed that first, the stamp 1 in which the quads Q0 and Q2 are valid, whereas the quads Q1 and Q3 are invalid is input to the instruction control unit and that the stamp 2 in which the quads Q1 and Q2 are valid, whereas the quads Q0 and Q3 are invalid is subsequently input to the instruction control unit. In this case, the two stamps 1 and 2 are merged to generate a new stamp containing the quads Q0 and Q2 of the stamp 1 and the quads Q1 and Q2 of the stamp 2. This process is the quad merge operation. The newly generated stamp is hereinafter referred to as a thread so as to be distinguished from the stamp not subjected to the quad merge operation.

The reception unit 40 will be described again. The reception unit 40 latches a task synchronization signal generated by the synchronization circuit 31. Asserting the task synchronization signal sets the synchronization flag SYNC for the leading one (entry following the one corresponding to the last stamp for which the valid flag is set) of those entries in the memory 54 for which the valid flag ENV is not set. FIG. 11 shows the case in which the task synchronization signal is asserted at the earliest timing; the synchronization flag SYNC is set during the cycle following the timing when the last stamp in the preceding task is written to the memory 54 (when the stamp data write enable signal is asserted). The first and second write pointers into the memory 54 indicate the exact positions where the synchronization flag SYNC is written. Writing the synchronization flag does not increment the first or second write pointer. Consequently, the last stamp in the next task is written to the entry for which the synchronization flag SYNC is set.

Immediately after resetting (for example, immediately after power-on), the read pointer is initialized to zero, and the synchronization flag SYNC of entry 0 is set to "1". Asserting a task execution instruction indicating the start of a task process clears the synchronization flag SYNC of the entry pointed to by the read pointer. Accordingly, the cleared synchronization flag SYNC of the entry pointed to by the pointer indicates that the stamp corresponding to the entry belongs to the already started task. Thus, in this case, an operation of reading data from the stamp holding unit is requested for a quad merge operation. In contrast, the synchronization flag SYNC of the entry pointed to by the read pointer is "1", the stamp of the entry belongs to the next task. This synchronization flag SYNC also means that the task execution instruction for the task has not been asserted.

The reception unit generates a new task signal indicating the first stamp in the task. This signal is asserted when the first stamp is output to the thread generation unit 46 by the memory 54 after the assertion of the task execution instruction.

Now, the first data holding unit 42 will be described. The first data holding unit 42 is a semiconductor memory having plural entries. Asserting the first data write enable signal allows first data to be written to one of the entries in the first data holding unit 42 which is indicated by the first data write address signal. These three signals are sent by the reception unit 40.

Once the first data read enable signal is asserted, the first data holding unit 42 receives the first data read address signal from the drawing processing unit 36. The first data read address signal indicates the address of a stamp to be read. The first data is then read from one of the entries in the first data holding unit 42 which is indicated by the first data read address signal.

Now, the second data holding unit 43 will be described. The second data holding unit 43 is a semiconductor memory having plural entries. During a write operation, the data sorting unit 30 delivers second data of, for example, 64 bits per cycle. The reception unit 40 holds the second data for plural cycles to assemble it, and then asserts the second data write end signal. The second data holding unit 43 thus writes the second data to the address indicated by a second stamp signal STNW. The second stamp signal STNW is the same as the stamp signal STW provided to the stamp in the second data holding unit 43.

For a data read operation, the drawing processing unit 36 asserts the second data read enable signal. The second data holding unit 43 then receives the stamp number STN from the drawing processing unit 36. Data is then read from the entry specified by the stamp number STN.

Now, the stamp holding unit 44 will be described. The stamp holding unit 44 includes a semiconductor memory having plural entries. When the reception unit 40 asserts the stamp data write enable signal, the stamp holding unit 44 writes stamp data to the address indicated by the stamp number STN. The stamp data is sent by the receiving unit 40 and contains the coordinates, QV, third data, and pixel valid signal. The stamp holding unit 44 also arbitrates the data read request from the thread generation unit 46 (for a quad merge operation) and a data read request from the drawing processing unit 36 (for a register read operation) to output the stamp data to an external device. In response to the read request from the drawing processing unit 36, data on two stamps is read. The stamp numbers of these stamps are hereinafter referred to as an old stamp number STN0 and a new stamp number STN1. STN0 means the older one and STN1 means the newer one of the two stamps to be quad-merged. However, for a non-quad-merged thread, the stamp data corresponding to STN1 has any value (normally, data corresponding to STN0 of the last thread generated). In this case, the read data on STN1 is unnecessary and is not referenced by the instruction control unit.

Figures 14, 18:
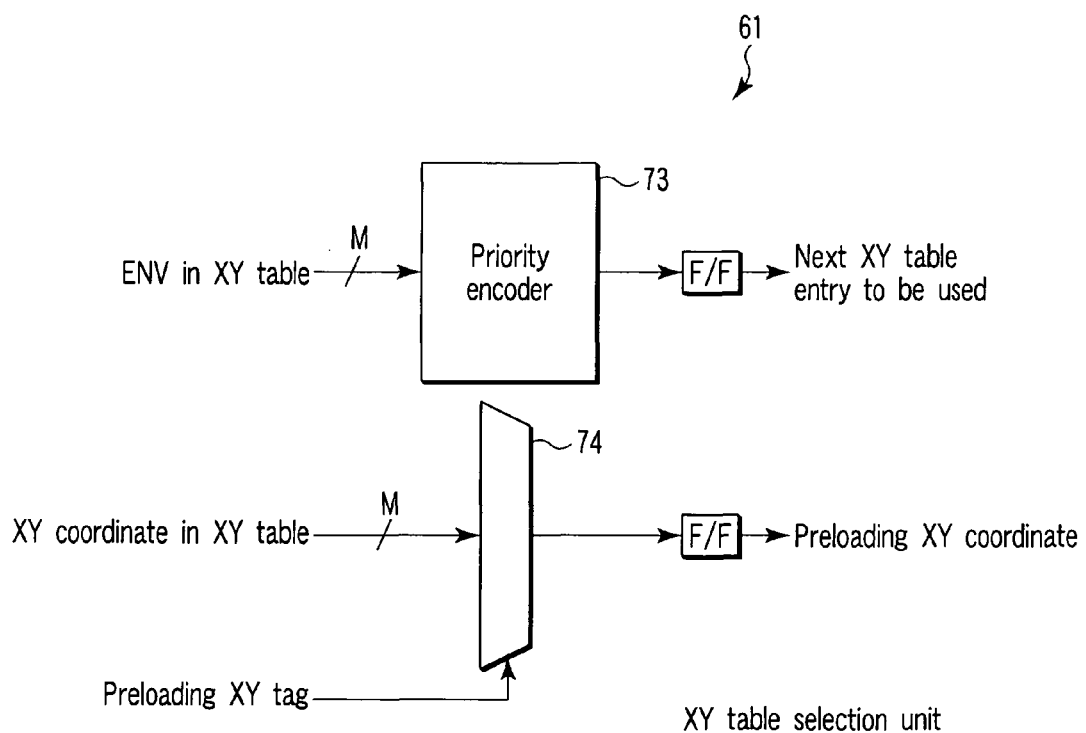
FIG. 14 is a conceptual drawing of an XY table in an overlap detection unit provided in the graphic processor in accordance with the first embodiment of the present invention.
FIG. 18 is a block diagram of an XY table selection unit of the overlap detection unit provided in the graphic processor in accordance with the first embodiment of the present invention.

Now, the overlap detection unit 45 will be described. The overlap detection unit 45 includes an XY table. FIG. 14 is a conceptual drawing of the XY table. As shown in the figure, the XY table has M (M is a natural number equal to or greater than 2) entries each holding the valid flag ENV, XY coordinate, and stamp number STN. Areas in which the XY coordinate and stamp number STN are held are called an XY coordinate field and a stamp number field, respectively.

The XY table holds the XY coordinates of all the stamps. One entry is allocated to each XY coordinates. The entry valid flag ENV is set for a valid entry. Each bit in the STN field corresponds to the stamp number of a stamp having the same XY coordinates as the corresponding one. For example, when the XY coordinates of a stamp STN=5 is "B", "B" is set in the XY coordinate field and "1" is set in the fifth bit in the STN field. In another example, when the XY coordinates of all the 16 stamps present in the stamp holding unit are "A", "A" is set in the XY coordinate field of entry 0. Further, all the bits in the STN field are set to "1", that is, STN="0xFFFF". "0x" indicates that the succeeding number is in a hexadecimal format.

The overlap detection unit 45 starts operation when quads are present in the merge buffer of the thread generation unit 46, with a new stamp input to the thread generation unit 46. The configuration of the thread generation unit 46 will be described below. Then, the new stamp is merged with the quads in the merge buffer, that is, the valid quads contained in the previously input stamp. In this case, if not all the quads have been merged, that is, if any quad remains in the merge buffer, the overlap detection unit 45 operates on the previous stamp (stamp previously present in the merge buffer) to output an XY tag. If all the quads have been merged, that is, if no stamp remains in the merge buffer, the overlap detection unit 45 not only performs the above operation but also operates on the new stamp to register STN in the entry of the XY tag. In other words, in this case, the two stamps are successively processed.

Figure 15:
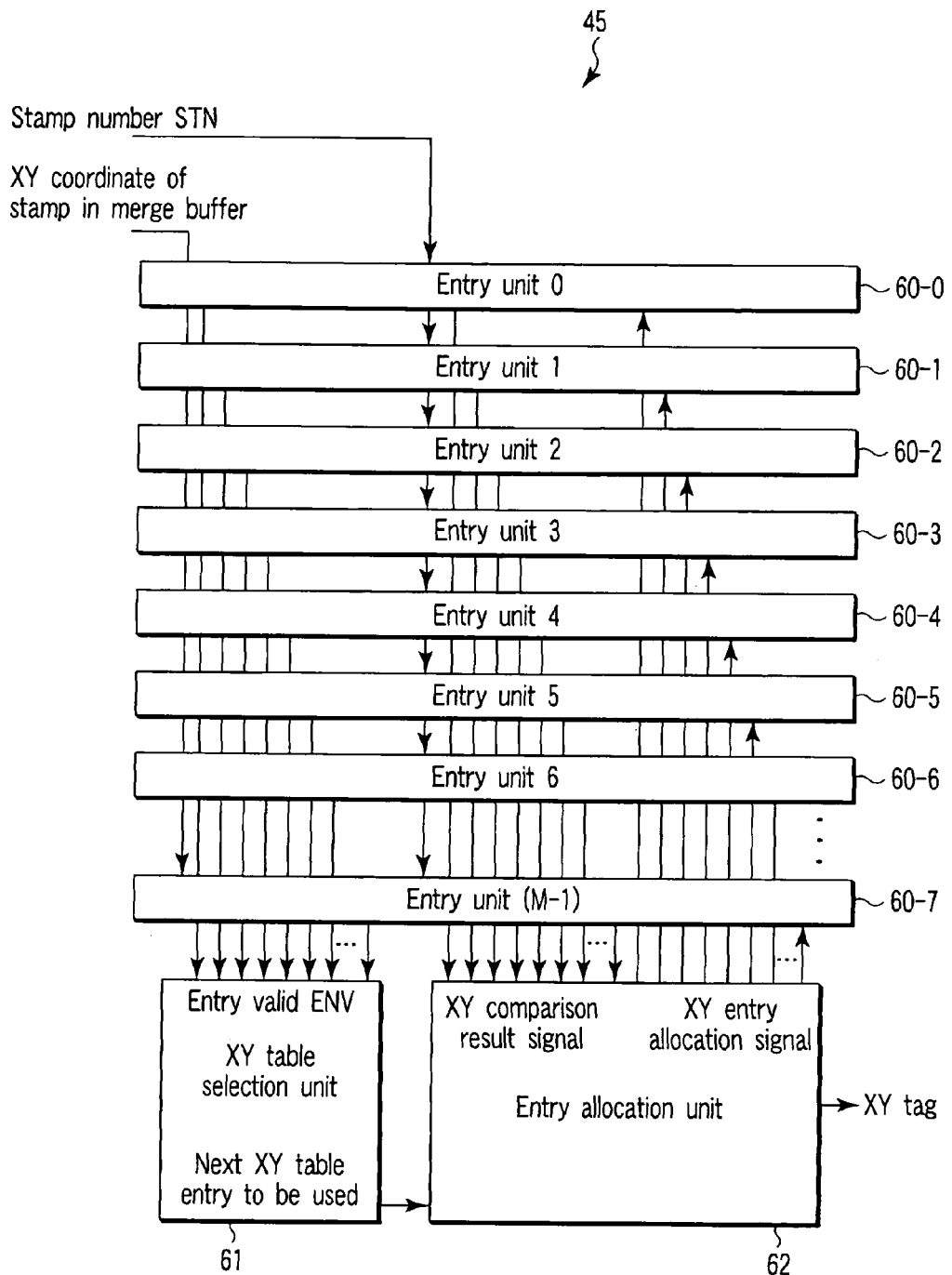
FIG. 15 is a block diagram of the overlap detection unit provided in the graphic processor in accordance with the first embodiment of the present invention.

FIG. 15 is a block diagram of the overlap detection unit 45. As shown in the figure, the overlap detection unit 45 includes M entry units 60-0 to 60-(M−1), an XY table selection unit 61, and an entry allocation unit 62.

The XY table selection unit 61 searches for a free entry in the XY table. The M entries in the XY table correspond to the entry units 60-0 to 60-(M−1). Each of the entry units 60-0 to 60-(M−1) compares its own XY coordinate with the XY coordinate of the stamp held in the merge buffer.

The entry allocation unit 62 allocates any entry in the XY table on the basis of the comparison of the XY coordinates. When quads are present in the merge buffer and all the quads of the new stamp have been merged, the overlap detection unit 45 sets an STN field in the XY table which corresponds to the new stamp.

Figure 16:
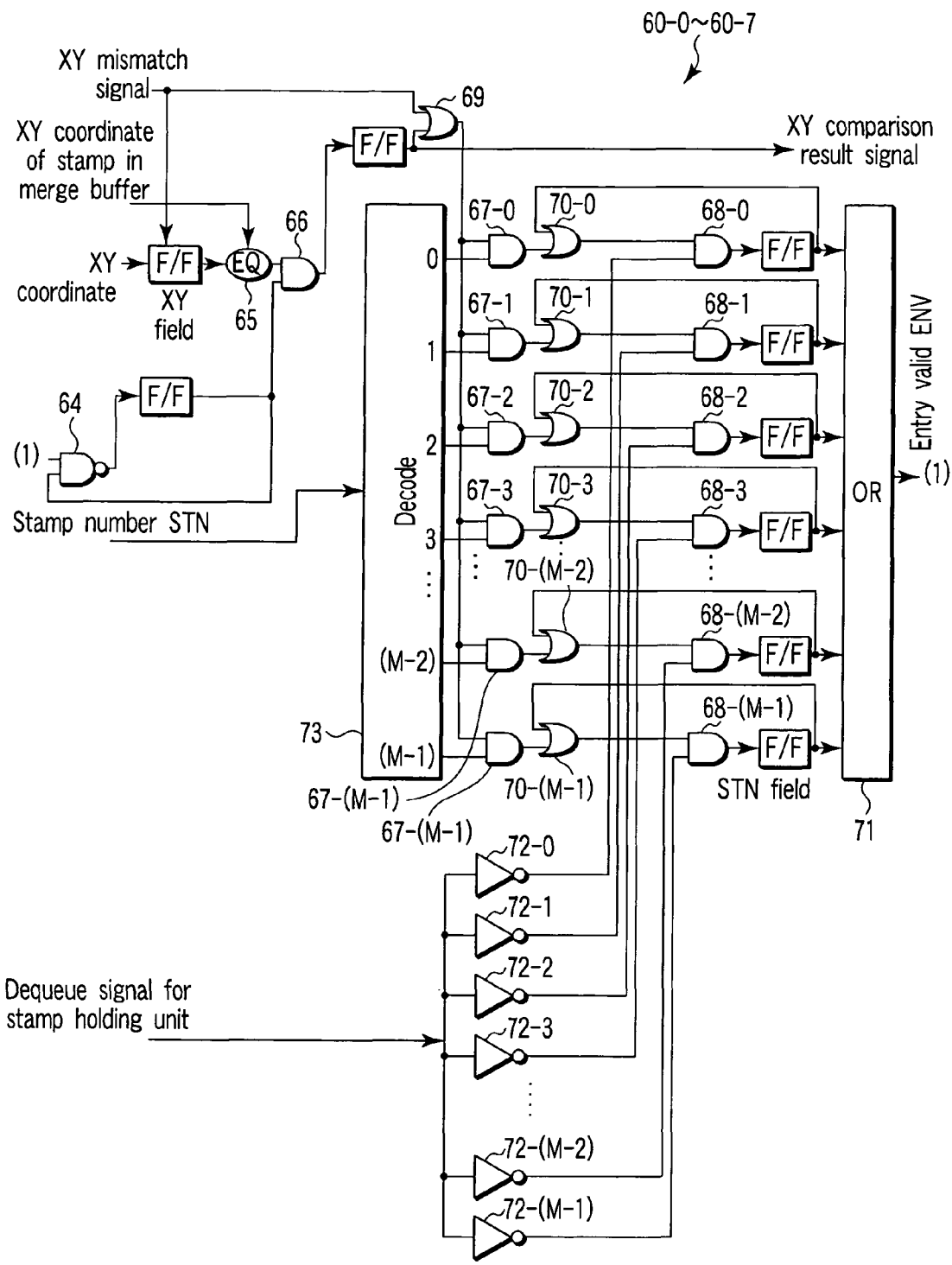
FIG. 16 is a block diagram of an entry unit of the overlap detection unit provided in the graphic processor in accordance with the first embodiment of the present invention.

Now, description will be given of configuration of each circuit block included in the overlap detection unit 45. FIG. 16 is a block diagram of the entry units 60-0 to 60-(M−1). As shown in the figure, each of the entry units 60-0 to 60-(M−1) includes a NAND gate 64, a comparator 65, an AND gate 66, 67-0 to 67-(M−1), and 68-0 to 68-(M−1), OR gates 69, 70-0 to 70-(M−1), and 71, inverters 72-0 to 72-(M−1), and a decoder 73.

The comparator 65 compares each of the XY coordinates held in the merge buffer with the XY coordinate held in the entry. If the XY coordinates are equal, the comparator 65 outputs "1". Otherwise the comparator 65 outputs "0". The NAND gate 64 performs a NAND operation on an output from the NAND gate 64 and an output (ENV) from the OR gate 71.

The AND gate 66 performs an AND operation on an output from the comparator 65 and an output from the NAND gate 64. The AND calculation at the AND gate 66 results in an XY comparison result signal indicating whether or not the XY coordinates are the same.

The OR gate 69 performs an OR operation on an output from the AND gate 66 and an XY mismatch signal. The XY mismatch signal is asserted when the XY coordinates do not match.

The decoder 73 decodes the stamp number STN sent by the thread generation unit 46. Each of the AND gates 67-0 to 67-(M−1) performs an AND operation on each bit of an M-bit signal resulting from decoding by the decoder 73 and an output from the OR gate 69. Each of the OR gates 69-0 to 69-(M−1) performs OR operations on outputs from the AND gates 67-0 to 67-(M−1) and the bits of the data in the STN field in the XY table.

Each of the AND gates 68-0 to 68-(M−1) performs AND operations on outputs from the OR gates 70-0 to 70-(M−1) and outputs from the inverters 72-0 to 72-F. The inverters 72-0 to 72-(M−1) inverts M stamp holding unit dequeue signals in order to enable the dequeueing of the entries 0 to (M−1) in the stamp holding unit 44. The OR gate 71 performs OR operations on outputs from the AND gates 68-0 to 68-(M−1) latched in a flip flop.

Figure 17:
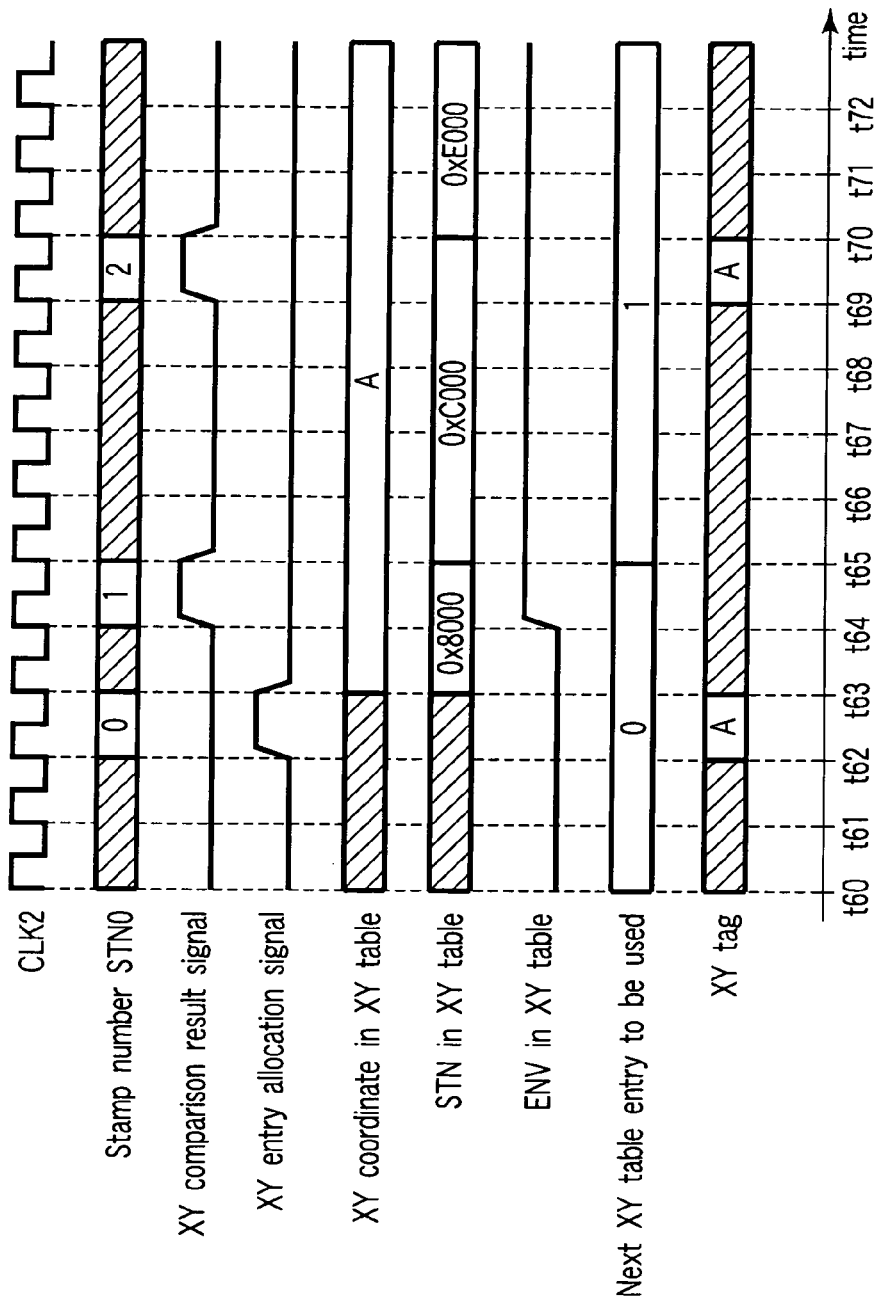
FIG. 17 is a timing chart of signals transmitted and received by the overlap detection unit provided in the graphic processor in accordance with the first embodiment of the present invention.

In the above configuration, the calculation at the OR gate 71 results in an entry valid ENV for the XY table. F/Fs that latch outputs from the AND gates 68-0 to 68-(M−1) provides an STN field. An F/F that latches XY coordinate provides an XY field. Now, with reference to FIG. 17, description will be given of a method for registering XY coordinate in the XY table. FIG. 17 is a timing chart for various signals. As shown in the figure, it is assumed that stamps with stamp numbers STN0=0, 1, and 2 are input by the thread generation unit 46 at times t62, t64, and t68. These stamps are assumed to have the same XY coordinates ("A").

First, at time t62, STN0 is input. The XY field of STN0 is then compared with the XY coordinate of the stamp in the merge buffer.

If the comparison results in mismatch, the XY comparison signal remains negated. Then, the XY entry allocation signal is asserted to allocate the new entry 0, with the XY coordinate ("A") and STN ("0x8000") set for the entry. That is, the bit 0 in STN is set. The XY tag becomes the entry number of the newly allocated new entry and contains the XY coordinate="A". The valid flag ENV of the newly allocated entry in the XY table is set to "1". This changes the entry of the next XY table to be used from "0" to "1". That is, the next stamp to be input which has a different XY coordinate is held in entry 1.

Then, at time t64, the next STN0 is input. This stamp has the same XY coordinates as that of the stamp input at time t62. The output from the comparator 65 is thus inverted to allow the XY comparison signal to be asserted. Consequently, the XY allocation signal is not asserted and the new entry is not allocated. A new STN0 ("0xC000") is set in the entry 0 in which STN0 input immediately before the new STN0 is registered. This is because STN0=1 and because bit 1 of this STN0 is set. This is also applicable to the case where STN0=2 is input at time t69.

Now, a method for erasing data from the XY table will be described. The dequeueing of the stamp holding unit 44 clears a bit in the STN field which corresponds to the stamp holding unit dequeue signal, at the end of the cycle. The valid flag ENV of the entry for which all of the STN field has been cleared is cleared during the next cycle. The stamp holding dequeue signal is asserted at any timing.

FIG. 18 is a block diagram of the XY table selection unit 61. As shown in the figure, the XY table selection unit 61 includes a priority encoder 73 and a multiplexer 74. The priority encoder 73 encodes the entry valid flag ENV in the XY table and searches for free entries in the XY table. The priority encoder 73 then determines one of the found free entries to be the next entry to be used. The priority encoder 73 further outputs the entry number of the determined entry as the next XY table entry signal to be used.

The multiplexer 74 references the XY coordinate held for each entry in the XY table. The multiplexer 74 then outputs preloading XY coordinate on the basis of a preloading XY tag provided by the thread holding unit.

FIG. 19 is a block diagram of the entry allocation unit 62. As shown in the figure, the entry allocation unit 62 includes a NOR gate 75, AND gates 77-0 to 77-(M−1), and a decoder circuit 78. The entry allocation unit 62 monitors the comparison of XY coordinate in each of the entry units 60-0 to 60-(M−1). If none of XY coordinate of the entry units 60-0 to 60-(M−1) matches the XY coordinate of the stamp, the entry allocation unit 62 selects the free entry found by the XY table selection unit 61 to be a write target entry.

That is, the NOR gate 75 performs a NOR operation on the XY comparison signals for the entries. The decode circuit 78 decodes the next XY table entry to be used. Each of the AND gates 77-0 to 77-(M−1) performs an AND operation on a decode result provided by the decode circuit 78 and an output from the NOR gate 75. Outputs from the AND gates 77-0 to 77-(M−1) correspond to respective XY entry allocation signals.

When the XY comparison signals for all the entries are "Low" (mismatch), the output from the NOR gate 75 becomes "High". The decoder circuit 78 then sets one of the M bit outputs "High" depending on the next XY table entry to be used. Consequently, the XY entry allocation signal from one of the AND gates 77-0 to 77-(M−1) which corresponds to the "High" bit becomes "High". The appropriate one of the entry units 60-0 to 60-(M−1) is thus requested to be allocated.

Now, the thread generation unit 46 will be described. The thread generation unit 46 first determines whether or not a quad merge operation is possible for each quad on the basis of the latest quad valid signal input to the thread generation unit 46 and the quad valid signal input immediately before the latest one and held in the merge buffer. The thread generation unit 46 then generates first to third thread information indicating the possibility of a quad merge operation.

Figure 20:
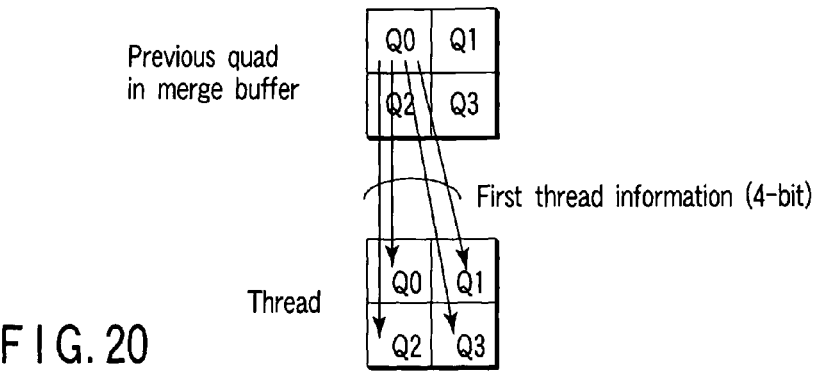
FIG. 20 is a conceptual drawing showing how a quad merge operation is performed by the graphic processor in accordance with the first embodiment of the present invention.
Figure 21:
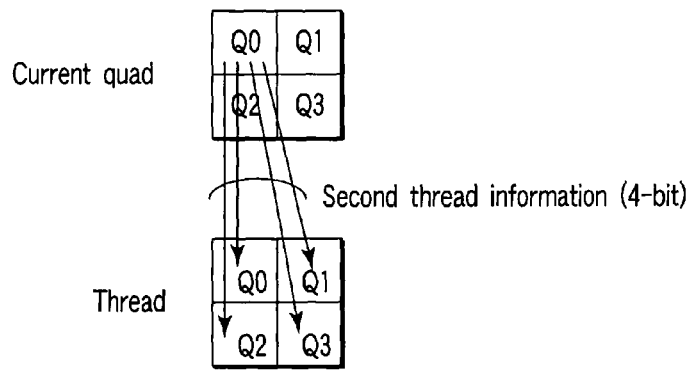
FIG. 21 is a conceptual drawing showing how the quad merge operation is performed by the graphic processor in accordance with the first embodiment of the present invention.
Figure 22:
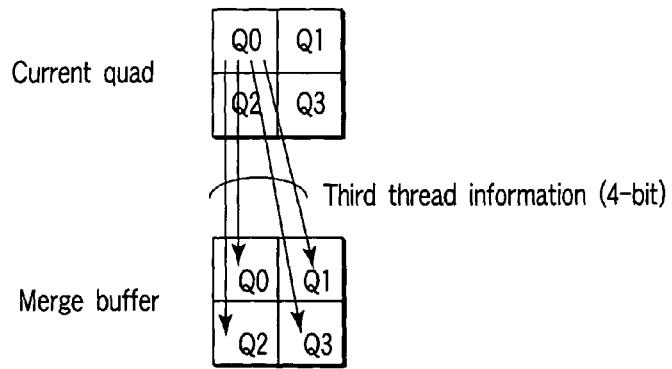
FIG. 22 is a conceptual drawing showing how the quad merge operation is performed by the graphic processor in accordance with the first embodiment of the present invention.

The first to third pieces of thread information will be described with reference to FIGS. 20 to 22. FIGS. 20 to 22 are conceptual drawings showing how a quad merge operation is performed.

The first thread information will be described with reference to FIG. 20. The first thread information indicates whether or not to drive the quads out of the merge buffer and contain the driven-out quads in the new thread. The first thread information contains four signals each of 4 bits. The four signals correspond to the respective quads in the merge buffer. The 4 bits of each signal correspond to the respective quads in the new thread. For example, the bits of the first thread information on quad Q0 in the merge buffer indicate which of quads Q0 to Q3 in the new thread corresponds to quad Q0 in the thread buffer. Therefore, the first thread information=(1000) on quad Q0 means that quad Q0 in the merge buffer corresponds to quad Q0 in the new thread. The first thread information=(0100) means that quad Q0 in the merge buffer corresponds to quad Q1 in the new thread. Further, the first piece of thread information=(1000) on quad Q1 in the merge buffer means that quad Q1 in the merge buffer corresponds to quad Q0 in the new thread.

Now, the second thread information will be described with reference to FIG. 21. The second thread information indicates whether or not to contain the latest quad in the new thread. The second thread information contains four signals each of 4 bits. The four signals correspond to the respective latest quads Q0 to Q3. The 4 bits of each signal correspond to the respective quads in the new thread. For example, the second thread information=(1000) on the latest quad Q0 indicates that the latest quad Q0 corresponds to quad Q0 in the new thread. The second thread information=(0100) means that the latest quad Q0 corresponds to quad Q1 in the new thread. The second thread information=(1000) on the latest quad Q1 means that the latest quad Q1 corresponds to quad Q0 in the new thread.

Now, the third thread information will be described with reference to FIG. 22. The third thread information indicates whether or not to hold the latest quad in the merge buffer. The third thread information contains four signals each of 4 bits. The four signals correspond to the respective latest quads Q0 to Q3. The 4 bits of each signal correspond to the respective quads in the merge buffer. For example, the third thread information=(1000) on quad Q0 indicates that the latest quad Q0 corresponds to quad Q0 in the merge buffer. The third thread information=(0100) means that the latest quad Q0 corresponds to quad Q1 in the merge buffer. The third thread information=(1000) on the latest quad Q1 means that the latest quad Q1 corresponds to quad Q0 in the merge buffer.

The thread generation unit 46 determines whether or not to perform a quad merge operation. To perform a quad merge operation, the thread generation unit 46 sends the stamp data in the merge buffer to the overlap detection unit 45, which then processes the stamp data. The thread generation unit 46 also generates data to be thread holding unit 47, on the basis of merge determinations. The thread generation unit 46 further generates thread IDs and receives the XY tag corresponding to the stamp in the merge buffer from the overlap detection unit 45. The thread generation unit 46 transfers the data to the thread holding unit 47. Once the stamp in the merge buffer is merged with the all the quads in the new stamp, the thread generation unit 46 sends the new stamp data to the overlap detection unit 45, which then processes the stamp data.

Figure 23:
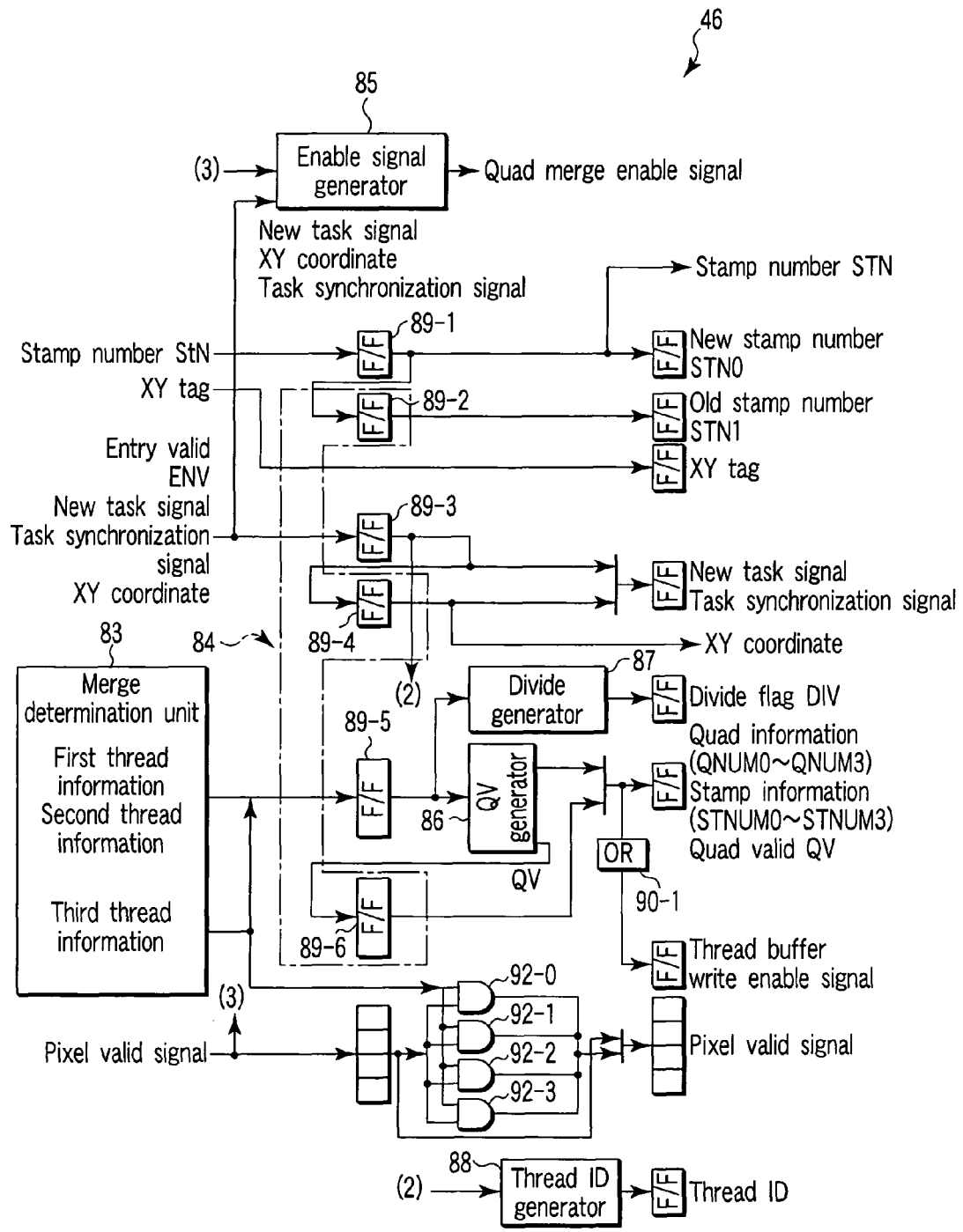
FIG. 23 is a block diagram of a thread generation unit of the graphic processor in accordance with the first embodiment of the present invention.

FIG. 23 is a block diagram of the thread generation unit 46. An area in which the first to third thread information is generated is omitted in FIG. 23. As shown in the figure, the thread generation unit 46 includes a merge determination unit 83, a merge buffer 84, an enable signal generator 85, a QV generator 86, a divide flag (DIV) generator 87, a thread ID generator 88, F/Fs 89-1 to 89-6, an OR gate 90, and AND gates 92-0 to 92-3.

The merge determination unit 83 generates the first to third thread information.

F/F 89-1 latches the stamp number STN. F/F 89-3 latches the stamp number STN, new task signal, task synchronization signal, and XY coordinate. F/F 89-5 latches the first to third thread information.

F/F 89-2 latches the data latched by F/F 89-1 again. That is, the new stamp number STN0 is held in F/F 89-1. The old stamp number STN1 is held in F/F 89-2. F/F 89-4 latches the data latched by F/F 89-3 again. F/F 89-6 latches an output from the QV generator 86. F/Fs 89-2, 89-4, and 89-6 form the merge buffer 84.

The enable signal generator 85 determines whether or not to perform a quad merge operation and generates a quad merge enable signal for a quad merge operation. The conditions under which a quad merge operation is to be performed are as follows.

XY coordinate of the quad in the merge buffer 84 is the same as that of the new stamp to be merged.

There is no duplication between the pixel valid signals for the quads (remaining from the last merge) in the merge buffer 84 and the pixel valid signals for the new stamp to be merged.

New task signal=0, that is, the stamp is not the first in the task.

Figure 24:
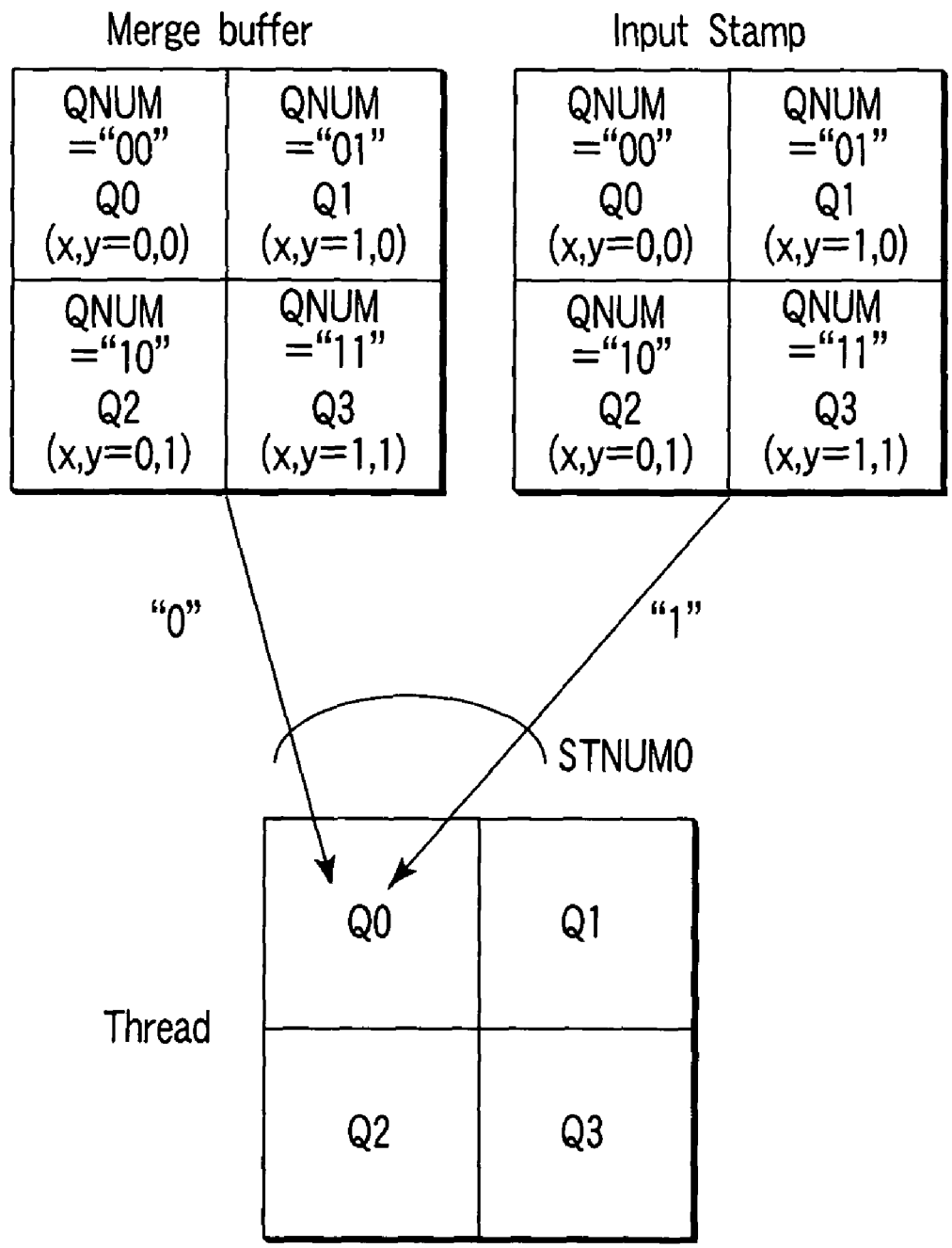
FIG. 24 is a conceptual drawing showing how a quad merge operation is performed by the graphic processor in accordance with the first embodiment of the present invention.

The QV generator 86 generates a quad valid signal QV, stamp information (STNUM0 to STNUM3), and quad information (QNUM0 to QNUM3) on the basis of the first to third thread information. The quad valid signal QV generated by the QV generator 86 is the current quad valid signal to be output to the thread holding unit 47. The stamp information STNUM0 to STNUM3 and the quad information (QNUM0 to QNUM3) indicate how a quad merge operation has been performed. The information STNUM0 to STNUM3 and QNUM0 to QNUM3 will be described with reference to FIG. 24.

As shown in the figure, the stamp information STNUM0 to STNUM3 indicate whether each of quads Q0 to Q3 in the new thread corresponds to a quad in the stamp in the merge buffer 84 or a quad in the new stamp. For example, each of the stamp information STNUM0 to STNUM3 is a 1-bit signal. Stamp information of "0" indicates a stamp in the merge buffer, whereas stamp information "1" indicates a new stamp. More specifically, for STNUM0="0", quad Q0 in the new thread corresponds to a quad in the stamp in the merge buffer. For STNUM0="1", quad Q0 in the new thread corresponds to a quad in the new stamp. For STNUM1="0", quad Q1 in the new thread corresponds to a quad in the stamp in the merge buffer. For STNUM1="1", quad Q1 in the new thread corresponds to a quad in the new stamp. This also applies to STNUM2 and STNUM3.

The quad information QNUM0 to QNUM3 indicate the previous positions of quads Q0 to Q3 in the stamp before the quad merge (specified by STNUM); quads Q0 to Q3 are contained in the new thread. For example, each of the quad information QNUM0 to QNUM3 is a 2-bit signal. Quad information of "00" indicates that the quad is positioned at (x, y=0, 0). Quad information of "01" indicates that the quad is positioned at (x, y=1, 0). Quad information of "10" indicates that the quad is positioned at (x, y=0, 1). Quad information of "11" indicates that the quad is positioned at (x, y=1, 1).

Accordingly, for STNUM="0" and QNUM0="00", quad Q0 in the new thread corresponds to the quad at (x, y=0, 0) in the stamp in the merge buffer. For STNUM="1" and QNUM0="00", quad Q0 in the new thread corresponds to the quad at (x, y=0, 0) in the new stamp.

The quad merge enable signal=0 avoids performing a quad merge operation. In this case, the stamp in the merge buffer is output as a new thread as it is. The input new thread is latched and held in the merge buffer.

The divide flag generator 87 monitors the first to third thread information and sets the divide flag DIV. The divide flag DIV is a flag set when a quad merge operation divides the new stamp into quads, some of which are held in the merge buffer, with the others forming a part of the new thread.

The thread ID generator 88 generates a thread ID (TDID) every time a quad merge operation is finished, and applies the thread ID generated to the new thread. The thread ID generator 88 contains a counter that is incremented for every new thread generated, and outputs the counter value as a thread ID.

The stamp number STN of the merge buffer 84 is STN0 and the stamp number STN of the new stamp is STN1 as previously described. This means that all the quads are stored in the merge buffer even without the performance of a quad merge operation. STN0 is registered in the overlap detection unit 45. When the merge buffer 84 contains quads and a new stamp is input, STN of the merge buffer 84 becomes STN0. Merging all the quads changes STN of the new stamp to STN0.

The quad valid signal QV, pixel valid signal, stamp number STN, XY coordinate, and new task signal are held in the merge buffer 84. These signals are latched when a new stamp is input to the thread generation unit 46, and are held until the next new stamp is input.

A thread buffer write enable signal enables a write operation on the thread holding unit 47. With the pixel valid signal set, that is, when the merge buffer 84 contains data and the next new stamp is input, the thread buffer write enable signal is set and written to the thread holding unit 47.

Now, the thread holding unit 47 will be described. The thread holding unit 47 has a table that can hold information on threads as shown in FIG. 25. As shown in the figure, the table includes, for example, eight entries in which information on threads can be held. Up to, for example, eight entries are available. Each entry holds information on a thread, that is, the flags ENV, END, NEWT, RDY, RUN, PLCNT, PL, SPID, TDID, PC, LCK, TLC, XY tag, STN0, STN1, QV, STNUM0 to STNUM3, and QNUM0 to QNUM3. The meanings of these flags will be described below.

ENV is a valid flag of each entry. The use of any of the entries in FIG. 25 sets ENV corresponding to the entry. END is a flag indicating that the process has reached an end instruction. The end instruction is the last instruction of an instruction sequence for a process executed on the thread. NEWT is a flag set for the last thread belonging to a new task. RDY is a flag indicating whether or not the entry (thread) can be executed, that is, whether or not the process may be started. RUN is a flag indicating whether or not the entry is being executed. PLCNT is a flag indicating a preload counter. Preloading is a request to prefetch, from a data cache, a data area for a thread that has been completely processed by the instruction control unit 35. PLCNT has a value corresponding to the number of cycles counted down before the issuance of the preload instruction, and after the issuance, exhibits a decode value for the order of preload instruction issuances. PL is a flag indicating a preload state, that is, whether or not the preload instruction can be issued. SPID is the number of a subpass being executed or the next subpass to be executed. The subpass will be described below in detail. PC is an execution start program counter. LCK is a flag indicating whether or not the thread has a lock. The lock will also be described below. TLC is a flag indicating the number of texture load instructions TLD for which data, has not been loaded. The texture load instruction TLD instructs texture data to be loaded into the texture unit 33.

Now, the configuration of the thread holding unit 47 will be described with reference to FIG. 26 that is a block diagram of the thread holding unit 47. As shown in the figure, the thread holding unit 47 includes a thread register group 94, a preload block 95, an update unit 96, a thread issuance control unit 97, a texture load control unit 98, an interface 99, and a comparison unit 100.

Figure 27:
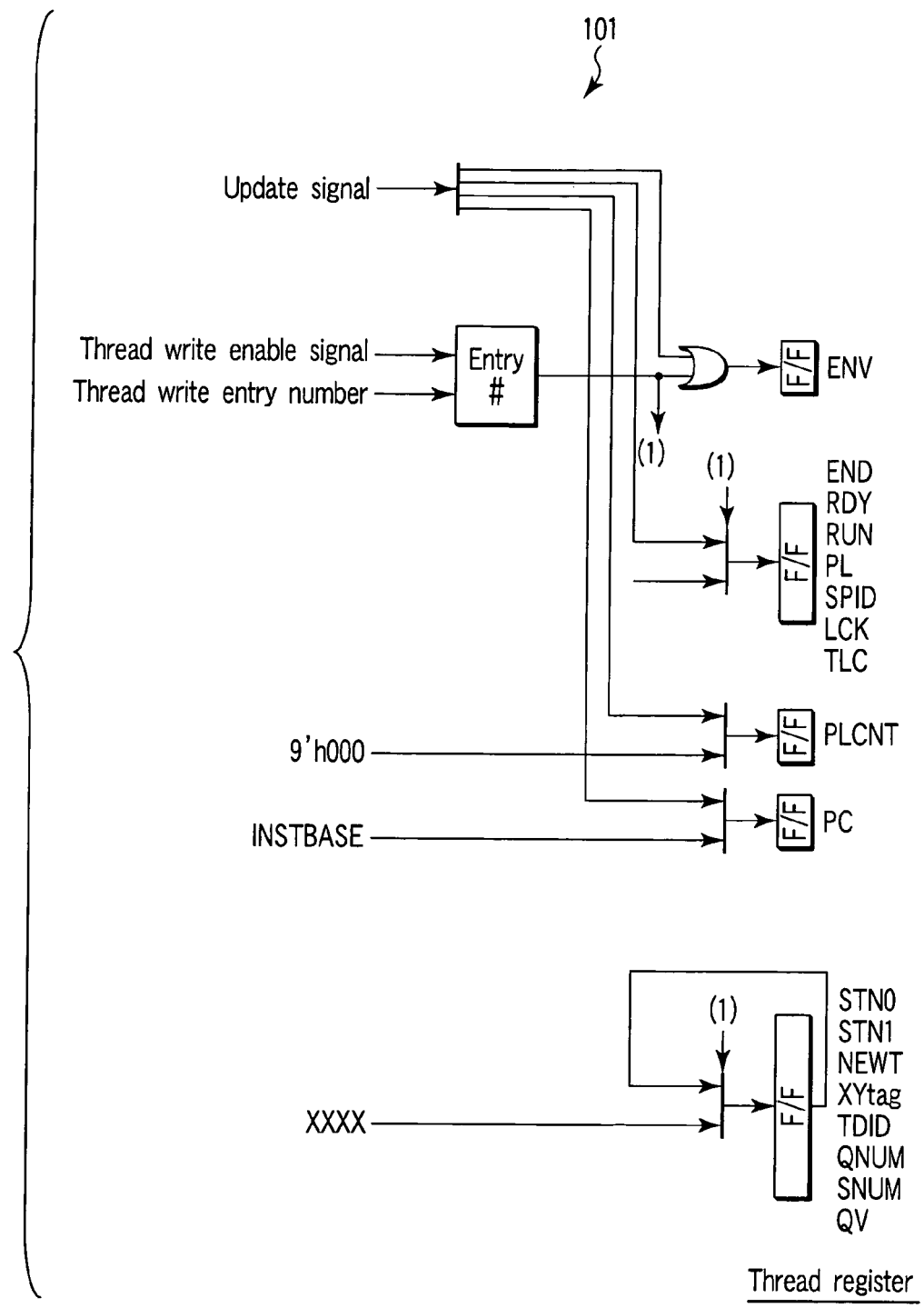
FIG. 27 is a block diagram of a register of the thread holding unit provided in the graphic processor in accordance with the first embodiment of the present invention.

The thread register group 94 includes M registers 101. The registers 101 correspond to entries 0 to (M−1), respectively, in the table shown in FIG. 25. FIG. 27 is a block diagram of the register 101.

As shown in the figure, the flags (ENV, END, RDY, RUN, PLCNT, PL, SPID, PC, LCK, and TLC) to which data is sent by the update unit 96, that is, the flags the states of which are updated are written to F/F every cycle. For STN0, STN1, NEWT, XY tag, TDID, QNUM0 to QNUM3, STNUM0 to SYNUM3, and QV (these signals are hereinafter collectively referred to as XXXX), the same signal is written to F/F every cycle.

If the thread enable signal is asserted and the write entry number for the thread holding unit matches the entry number in the register 101, the valid flag ENV of the register 101 is asserted. The signal XXXX is also newly written to F/F. For PLCNT and PC, values (9'h000 and INSTBASE) in the configuration register 41 are written to F/F. END, RDY, RUN, PL, SPID, LCK, and TLC are each set to zero.

Figure 28:
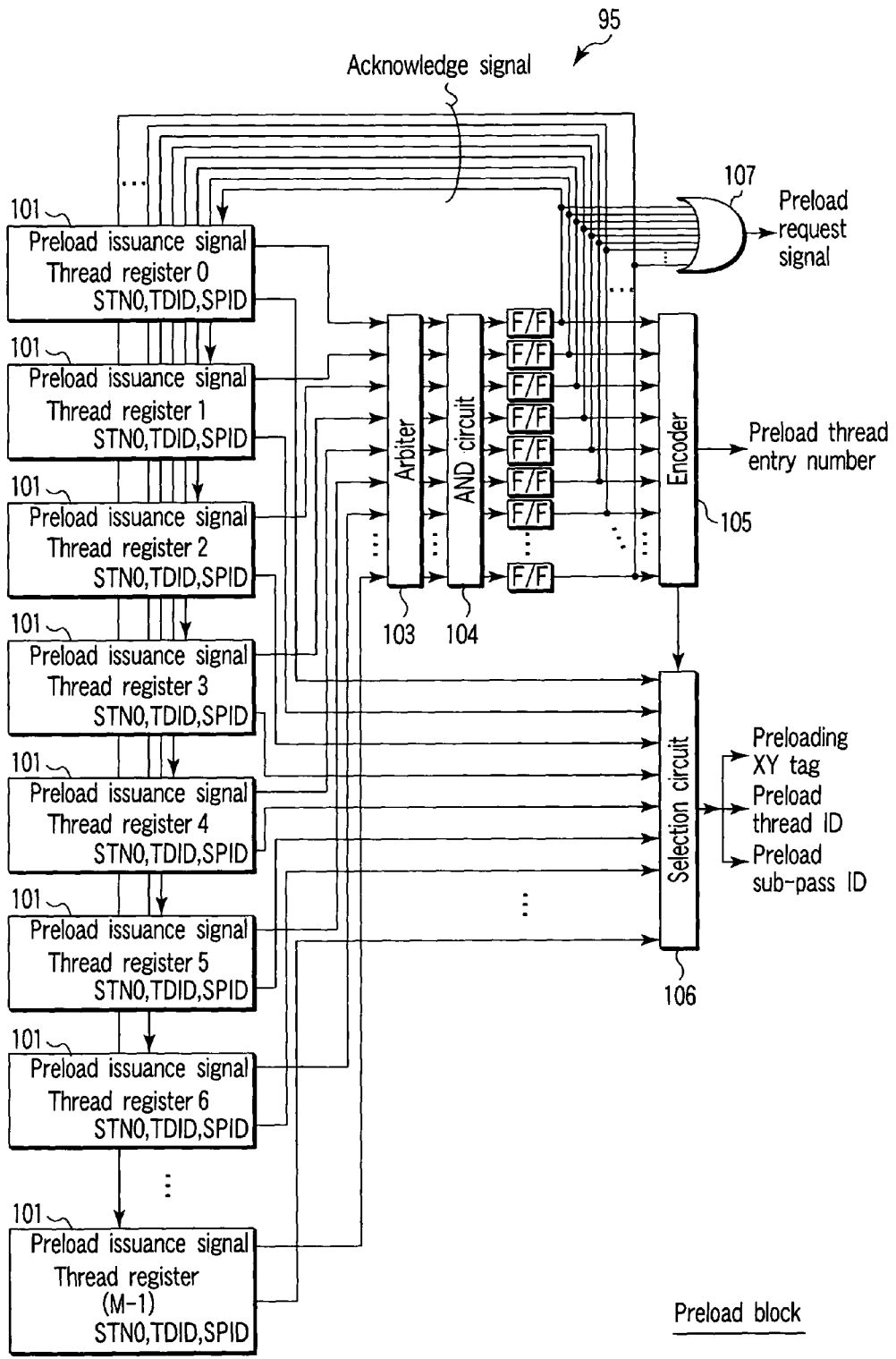
FIG. 28 is a block diagram of a preload block of the thread holding unit provided in the graphic processor in accordance with the first embodiment of the present invention.

Now, the preload block 95 will be described. FIG. 28 is a block diagram of the preload block 95. The preload block 95 generates a signal required for data cache preloading. A preload state involves plural states. The preload state is denoted by PL.

In FIG. 28, the registers 101 corresponding to the entries 0 to (M−1) in the thread holding unit each assert a preload issuance signal when the preload state PL changes from a state PLWAT to a state PLREQ. PLWAT indicates an initial state in which neither a thread or the preload instruction has been issued. In the state PLREQ, the issuance of the preload instruction is requested.

An arbiter 103 receives the asserted preload issuance signal to select an entry in order of entries 0 to (M−1) in accordance with the request. An AND gate 104 outputs an M-bit signal based on the selection by the arbiter 103. The M bits correspond to the entries 0 to M in the thread holding unit and serve as acknowledge signals for the respective entries. For example, selection of entry 0 by the arbiter 103 allows the AND gate 104 returns acknowledgement to entry 0.

Further, an encoder 105 encodes the acknowledge signal. The encoding result is latched in F/F twice, and a preload thread entry number indicating the entry number in the thread holding unit is output.

An OR gate 107 monitors the acknowledge signal. When any of the M acknowledge signals is asserted, the OR gate 107 allows a preload request signal to be asserted.

In accordance with the result of encoding executed by the encoder 105, the selector 106 reads a stamp number (STN0), a thread ID (TDID), and a subpass ID (SPID) from any of entries 0 to (M−1) and allows F/F to latch them. Then, a preloading XY tag is output in order to read an XY coordinate from the XY table. A preload thread ID and a preload subpass ID are further output which indicate the thread ID and subpass ID, respectively.

Now, the update unit 96 will be described. The update unit 96 updates the flags (ENV, END, RDY, RUN, PLCNT, PL, SPID, PC, LCK, and TLC states) for each entry in the thread holding unit. The update unit 96 includes M sections 102 corresponding to entries 0 to (M−1), respectively. Each section 102 includes an update logic for updating the statuses. The update logic will be described below.

<END Update Logic>

The flag END indicates that the end instruction has been reached and is cleared when a thread is generated. The update logic sets the END flag when the end instruction is asserted and when the executing thread entry number is the same as the entry number of the entry. The END is not cleared until the valid flag ENV meets the conditions for dequeue. Therefore, setting END prevents an instruction from being erroneously executed again.

<ENV Update Logic>

Figure 29:
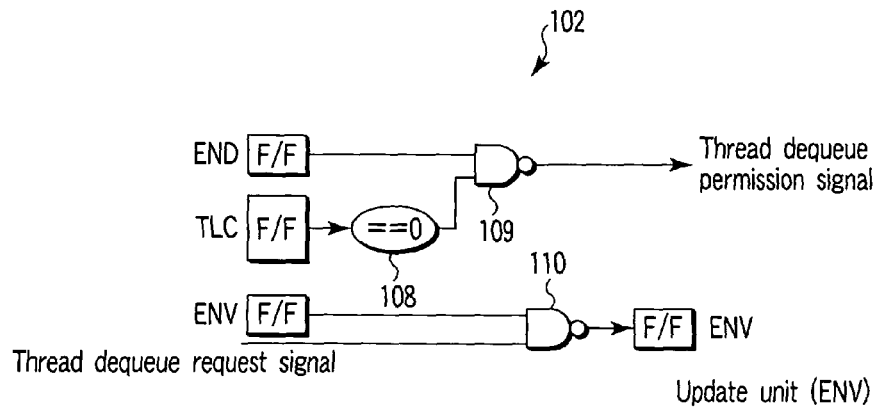
FIG. 29 is a block diagram of an update logic of a valid flag of the thread holding unit provided in the graphic processor in accordance with the first embodiment of the present invention.

FIG. 29 is a circuit diagram of the update logic for the valid flag ENV. ENV is set when a thread is generated. With the update logic, the comparator 108 outputs "High" when TLC==0. The NAND gate 109 performs a NAND operation on an output from the comparator 108 and END. The NAND operation result is provided to the thread holding unit as a thread dequeue request signal. When the END is set and TLC=0, the dequeue request signal is asserted for the dequeue block of the thread holding unit. A thread dequeue permission signal provided by the dequeue block is then asserted to clear the valid flag.

<PL Update Logic>

Figure 30:
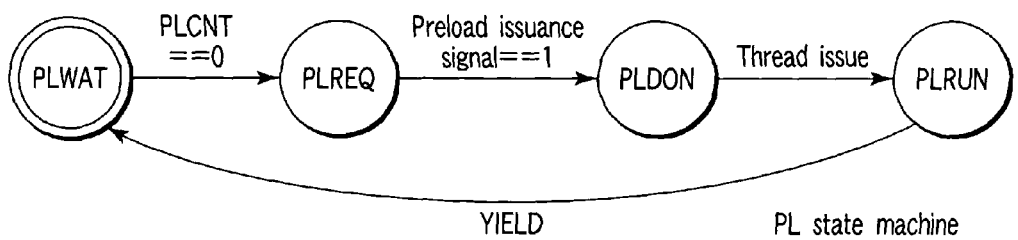
FIG. 30 is a state transition diagram of a preload state of the thread holding unit provided in the graphic processor in accordance with the first embodiment of the present invention.

FIG. 30 shows the states of PL. PL involves four states, PLWAT, PLREQ, PLDON, and PLRUN. PLWAT indicates an initial state in which neither a thread or the preload instruction has been issued. In the state PLREQ, the issuance of the preload instruction is requested. In the state PLDON, the issuance of the preload instruction has been finished but the issuance of a thread has not been started yet. In the state PLRUN, the thread is executed.

PL is set to PLWAT when the thread holding unit starts to hold the thread or when during PL=PLRUN, the yield instruction is asserted. During PL=PLWAT, setting PLCNT=0 sets PL to PLREQ. During PL=PLREQ, asserting the preload issuance signal corresponding to the entry sets PL to PLDON. During PL=PLDON, issuing the thread corresponding to the entry to the drawing processing section 36 sets PL to PLRUN.

<PLCNT Update Logic>

Figure 31:
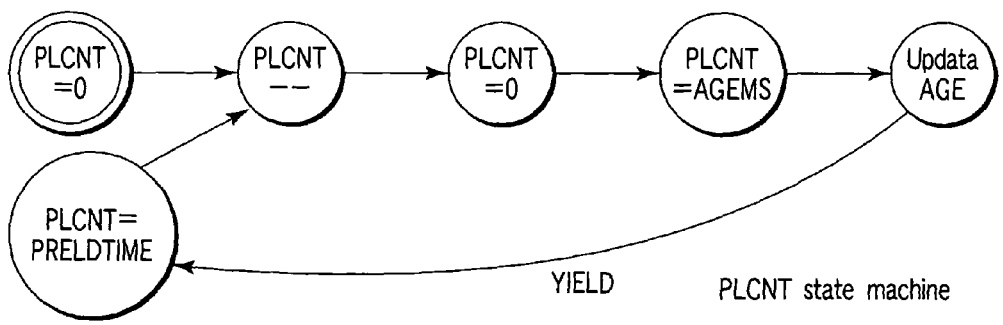
FIG. 31 is a state transition diagram of a preload counter of the thread holding unit provided in the graphic processor in accordance with the first embodiment of the present invention.

FIG. 31 shows the states of PLCNT. Asserting the yield instruction loads PRELDTIME into PLCNT. During PL=PLWAT, PLCNT is counted down. PL remains in the state PLWAT until the cycle in which PLCNT becomes 0. This allows the counting-down operation to further continue during PLCNT=0 and until −1 (0x1FF). At this time, PL changes to the state PLREQ, preventing PLCNT from becoming −2. Further, when PLCNT becomes −1, PL has already changed to the state PLREQ. Accordingly, PLCNT may be in any state, making it possible to inhibit malfunctioning. When PL changes to PLREQ, the counter initial value AGEMS of a master age counter is set in PLCNT. That is, AGEMS is set in a cycle following the one in which PLCNT becomes −1. In the cases other than those described above, issuing any thread asserts the corresponding run set signal (described below). The same bit position of PLCNT is thus cleared to correctly reflect the value AGE. The master age register will be described below in detail.

Figure 32:
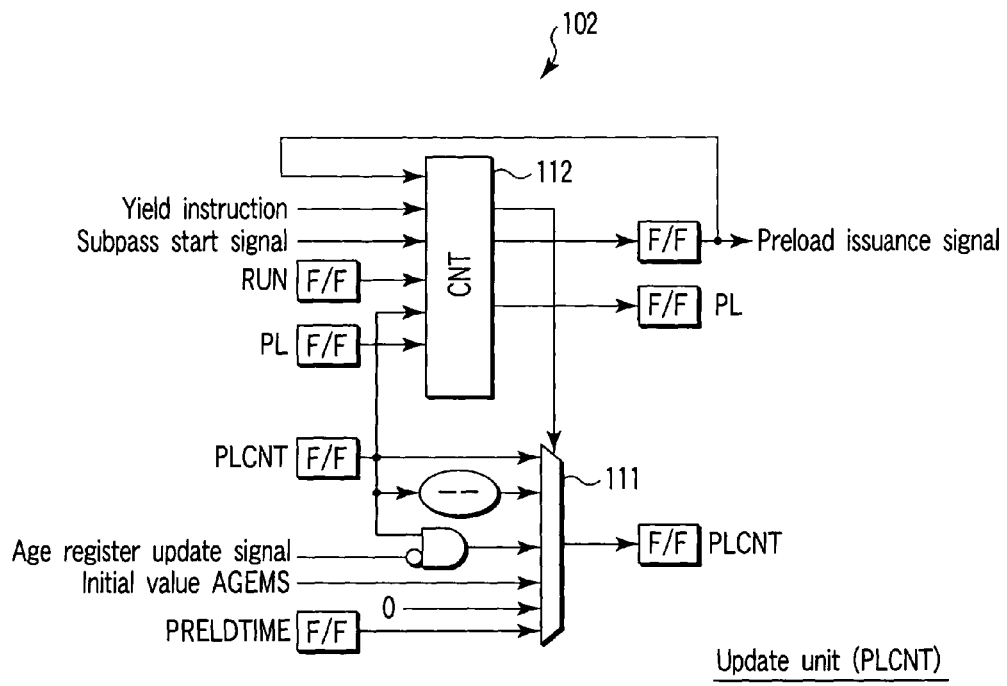
FIG. 32 is a block diagram of an update logic for the preload counter of the thread holding unit provided in the graphic processor in accordance with the first embodiment of the present invention.

FIG. 32 is a circuit diagram of the PLCNT update logic. As shown in the figure, a selection circuit 111 selects one of PLCNT, the counted-down PLCNT, the result of an AND operation on PLCNT, an inverted age register update signal, AGEMS, "0", and PRELDTIME and determines it to be PLCNT. The selection circuit 111 performs a selecting operation on the basis of control of a control circuit 112. The control circuit controls the selecting operation of the selection circuit 111 on the basis of various signals. A specific method for controlling the selecting operation is as described above with reference to FIG. 31. The age register update signal and AGEMS will be described below.

<LCK Update Logic>

Figure 33:
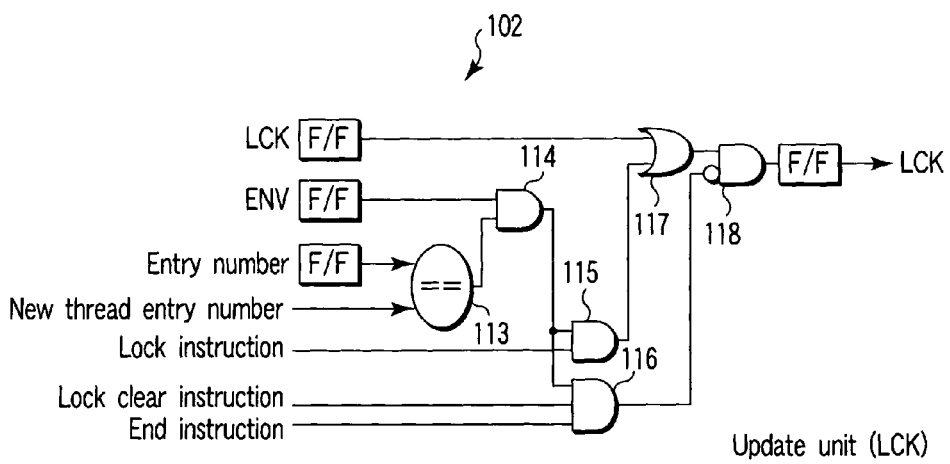
FIG. 33 is a block diagram of an update logic of a lock flag of the thread holding unit provided in the graphic processor in accordance with the first embodiment of the present invention.

FIG. 33 shows an update logic of a lock flag LCK. As shown in the figure, a comparator 113 compares the entry number with a new thread entry number. The new thread entry number is for a thread that is newly generated and written to the thread holding unit. An AND gate 114 performs an AND operation on an output from the comparator 113 and ENV. An AND gate 115 performs an AND operation on an output from the AND gate 114 and a lock instruction. An AND gate 116 performs an AND operation on an output from the AND gate 114, a lock clear instruction, and the end instruction. An OR gate 117 performs an OR operation on an output from the AND gate 115 and LCK. An AND gate 118 performs an AND operation on an output from the OR gate 117 and an output from the AND gate 116. An output from the AND gate 118 corresponds to a new LCK.

In the above configuration, asserting the lock instruction sets the LCK of the entry matching the new thread entry number. Asserting the lock clear instruction or end instruction clears LCK of the entry matching the executing thread entry number.

<TLC Update Logic>

Figure 34:
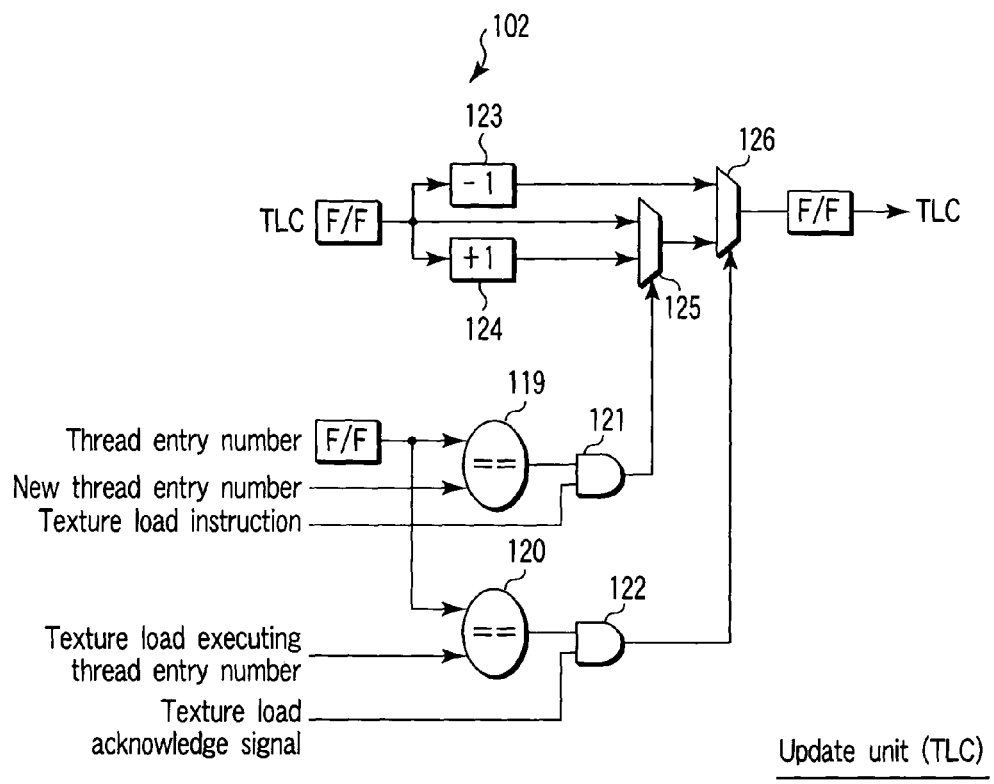
FIG. 34 is a block diagram of an update logic for a textured load counter of the thread holding unit provided in the graphic processor in accordance with the first embodiment of the present invention.

FIG. 34 shows an update logic of a TLC. As shown in the figure, a comparator 119 compares the new thread entry number with the thread entry number of the entry. A comparator 120 compares, during the execution of the texture load instruction, the executing thread entry number for texture loading with the entry number of the entry. An AND gate 121 performs an AND operation on an output from the comparator 119 and the texture load instruction. An AND gate 122 performs an AND operation on an output from the comparator 120 and a texture load acknowledge signal. The texture load acknowledge signal indicates that the execution of the texture load instruction has been completed. A subtractor 123 subtracts one from TLC. An adder 124 adds one to TLC. A selection circuit 125 selects either TLC that has not been subjected to an addition by the adder 124 yet or TLC that has already been subjected to an addition by the adder 124, on the basis of an output from the AND gate 121. A selection circuit 126 selects either an output from the subtractor 123 or an output from the selection circuit 125, on the basis of an output from the AND gate 122. The signal selected by the selection circuit 126 corresponds to a new TLC.

The update logic of the TLC counts the number of times that the texture load instruction is executed during the execution of a subpass. During the execution of the texture load instruction, the texture load instruction is asserted. At this time, the value in the TLC field of the entry matching the new thread entry number is incremented by one. For the count for the texture load instruction, the number of times that the thread actually executes the texture load instruction is dynamically counted instead of executing the counting during the first execution in the subpass and using the same value for all the subsequent threads. This is because the number of executions of the texture load instruction may vary depending on the execution state of a branching instruction.

Once the texture load acknowledge signal is asserted and the entry number matches the entry number of the thread that executes texture loading, TLC is counted down.

<SPID Update Logic>

Figure 35:
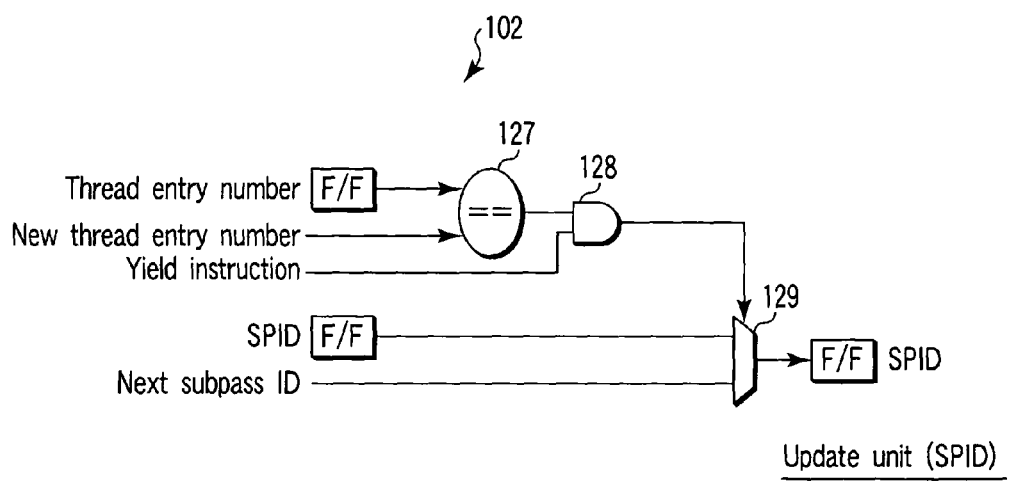
FIG. 35 is a block diagram of an update logic of a subpass ID of the thread holding unit provided in the graphic processor in accordance with the first embodiment of the present invention.

Now, an update logic of an SPID will be described with reference to FIG. 35. As shown in the figure, the update logic includes a comparator 127, an AND gate 128, and a selection circuit 129. The comparator 127 compares the entry number of the entry with the new thread entry number. The AND gate 128 performs an AND operation on an output from the comparator 127 and the yield instruction. The selection circuit 129 selects either SPID or the next subpass ID on the basis of an output from the AND gate 128. The selection circuit 129 then determines the selected ID to be a new SPID.

Asserting the yield instruction allows the update logic of the SPID to increment SPID of the corresponding entry. For the end instruction, dequeuing takes place immediately after assertion, eliminating the need for incrementation.

<PC Update Logic>

Figure 36:
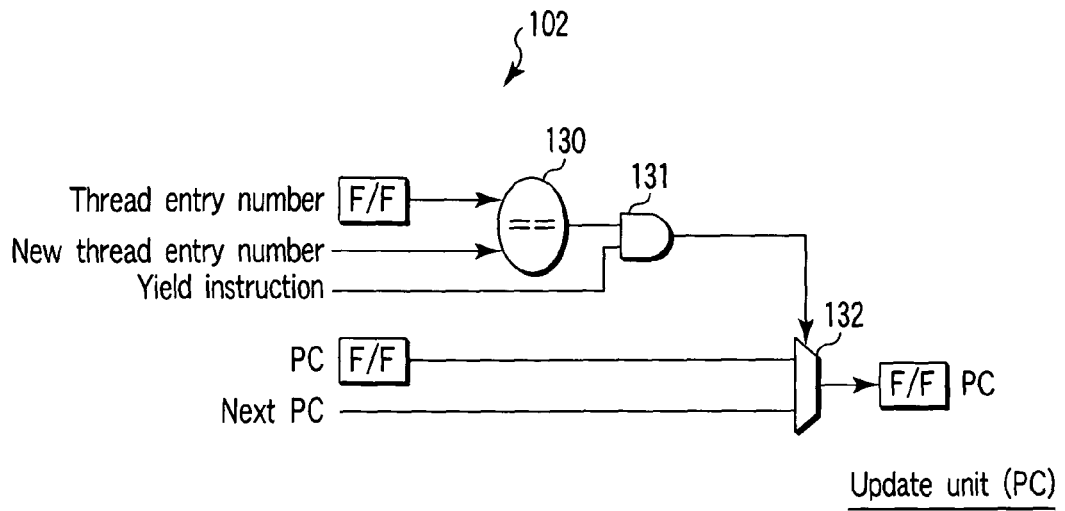
FIG. 36 is a block diagram of an update logic of a program counter of the thread holding unit provided in the graphic processor in accordance with the first embodiment of the present invention.

Now, an update logic of a PC will be described with reference to FIG. 36. As shown in the figure, PC update logic corresponds to the SPID update logic in which SPID and the next subpass ID are replaced with PC and the next PC.

The update logic of the PC loads INSTBASE into PC when a thread is generated. Asserting the yield instruction sets the next PC for PC of the entry matching the new thread entry number. That is, PC is incremented.

<RDY Update Logic>

Figure 37:
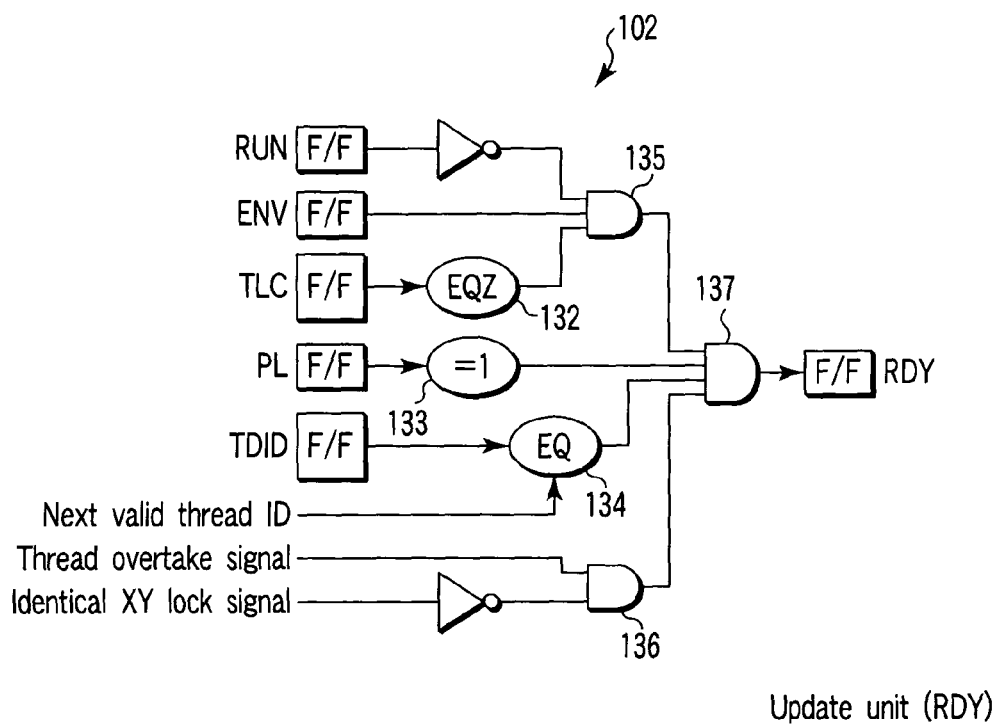
FIG. 37 id a block diagram of an update logic of a ready flag of the thread holding unit provided in the graphic processor in accordance with the first embodiment of the present invention.

Now, an update logic of a RDY will be described with reference to FIG. 37. As shown in the figure, a detector detects whether or not TLC is zero. A detector 133 detects whether or not PL is 1. A detector 134 detects whether or not TDID is equal to the next valid thread ID. An AND gate 135 performs an AND operation on an inverted RUN, ENV, and an output from the detector 132. An AND gate 136 performs an AND operation on a thread overtake signal and an inverted identical XY lock signal. An AND gate 137 performs an AND operation on an output from the AND gate 135, outputs from the detectors 133 and 134, and an output from the AND gate 136. An output from the AND gate 136 corresponds to a new RDY.

The thread overtake signal indicates whether or not a process for entries 0 to (M−1) has temporally overtaken a process for the preceding thread. The identical XY lock signal indicates that an entry having an XY coordinate identical to that of an entry of interest is present and has a lock. The lock is an instruction that prohibits the issuance of a thread for an entry with the identical XY coordinate.

The update logic of the RDY sets the RDY when the thread gets ready to be executed. The thread gets ready to be executed when all of the following conditions are met.

ENV=1: valid entry.
RUN=0: not an entry being executed.
TLC=0: loading of the texture load has been finished.
Identical XY lock signal=0: a thread holding unit entry having an XY coordinate identical to that of an entry of interest does not take a lock. That is, LCK of that entry has been cleared to zero.
Thread overtake signal corresponding to the entry is 1.
PL=1: preloading has already been started.
The thread ID of the entry is not identical to the next thread that is valid in the thread holding unit.

Starting the execution of the thread and setting RUN prevents the RDY establishment conditions from being met. RDY is thus cleared.

<RUN Update Logic>

Figure 38:
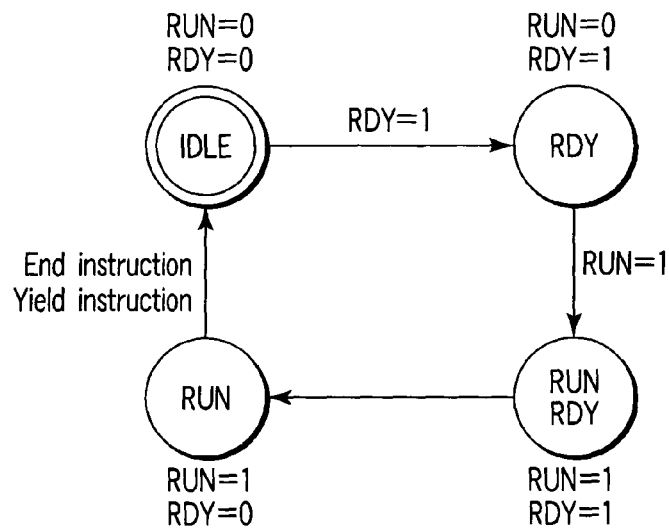
FIG. 38 is a state transition diagram showing how the thread holding unit operates during wakeup.

Now, an update logic of a RUN will be described. When an entry is issued (woken up), the RUN and RDY states are associated with each other. This is shown in FIG. 38. As shown in the figure, making the entry ready to be issued sets RDY (RDY=1). Then, selecting and issuing one of the entries for which RDY is set sets RUN (RUN=1). During the next cycle, RDY is cleared (RUN=1, RDY=0). Then, when the selected thread executes the end or yield instruction, RUN is cleared to bring the circuit back into an idle state (RUN=0, RDY=0).

Figure 39:
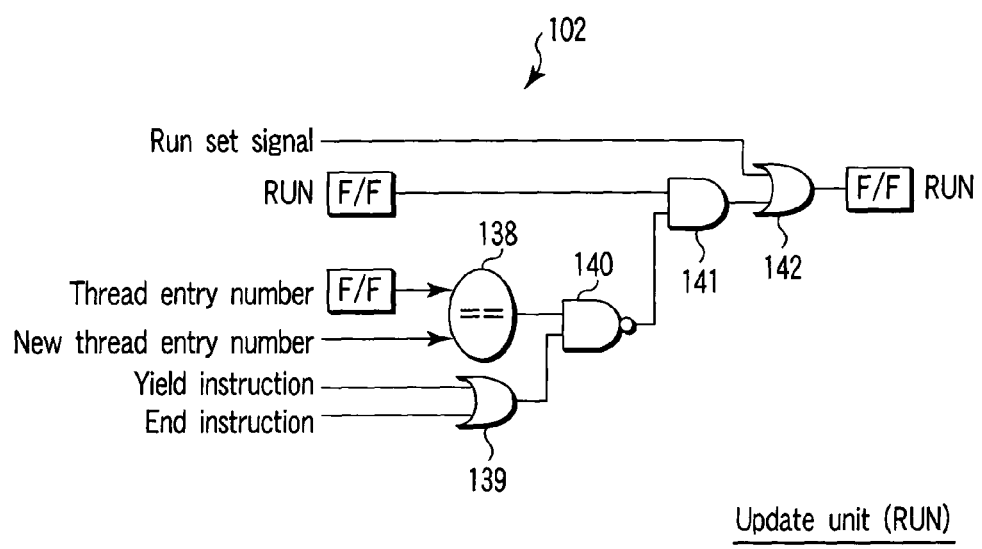
FIG. 39 is a block diagram of an update logic of a run flag of the thread holding unit provided in the graphic processor in accordance with the first embodiment of the present invention.

FIG. 39 is a circuit diagram of the update logic of the RUN. As shown in the figure, a comparator 138 compares the entry number of the entry with the new thread entry number. An OR gate 139 performs an OR operation on the yield and end instructions. A NAND gate 140 performs an OR operation on an output from the comparator 138 and an output from the OR gate 139. An AND gate 141 performs an AND operation on an output from the NAND gate 140 and RUN. An OR gate 142 performs an OR operation on an output from the AND gate 141 and the run set signal. An output from the OR gate 142 corresponds to RUN.

In the above configuration, asserting the yield or end instruction clears the RUN of an entry with a thread entry number identical to that of the thread being executed. Asserting the run set signal provided by the thread issuance control unit 97 sets RUN. RUN is set under the following conditions.

For all the entries in the thread holding unit, RUN is zero or is cleared.
RDY=1.
Bit for which PLCNT is set is closest to LSB (Least Significant Bit). As such a bit is closer to LSB, preloading is started earlier. MSB is set for those of the stamps for subpass 0 which have not been preloaded. These stamps thus have the lowest priority.

Figure 41:
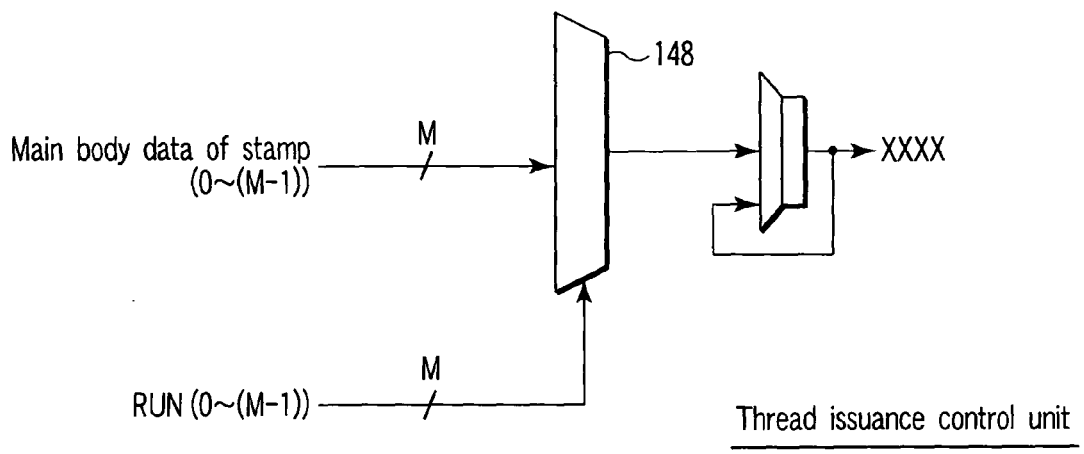
FIG. 41 is a circuit diagram of the thread issuance control unit of the thread holding unit provided in the graphic processor in accordance with the first embodiment of the present invention.

Now, the thread issuance control unit 97 in FIG. 26 will be described. FIGS. 40 and 41 are circuit diagrams of the thread issuance control unit 97.

As shown in the figures, the thread issuance control unit 97 includes eight AND gates 143-0 to 143-(M−1), 144-0 to 144-(M−1), OR gates 145-0 to 145-(M−1), and NOR gates 146-0 to 146-(M−1) which correspond to the respective entries, as well as an RUN detection unit 147. Each of the AND gates 143-0 to 143-(M−1) performs an AND operation on RDY and PLCNT held in the corresponding one of entries 0 to (M−1). PLCNTs held in entries 0 to (M−1) are hereinafter referred to as PLCNT0 to PLCNT(M−1). Each of the OR gates 145-0 to 145-(M−1) performs an OR operation on all the bits of an output from the corresponding one of the AND gates 143-0 to 143-(M−1). Each of the NOR gates 146-0 to 146-(M−1) performs a NOR operation on an output from the corresponding one of the OR gates 145-0 to 145-(M−1) and RDY held in the corresponding one of entries 0 to (M−1). Each of the AND gates 144-0 to 144-(M−1) perform an AND operation on an output from the corresponding one of the NOR gates 146-0 to 146-(M−1) and an output from the RUN detection unit 147. Outputs from the AND gates 144-0 to 144-(M−1) correspond to run set signals 0 to (M−1).

The RUN detection unit 147 includes NOR gates 147-0 and 147-1 and an OR gate 147-2. The NOR gate 147-0 performs a NOR operation on RUNs held in entries 0 to (M−1). The NOR gate 147-1 performs a NOR operation on the yield and end instructions. The OR gate 147-2 performs an OR operation on outputs from the NOR gates 147-0 and 147-1. An output from the OR gate 147-2 corresponds to an output from the RUN detection unit 147.

The thread issuance control unit 97 also performs an OR operation on AGEMS and the acknowledge signal provided by the preload block. The thread issuance control unit 97 further performs an AND operation on the OR calculation result and a signal obtained by inverting the outputs from the AND gates 144-0 to 144-(M−1). The thread issuance control unit 97 then outputs the calculation result as AGEMS.

Moreover, as shown in FIG. 41, the thread issuance control unit 97 selects and outputs the main body data in the stamps held in entries 0 to (M−1) in the thread holding unit, in accordance with RUNs held in entries 0 to (M−1). The main body data in the stamp includes NEWT, SPID, TDID, STN0, STN1, QV, STNUM0 to STNUM3, and QNUM0 to QNUM3.

In the thread holding unit 47, the register holding PLCNT holds the preload count value. However, after preloading, this register functions as an age register. The function of the age register is to indicate how long the data held in the entry has been present in the thread holding unit 47. The thread issuance control unit 97 generates an age register update signal for updating the age register and an initial value AGEMS to output them to the PLCNT update logic.

Figure 42:
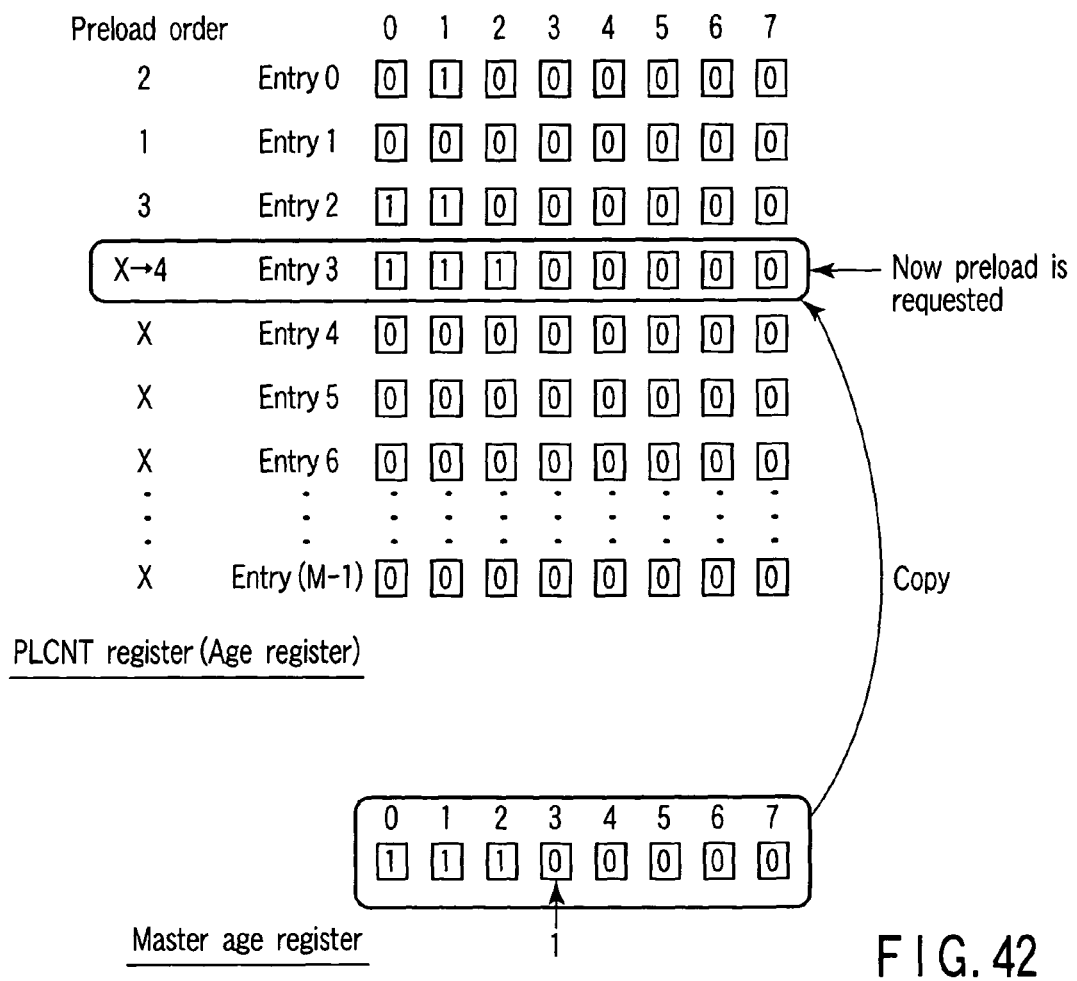
FIG. 42 is a conceptual drawing of an age register of the thread holding unit provided in the graphic processor in accordance with the first embodiment of the present invention.

The thread issuance control unit 97 searches for entries to be issued and sets the RUN of the entries. The thread issuance control unit 97 further references RUN to select one of the entries. Now, description will be given of how the age register operates when the preload instruction or a thread is issued. FIG. 42 is a conceptual drawing showing how the age register operates when the preload instruction is issued. As shown in FIG. 42, the age register has M entries each of which can hold, for example, 8-bit data. The thread holding unit 47 also comprises an 8-bit master age register in which bit positions corresponding to entry numbers for which the issuance of the preload instruction has been finished are set to "1". If the threads with entry numbers 0, 1, and 2 have already finished issuing the preload instruction, bits 0, 1, and 2 in the master age register have been set.

As shown in FIG. 42, it is assumed that with entries 0 to 2 having already issued the preload instruction, entry 3 now issues the preload instruction. Then, the values in the master age register are copied to the registers in the age register which have already issued the preload instruction. This sets the bits corresponding to the entry numbers of the entries having already issued the preload instruction. Subsequently, the corresponding bit (bit 3) in the master age register is set. This is because entry 3 has issued the preload instruction.

Figure 43:
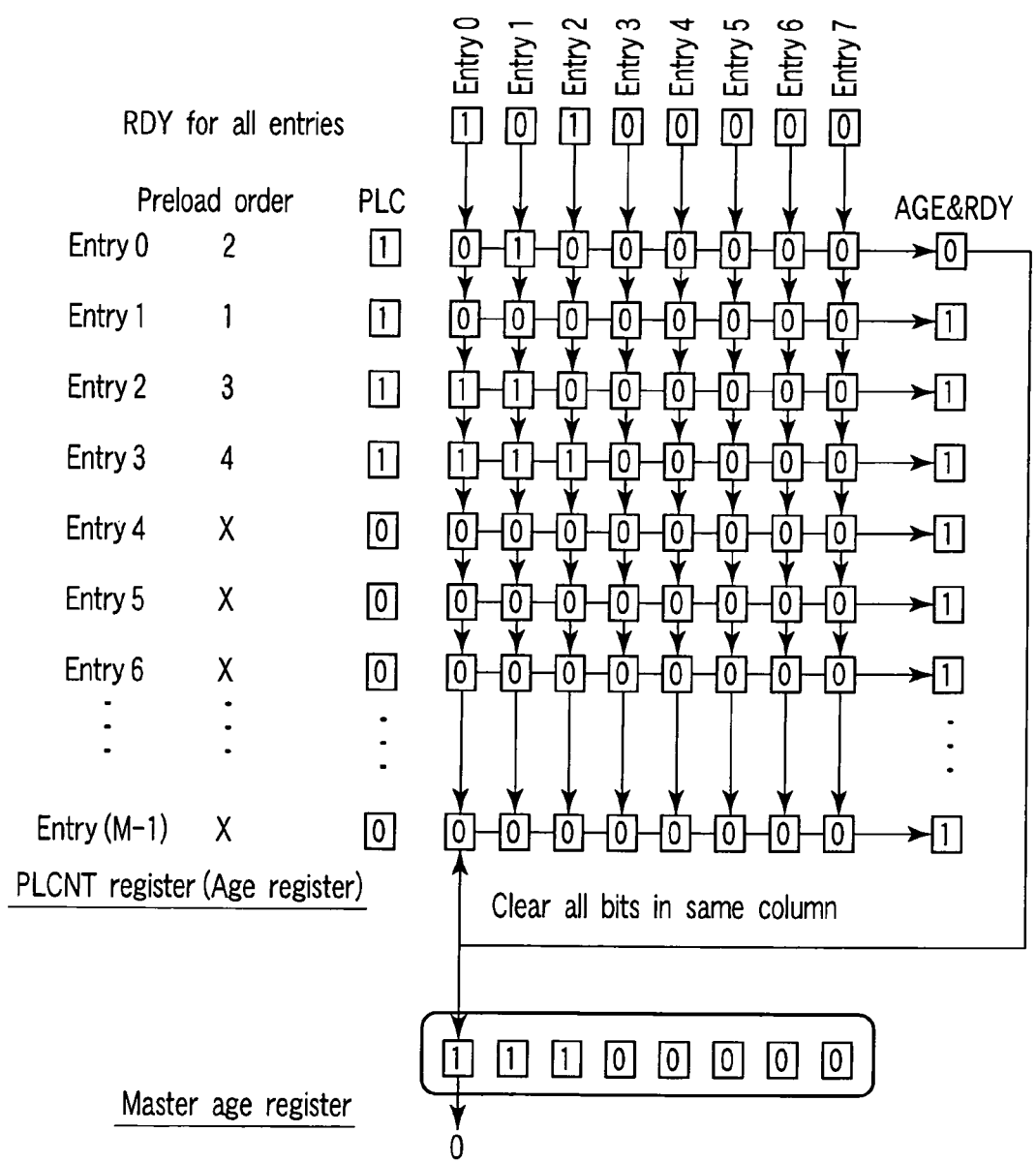
FIG. 43 is a conceptual drawing of the age register of the thread holding unit provided in the graphic processor in accordance with the first embodiment of the present invention.

FIG. 43 is a conceptual drawing showing how the age register operates when a thread is issued. Issuing a thread involves setting RDY and selecting the oldest entry.

In the age register, bit positions corresponding to already preloaded entries are set. Accordingly, referencing the age register makes it possible to determine which entry data is the oldest. An AND operation is then preformed on the bits in the age register and RDY of each entry. Then, the "oldest entry for which RDY has been set" is determined to be the entry for which a subsequent 8-bit reduction OR results in zero and for which RDY has been set. This entry is to be selected. In FIG. 43, entry 0 is to be selected. Although entry 1 is the oldest, RDY has not been set for entry 1. Consequently, the next oldest entry 0 is selected. Selection of the entry clears all the bits (entry 0) in the age register which correspond to the selected entry. This prevents this entry from being selected in the future. This also applies to the master age register.

Now, with reference to FIG. 40, description will be given of operation of the thread issuance control unit 97. The thread issuance control unit 97 selects an entry which is ready and which issued the preload instruction earliest, on the basis of PLCNT and RDY held in each of the M thread holding unit entries. That is, the output from one of the NOR gates 146-0 to 146-(M−1) which corresponds to the entry to be issued is asserted.

Then, one of the run set signals corresponding to the M entries which corresponds to the selected entry is asserted. The run set signal corresponding to each entry is input to the update logic of the entry. Then, on the basis of the run set signal, RUN is set. Asserting the run set signal clears the corresponding bits in the master age register. Further, on the basis of the encode result for RUN, an executing thread entry number is generated. Moreover, on the basis of RUN, one of the entries is selected. The data in the selected entry is output to the drawing processing portion 36. The output signals are a signal subpass start signal, SPID, TDID, the executing thread entry number, PC, STN0, STN1, QV, STNUM0 to STNUM3, and QNUM0 to QNUM3.

Now, description will be given of the comparison unit 100, provided in the thread holding unit 47. FIG. 44 is a circuit diagram of the comparison unit 100. The comparison unit 100 includes M comparison circuits 151-0 to 151-(M−1) the number of which is the same as that of entries in the thread holding unit. The comparison circuits 151-0 to 151-(M−1) references a flag SPTLCK indicating a lock state for the XY tag and entry valid flag ENV of each entry in the thread holding unit and for each entry in the instruction management unit. SPTLCK set to "1" indicates that the entry is locked. The comparison circuits 151-0 to 151-(M−1) determine whether or not, within the M entries in the thread holding unit 47, any combination of entries has the same XY tag.

Specifically, the comparison circuit 151-0 detects whether or not the XY tag held in entry 0 in the thread holding unit 47 is equal to that held in any of the other entries 1 to (M−1). The comparison circuit 151-1 detects whether or not the XY tag held in entry 1 is equal to that held in any of the other entries 0 and 2 to (M−1). The comparison circuit 151-2 detects whether or not the XY tag held in entry 2 is equal to that held in any of the other entries 0, 1, and 3 to (M−1). This also applies to the other comparison circuits.

If any entry has the equal XY tag, an OR operation on this detection result and SPTLCK held in an entry in the instruction control unit which corresponds to this entry is output as an identical XY lock signal. The identical lock signal indicates that the thread holding unit has an entry which holds the same XY coordinate as that of the corresponding entry and which has taken a lock (which is in the lock state).

Figure 45:
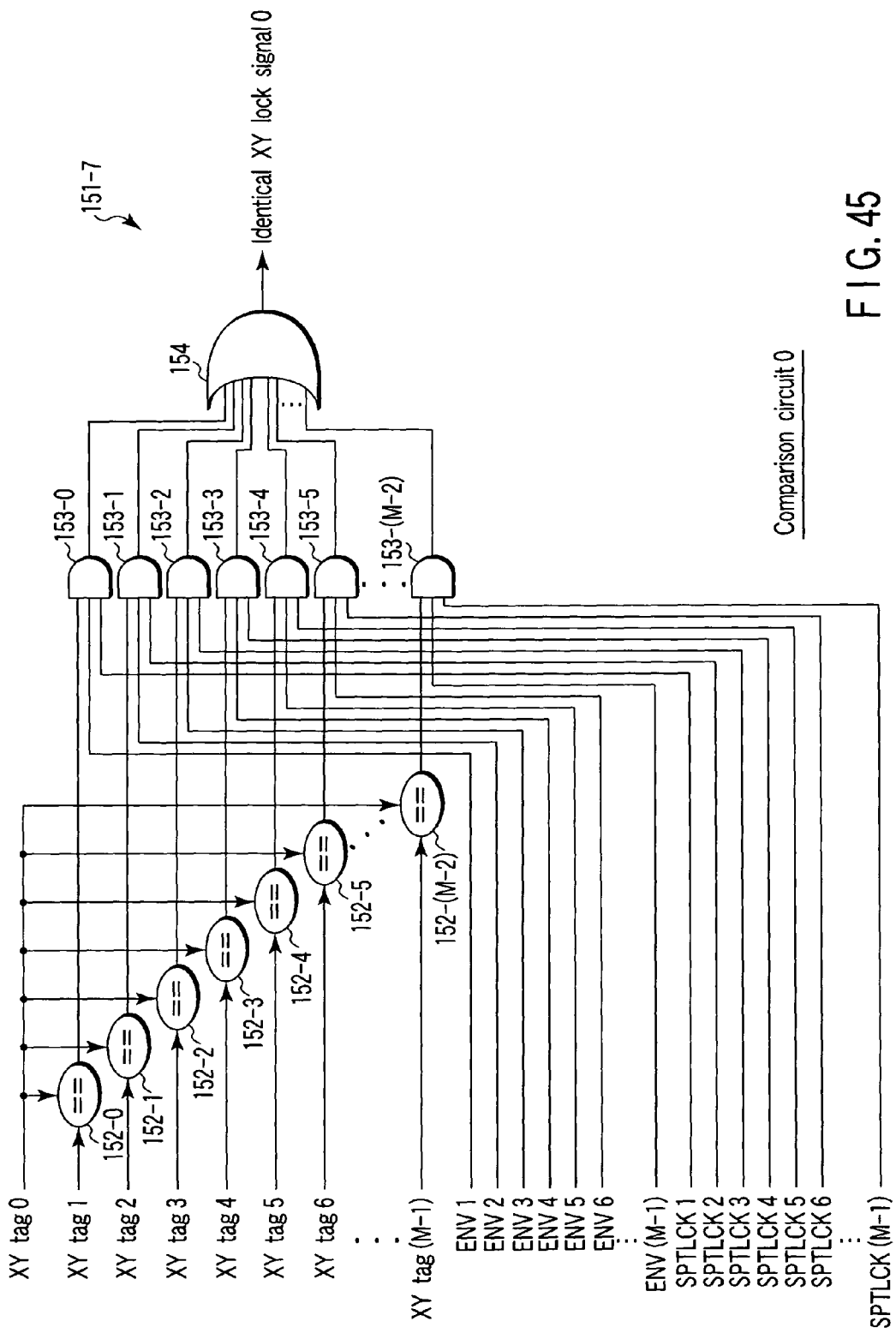
FIG. 45 is a circuit diagram of the comparison unit of the thread holding unit provided in the graphic processor in accordance with the first embodiment of the present invention.

FIG. 45 is a circuit diagram of the comparison circuit in FIG. 44, particularly the comparison circuit 151-0. The comparison circuit 151-0 includes detection units 152-0 to 152-(M−2), AND gates 153-0 to 153-(M−2), and an OR gate 154. Each of the detection units 152-0 to 152-(M−2) compares the XY tag held in the corresponding one of entries 1 to (M−1) with the XY tag held in entry 0 to detect whether or not they are the same. Each of the AND gates 153-0 to 153-(M−2) performs an AND operation on an output from the corresponding one of the detection units 152-0 to 152-(M−2), ENV of corresponding one of entries 1 to (M−1), and SPTLCK of corresponding one of entries 1 to (M−1) in the instruction management unit. The OR gate 154 performs an OR operation on outputs from the AND gates 153-1 to 153-(M−2). An output from the OR gate 154 corresponds to an identical XY signal corresponding to entry 0.

In the above configuration, if the XY tag held in entry 0 is equal to that held in any of the other entries 1 to (M−1), the valid flag ENV of the latter entry is set (ENV="1"), and the latter entry takes a lock (LCK="1"), the outputs from the corresponding AND gates 153-0 to 153-(M−2) become "High". The identical XY lock signal is thus asserted.

The interface 99 in the thread holding unit 47 allows F/F to latch the texture load acknowledge signal transmitted by the texture unit 33.

Now, the instruction management unit 48 in FIG. 7 will be described. The instruction management unit 48 includes a ready queue table. The ready queue table includes M entries as shown in FIG. 46. Each entry in the ready queue table corresponds to one entry in the thread holding unit 47 and holds flags TDENTNO, SPID, SPRDY, and SPTLCK. TDENTNO indicates the entry number of the corresponding thread holding unit. SPID indicates the number of the next subpass to be executed. SPTLCK is a flag indicating whether or not the entry has a lock. SPRDY is a flag indicating whether or not a thread may be issued. These flags are held in order of generation of threads after a quad merge operation. SPRDY is set so that one thread is issued during each subpass without overtaking the preceding thread.

The subpass will be described with reference to FIG. 47. The instruction control unit 35 executes instructions at addresses specified by INSTBASE on each thread until the end instruction is detected. The executed instruction sequence can be divided into X instruction sequences as shown in FIG. 47; the resulting individual instruction sequences correspond to subpasses. The yield instruction is placed at the end of each subpass. Instead of the yield instruction, the end instruction END is placed at the end of the final subpass.

FIG. 48 is a conceptual drawing showing how subpasses are executed over time. In FIG. 48, threads 5, 6, and 7 are processed by the same pixel shader unit. As shown in the figure, the process for each thread is paused by the yield instruction. Then, instead, the instruction for another thread is executed. The paused thread is later started when it can be issued. In other words, each subpass is executed between two yield instructions. One thread is executed during each subpass, and within the subpass, the process is continuously executed.

If plural threads have same next subpass to be executed, SPRDY is set only for the oldest thread. Only the thread for which SPRDY is set can be issued. This prevents a process for a new thread from temporally overtaking a process for an older thread.

Generating a new thread sets the entry number of this thread in the thread holding unit in the first free entry in the ready queue table. SPID and ENV are also set.

Issuing a thread (executing a subpass) increments SPID of the corresponding entry, which then indicates the number of the next subpass to be issued. Once the thread executes the end instruction, ENV is cleared and the entry is dequeued.

Each entry always compares its own SPID with SPID of the preceding entry. If SPIDs of the successive entries are the same, the succeeding entry clears its own SPRDY. In the example in FIG. 46, this corresponds to the relationship between entries 2 and 3; entry 3 clears its own SPRDY. The SPID field has only the same value as or a value smaller than that of the preceding entry. Consequently, the above process allows SPRDY to be set only for the oldest one of the threads with the same SPID. SPRDY of each entry is selectively output to a thread holding unit entry indicated by TDENTNO of the entry.

If a thread being executed executes the lock instruction, SPTLCK of the corresponding entry is set. If the thread being executed executes an unlock instruction, SPTLCK of the corresponding entry is cleared.

Figure 49:
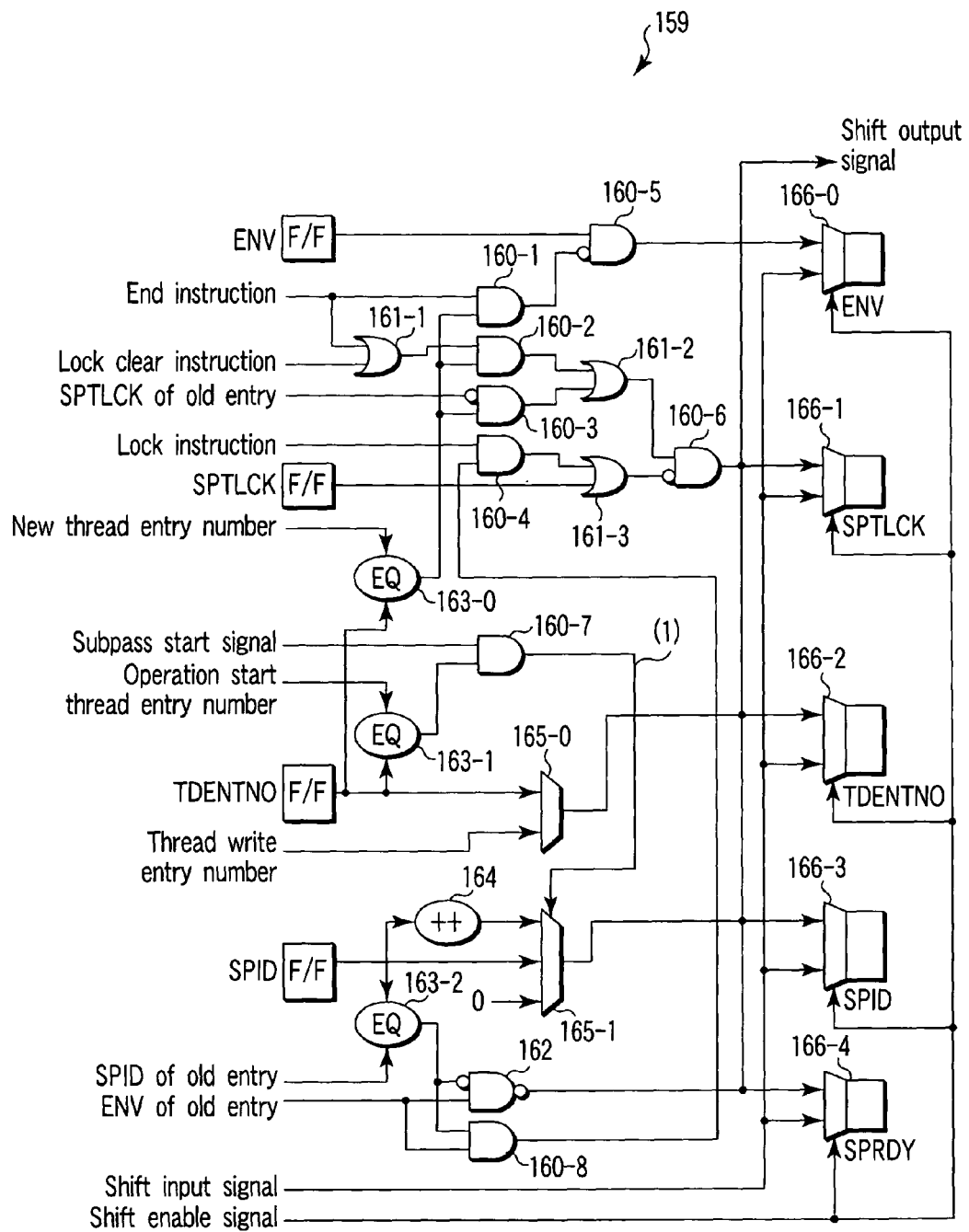
FIG. 49 is a circuit diagram of an entry circuit of the instruction management unit provided in the graphic processor in accordance with the first embodiment of the present invention.

Now, the circuit configuration of the instruction management unit 48 will be described. FIG. 49 shows an entry circuit 159 in the instruction management unit 48. This circuit forms the substances of the entries in the ready queue table.

As shown in FIG. 49, the entry circuit 159 includes AND gates 160-1 to 160-8, OR gates 161-1 to 161-3, a NAND gate 162, comparators 163-0 to 163-2, an adder 164, and selection circuits 165-0, 165-1, and 166-0 to 166-4.

The OR gate 161-1 performs an OR operation on the end and yield instructions. The comparator 163-0 compares a new thread entry number with TDENTNO (thread entry number) of an entry of interest. The comparator 163-2 compares the subpass ID (SPID) of the entry of interest with the subpass ID held in the preceding entry (SPID of the older entry). The NAND gate 162 performs a NAND operation on an inverted signal for an output from the comparator 163-2 and ENV of the preceding entry (ENV of the older entry). The AND gate 160-8 performs an AND operation on the output from the comparator 163-2 and the ENV of the preceding entry. The AND gate 160-1 performs an AND operation on an output from the comparator 163-0 and the signal end instruction. The AND gate 160-5 performs an AND operation on an output from the OR gate 161-0 and an inverted signal for the output from the OR gate 160-1. The AND gate 160-2 performs an AND operation on an output from the OR gate 160-1 and an output from the comparator 163-0. The AND gate 160-3 performs an AND operation on an inversion of SPTLCK held in the preceding entry (SPTLCK of the older entry) and an output from the comparator 163-0. The AND gate 160-4 performs an AND operation on the lock instruction and an output from the AND gate 160-8. The OR gate 161-2 performs an OR operation on an output from the AND gate 161-2 and an output from the AND gate 160-3. The OR gate 161-3 performs an OR operation on an output from the AND gate 160-4 and SPTLCK held in the entry of interest. The AND gate 160-6 performs an AND operation on an inverted signal for an output from the OR gate 161-2 and an output from the OR gate 161-3. The comparator 163-1 compares TDENTNO held in the entry of interest with an operation start thread entry number. The operation start thread entry number is for a thread that has started executing the subpass.

The AND gate 160-7 performs an AND operation on the signal subpass start signal and an output from the comparator 163-1. The selection circuit 165-0 selects either TDENTNO or a thread write entry number on the basis of the output from the AND gate 160-0. The adder 164 adds one to the subpass ID (SPID) held in the entry of interest. The selection circuit 165-1 selects one of an output from the adder 164, SPID, and "0" on the basis of an output from the AND gate 160-7.

The selection circuit 166-0 selects either an output from the AND gate 160-5 or data (shift input signal) in the succeeding entry. An output from the selection circuit 166-0 corresponds to the valid flag ENV. The selection circuit 166-1 selects either an output from the AND gate 160-6 or the shift input signal for the succeeding entry on the basis of a shift enable signal. An output from the selection circuit 166-1 corresponds to SPTLCK. The selection circuit 166-2 selects either an output from the selection circuit 165-0 or the shift input signal for the succeeding entry. An output from, the selection circuit 166-2 corresponds to TDENTNO. The selection circuit 166-3 selects an output from the selection circuit 165-1 or the shift input signal for the succeeding entry. An output from the selection circuit 166-3 corresponds to SPID. The selection circuit 166-4 selects either an output from the NAND gate 162 or the shift input signal for the succeeding entry on the basis of the shift enable signal. An output signal from the selection circuit 164 corresponds to SPRDY.

Outputs from the AND gates 160-5 and 160-6, selection circuits 165-0 and 165-1, and NAND gate 162 correspond to a shift output signal. The shift output signal is input to an entry circuit corresponding to the preceding entry.

The end instruction, lock instruction, and lock clear instruction are sent to the drawing processing unit 36. The subpass start signal is provided by the thread holding unit 47 and indicates the start of execution of a subpass. The thread write entry number is a signal indicating the number of an entry in the thread holding unit 47 on which a write operation is to be performed and is provided by the overlap detection unit 45. The operation start thread entry number and new thread entry number are for thread holding unit 47 and are provided by the thread holding unit 47 and drawing processing unit 36, respectively.

In the above configuration, asserting the thread write enable signal writes the thread write entry number, "0", and "1" to an entry pointed to by the write pointer, as TDENTNO, SPID, and ENV, respectively. The selection circuit 165-0 selects the thread write entry number, and the selection circuit 165-1 selects "0". The thread write enable signal enables data to be written to the thread holding unit 47 and is provided by the thread generation unit.

If the comparator 163-2 determines that the preceding entry is valid and has a subpass ID (subpass ID of the older entry) equal to that of the entry of interest, the output from the NAND gate 162 becomes "High". In this case, SPID=1 is set. Otherwise the output from the NAND gate becomes "Low", setting SPID=0.

When SPID is equal to the subpass ID of the preceding entry and the lock instruction is asserted, SPTLCK of an entry with the same thread entry number as that of a thread being executed is set. In contrast, asserting the end instruction and lock clear instruction clears SPTCLK. If SPTLCK of the preceding entry is zero and has the same SPID as that of the entry of interest, the bits of the latter are cleared.

Asserting the subpass start signal allows the comparator 163-1 to compare the executing thread entry number with TDENTNO of the entry of interest. If the executing thread entry number is the same as TDENTNO, the adder 164 increments SPID. After SPID is incremented, a new SPID value is used to re-evaluate the SPRDY to update its value.

After the end instruction is executed, the comparator 163-0 compares the executing thread entry number with TDENTNO of the entry of interest. The match between the executing thread entry number and TDENTNO indicates that the subpass of the entry of interest has been finished. Then, the output from the AND gate 160-5 changes to the "Low" level and entry valid flag ENV is cleared.

Figure 50:
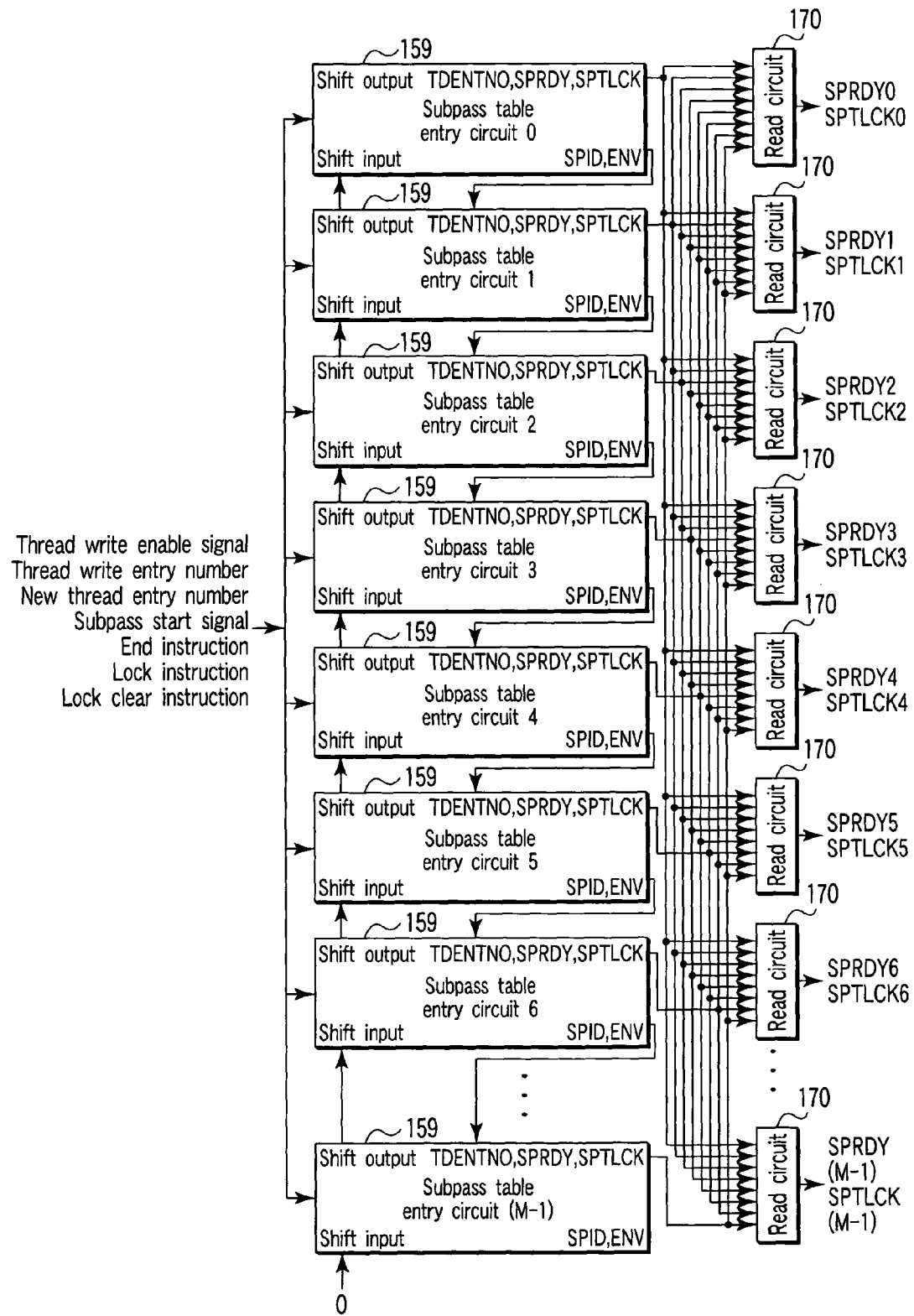
FIG. 50 is a circuit diagram of a read circuit of the instruction management unit provided in the graphic processor in accordance with the first embodiment of the present invention.

Now, a read circuit 170 in the instruction management unit will be described with reference to FIG. 50. FIG. 50 is a block diagram showing the connection relationship between the read circuit 170 and the entry circuit 159. The read circuit 170 selects SPRDY and SPTLCK of an entry specified by the instruction management unit.

As shown in the figure, the instruction management unit 48 comprises the same number of (M) read circuits 170 as that of the entries. The shift input signal, shift output signal, ENV, and SPID are cascaded between the entry circuits corresponding to the entries. The read circuit 170 receives TDENTNOs, SPRDYs, and SPTLCKs from the eight entry circuits 159. The read circuit 170 then selects SPRDY and SPTLCK received from the entry circuit 159 corresponding to an entry specified by the thread holding unit 47.

Figure 51:
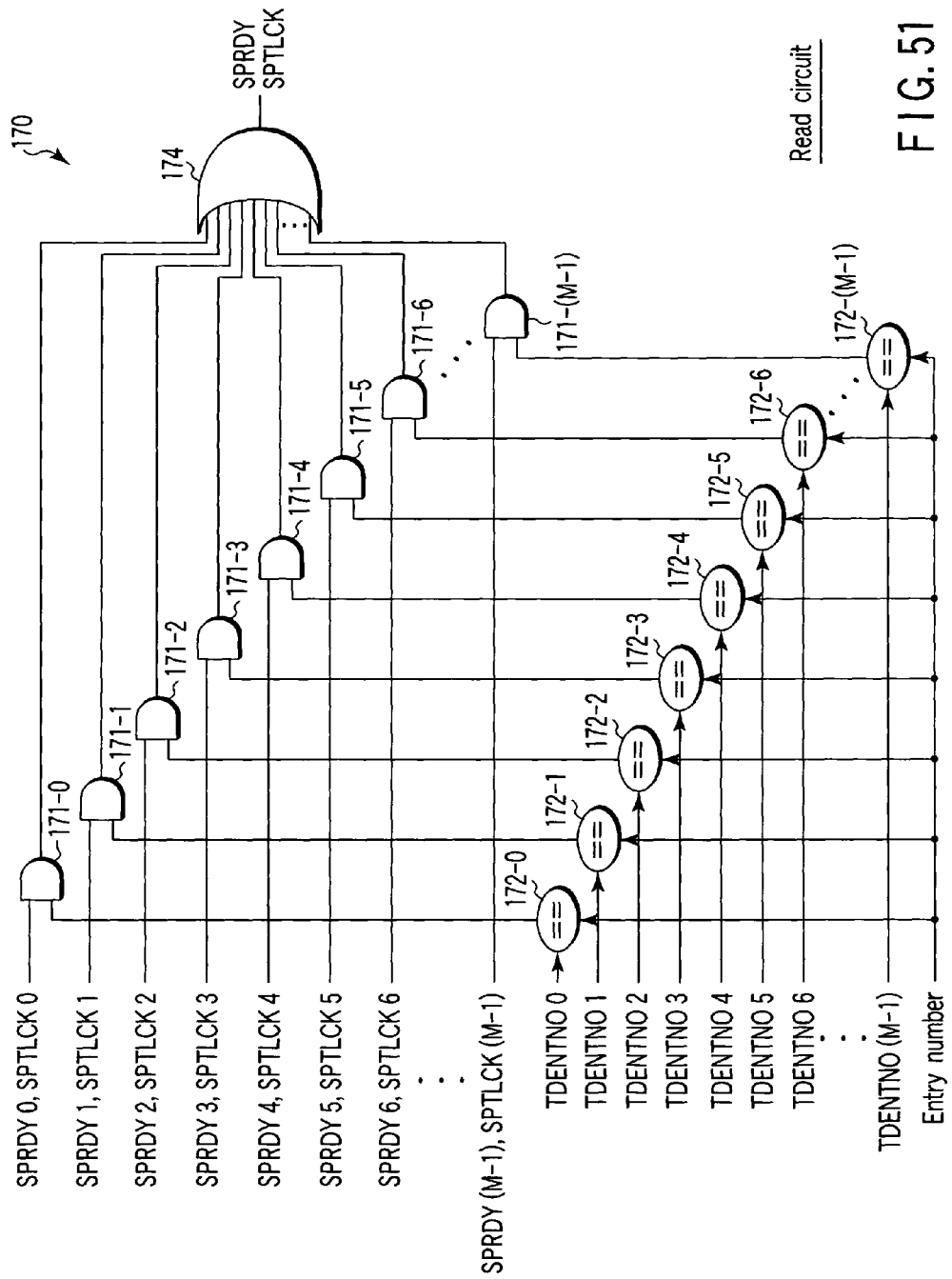
FIG. 51 is a circuit diagram of the read circuit of the instruction management unit provided in the graphic processor in accordance with the first embodiment of the present invention.

FIG. 51 is a circuit diagram of each read circuit 170. As shown in the figure, the read circuit 170 includes AND gates 171-0 to 171-(M−1), comparators 172-0 to 172-(M−1), and an OR gate 173. SPRDYs held in entries 0 to (M−1) in the instruction management unit are hereinafter referred to as SPRDY0 to SPRDY(M−1). SPTLCKs held in entries 0 to (M−1) in the instruction management unit are hereinafter referred to as SPTLCK0 to SPTLCK(M−1). TDENTNOs held in entries 0 to (M−1) in the instruction management unit are hereinafter referred to as TDENTNO0 to TDENTNO(M−1).

The comparators 172-0 to 172-7 compares TDENTNO0 to TDENTNO(M−1), respectively, with the entry number of the entry of interest. The match between TDENTNO and the entry number allows the comparator to output the "High" level. The AND gates 171-0 to 171-(M−1) perform an AND operation on SPRDY0 to SPRDY(M−1) with outputs from the comparators 172-0 to 172-(M−1), respectively. The OR gate 173 performs an OR operation on outputs from the AND gates 171-0 to 171-(M−1). An output from the OR gate 173 corresponds to SPRDY and SPTLCK held in the selected entry.

The operation of the read circuit 170 will be described taking the case of reading data from, for example, entry 0. In this case, the output from the comparator 172-0 is at the "High" level, while the outputs from the other comparators 172-1 to 172-(M−1) are at the "Low" level. This forcibly sets the outputs from the AND gates 171-1 to 171-(M−1) at the "Low" level. On the other hand, the outputs from the AND gate 171-0 vary depending on SPRDY and SPTLCK held in entry 0. That is, SPRDY and SPTLCK of entry 0 are taken out.

Figure 52:
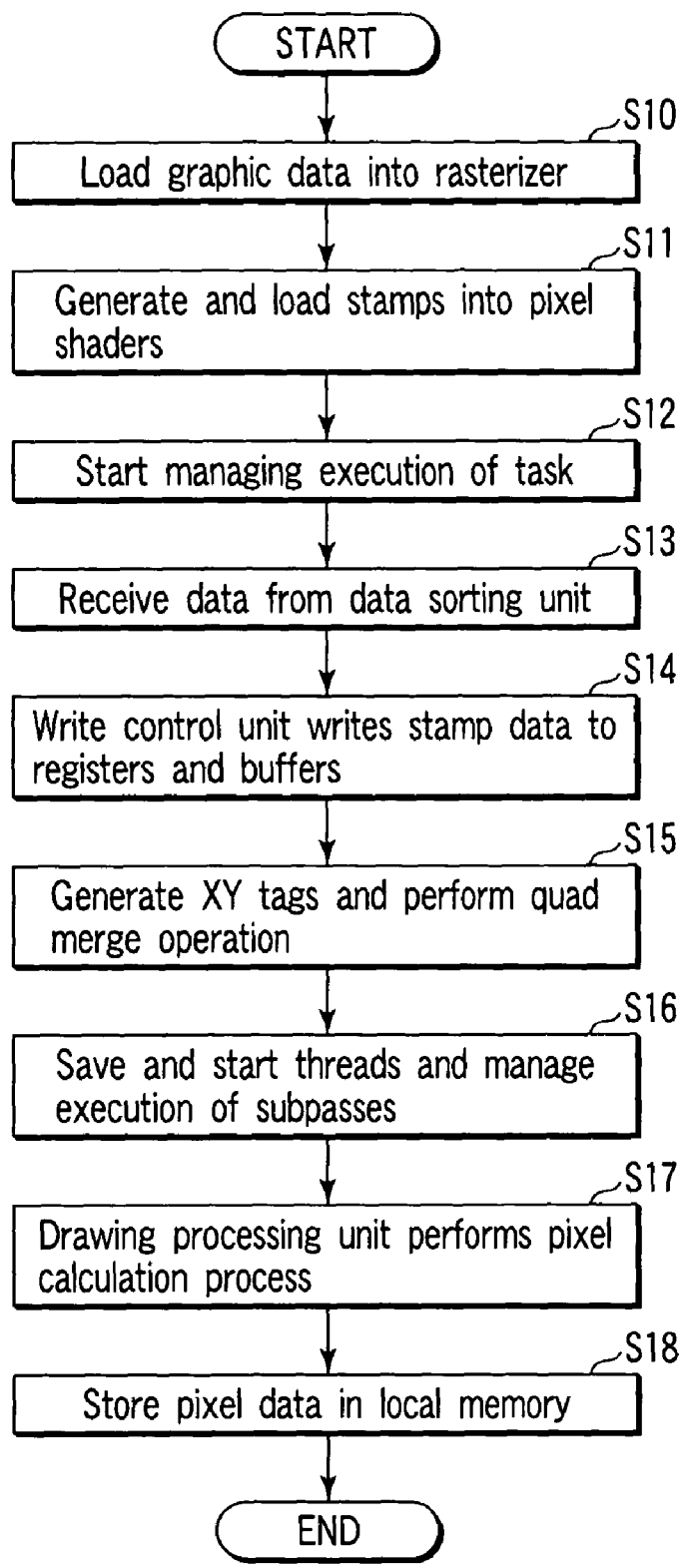
FIG. 52 is a flowchart showing a drawing process executed by the graphic processor in accordance with the first embodiment of the present invention.

Now, the operation of the graphic processor configured as described above will be described focusing on the instruction control unit 35. FIG. 52 is a flowchart of a process executed by the graphic processor to draw a graphic.

To draw a graphic, graphic information is input to the rasterizer 24 (step S10). The graphic information includes, for example, information on vertexes and colors of the graphic. Then, the rasterizer 24 generates stamps corresponding to a position occupied by the graphic to be drawn (see FIG. 6). The stamp data generated is sent to the data sorting units 30 for the pre-associated pixel shaders 25-0 to 25-3 (step S11).

Task execution management is then started in order to execute a drawing process on the basis of the stamp data received by the pixel shaders 25-0 to 25-3 (step S12).

<Stamp Data Reception>

For task execution management, first, the data sorting unit 30 delivers the stamp data to the instruction control unit 35 in the pixel shader unit 34 (step S13). The data sorting unit 30 transfers the stamp data to the instruction control unit 35 in eight clock cycles.

The stamp data delivered by the data sorting unit 30 contains the pixel valid signal and XY coordinate of each stamp and the first to third data on the stamp as shown in FIG. 53. As shown in the figure, the data sorting unit 30 divides the data on each stamp into 8 bits, which are transferred during the respective cycles. The divided data are sequentially sent starting with MSB.

FIG. 54 is a timing chart of various signals for data transfer. The stamp data in the figure refers to the pixel valid signal, XY coordinate and first data. As shown in the figure, the data is delivered to the instruction control unit 35 in synchronism with the clock CLK2. The data other than the second data is divided into 8 bits, which are delivered in synchronism with the first start signal. The second data is divided into 8 bits, which are delivered in synchronism with the second start signal. The second data is delayed from the other data in delivery by a specified cycle ΔT.

<Stamp Data Write>

Then, the transferred data is written to the first data holding unit 42, second data holding unit 43, and stamp holding unit 44 (step S14). The instruction control unit 35 can hold stamp data for up to 16 stamps. Once a process for a stamp is finished, the corresponding stamp data is discarded.

The first data is written to the first data holding unit 42 every cycle during eight cycles after the assertion of the first start signal. The second data is latched in the shift register 53-5 (see FIG. 10) for eight cycles after the assertion of the second start signal. During the ninth cycle, all of the second data is written to the second data holding unit 43 at a time. The reception unit 40 assembles XY coordinate, pixel valid signals, third data, and QVs during eight cycles after the assertion of the first start signal on the basis of the received XY coordinate, third data, and pixel valid signals. The reception unit 40 then writes the assembled XY coordinate, pixel valid signals, third data, and QVs to the stamp holding unit 44.

In writing the stamp data, the stamp numbers STN allocated to the stamps are used. The stamp number STN identifies a stamp internally used by the instruction control unit 35 and ranges from 0 to (M−1). A free (unused) number in a pool of stamp numbers is allocated to a stamp transferred by the data sorting unit 30. Each stamp continues to use its stamp number until its process is finished. Once the process for the stamp is finished, the stamp number becomes "free" again and is returned to the stamp number pool.

More specifically, the stamp number STN corresponds to the smallest of entry numbers of the free entries in the stamp holding unit 44. The stamp data is written to that entry in the stamp holding unit 44. This is shown in FIG. 55. As shown in the figure, the stamp holding unit 44 has M entries. The entries in the stamp holding unit are used in order of increasing entry number. For example, it is assumed that entries 0 to 3 are in use (data has been already written to these entries). Then, an entry with the smallest of entry numbers of entries 4 to (M−1), which are unused, that is, entry 4 is used. Whether or not the entry is in use can be determined with reference to its entry valid flag ENV. The ENV is cleared to "0" when the process for the stamp held in the entry is finished. The stamp number STN of the stamp written to entry 4 is "4" and is the same as the entry number.

FIG. 56 shows the second data holding unit 43. As shown in the figure, the second holding unit 43 M entries. Each entry in the second holding unit 43 holds second data having bits relating to pixels 0 to 15 (shown as Pix0 to Pix15 in FIG. 56); the bits sequentially correspond to pixels 0 to 15 from lowest bit to highest bit. The second data holding unit 43 holds the second data so that the entry number of each entry matches the corresponding stamp number STN. That is, entries 0 to (M−1) hold the second data on the stamps with STN=0 to (M−1). Consequently, in FIG. 55, the second data on the stamp with its stamp data stored in entry 4 is held in entry 4 in the second data holding unit 44.

FIG. 57 shows the memory 54. The memory 54 is of a FIFO type and has N entries 0 to (N−1). The entries are used in order of increasing entry number. That is, for the memory 54, the entry numbers do not match the stamp numbers. For example, it is assumed that entries 0 to 8 in the memory 54 are in use.

Then, entry 9 is used. Each entry holds the flag ENV, stamp number STN, flag RDY2, and SYNC. For example, when the stamp with STN=4 uses entry 9, ENV of the entry is changed from "0" to "1", and "4" ("0100") is set in the STN field. Finishing writing the second data to the second data holding unit 43 changes RDY2 from "0" to "1". Further, if the stamp with STN=4 is the first of the stamps belonging to the task, the flag SYNC, indicating synchronization, is set to "1". Otherwise the flag SYNC is set to "0".

Now, with reference to FIG. 58, description will be given of the relationship between plural stamps transferred by the data sorting unit 30 and the task. FIG. 58 is a timing chart of various signals. The data sorting unit 30 receives an external task start signal (task execution instruction) to start processing the task. Asserting the task execution instruction makes the instruction control unit 35 ready to execute the task. In this state, the instruction control unit 35 asserts a pixel shader unit execution signal. Asserting the pixel shader unit execution signal allows the task to be executed.

The stamps processed by a certain task include:
Stamps received in a task executable state, that is, stamps received after the assertion of the task execution instruction and before the assertion of the task synchronization signal, and
Stamps received after the assertion of the task synchronization signal indicating the end of the preceding task and before the instruction control unit 35 gets ready to execute the task.

Accordingly, upon receiving the asserted task synchronization signal from the data sorting unit 30, the instruction control unit 35 determines that the succeeding stamps belong to the second task. FIG. 59 shows how the memory 54 operates in this case. For example, it is assumed that the first stamp for task 1 is held in entry 9 and that the first stamp for task 2 is held in entry 12. Then, since a signal NEWT is asserted when the stamps are held in entries 9 and 12, SYNCs of these entries are set to "1". This indicates that entries 9 to 11 belong to task 1.

<Quad Merge>

After the stamp data is written to the registers and buffers as described above, XY tags are generated to perform a quad merge operation (step S15). The conditions under which a quad merge operation is performed are as follows.

(1) At most two stamps are to be quad-merged.
(2) The two stamps are temporally successive.
(3) The two stamps have the same XY coordinate.
(4) There is no duplication between the pixel valid signal for the remaining pixels in the stamp to be merged (older stamp) and the pixel valid signals for the merging new stamp.
(5) The two stamps belong to the same task. If a quad merge operation is not performed, the stamps become threads as they are.

To allow a quad merge operation to be performed, the overlap detection unit 45 detects whether or not the XY coordinates are the same, which is the information required for the quad merge operation. The overlap detection unit 45 also generates hashes (XY tags) for the XY coordinate in order to simplify their comparison. The overlap detection unit 45 holds the XY coordinate in its internal XY table. The XY tag is an entry number in an XY table and has, for example, 3 bits. Each entry in the XY table holds the XY coordinate and stamp number STN of one stamp. When an entry in the XY table is newly used, a free entry with the smallest entry number is selected. When the XY coordinate of a processed stamp is not used by any thread, the corresponding entry in the XY table is freed.

Further, a thread holding unit selection unit 63 of the overlap detection unit 45 determines a thread holding unit entry that is to be used to generate a new thread. The thread holding unit selection unit 63 references the valid flag ENV in the thread holding unit 47 to search for free entries. The thread holding unit selection unit 63 selects a free entry with the smallest entry number. The thread holding unit selection unit 63 then outputs the selected entry number as a thread write entry number. A new thread is to be written to this entry. The thread holding unit selection unit 63 also generates an entry full signal. The lack of a free entry in the thread holding unit 47 causes the entry full signal to be asserted.

Then, the thread generation unit 46 determines whether or not to perform a quad merge operation. Specifically, the thread generation unit 46 determines how to merge the two stamps and then actually execute a merge process.

Stamp data remaining from a quad merge operation is held in the merge buffer 84 until the next new stamp arrives at the pixel shader unit. Further, not all the quads of the two stamps may not be contained in a new thread. In this case, the quads in the new stamp are always left in the merge buffer 84, while the quads in the older stamp are output as a thread. The lack of a quad in the merge buffer 84 causes all the quads of the new stamp to remain in the merge buffer 84. At this time, no thread is generated. For a quad merge operation, the maximum effort is made to allow the original quad positions to remain unchanged. If any quad positions overlap, the positions of the quads in the merge buffer are not changed, while quads in the new stamp are displaced. If this still fails to allow a merge operation to be performed, quads in the merge buffer are also displaced.

After the quad merge operation, the thread generation unit 46 generates merged quad valid signals and information STNUM0 to STNUM3 and QNUM0 to QNUM3, indicating how the merge operation has been performed. The thread generation unit 46 also outputs the stamp numbers STN0 and STN1 of the two stamps to be merged. STN0 denotes the older stamp. Further, dividing the stamp corresponding to STN1 into two threads causes the thread generation unit 46 to assert a flag DIV. The thread generation unit 46 then writes the flag to the entry for STN1 in the stamp holding unit 44.

Figures 60, 61:
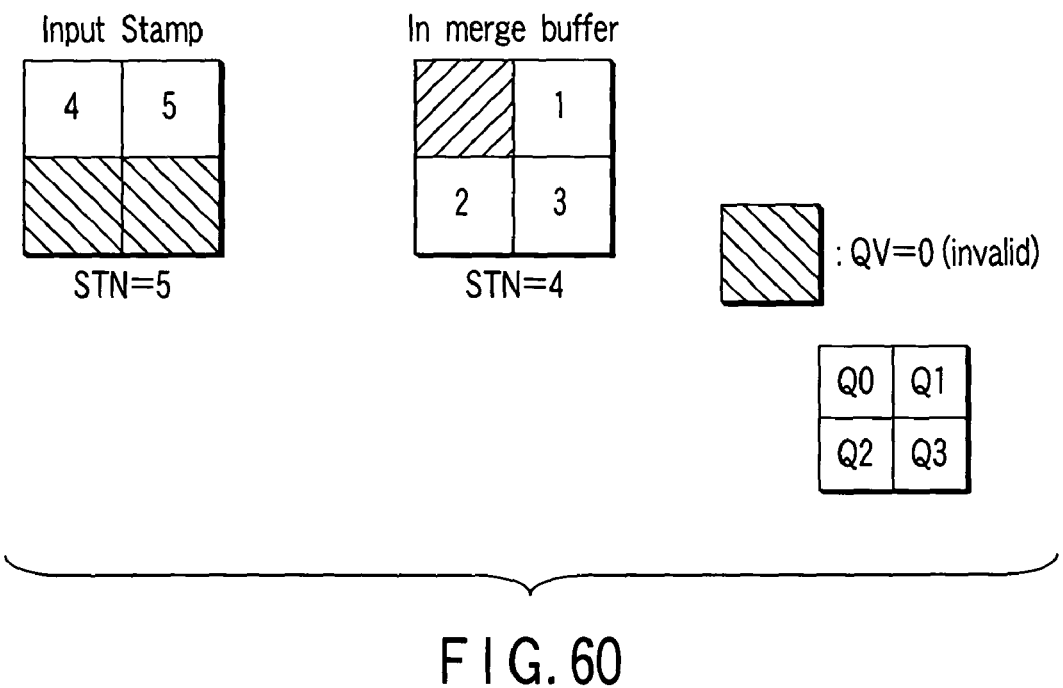
FIG. 60 is a conceptual drawing showing a newly input stamp and a stamp in a merge buffer in the graphic processor in accordance with the first embodiment of the present invention.
FIG. 61 is a conceptual drawing of the memory of the reception unit provided in the graphic processor in accordance with the first embodiment of the present invention.

The above process will be specifically described. It is assumed that the stamp remaining in the merge buffer 84 in the thread generation unit 46 and a newly input stamp are as shown in FIG. 60. That is, in the stamp held in the merge buffer 84 and having a stamp number STN of "4", quad Q0 is invalid, and quads Q1 to Q3 are valid. In the newly input stamp having a stamp number STN of "5", quads Q0 and Q1 are valid, and quads Q2 and Q3 are in valid. Quads Q1 to Q3 in the stamp with STN=4 and quads Q0 and Q1 in the stamp with STN=5 are hereinafter referred to as quads 1 to 5.

In this case, it is assumed that the contents of the memory 54 in the reception unit 40 are as shown in FIG. 61. That is, the two stamps are held in entries 9 and 10 in the memory 54. Entries 9 and 10 then hold the stamp numbers "4" and "5", respectively. The SYNCs of entries 9 and 10 are "0" and "1", respectively. SYNCs indicate that the two stamps corresponding to entries 9 and 10 belong to the same task (this also applies to the case where SYNCs of the two entries are "0" and "0"). The two stamps have the same XY coordinate with a value "C".

FIG. 62 shows the state of the XY table in the overlap detection unit 45 observed when the stamp with STN=4 is input to the table. It is assumed that when the stamp with STN=4 is input, entries 0, 1, 3, 4, and 6 in the XY table are in use, while entries 2, 5, and 7 are free. It is also assumed that the XY coordinate "C" is not registered in any of the entries in use. Then, the entry units 60-0 to 60-7 of the overlapping unit 45 provide XY comparison result signal of zero, resulting in the allocation of new entries. Since the new entry is a free entry with the smallest entry number, in this case, entry 2 is allocated. That is, the entry allocation unit 62 asserts the XY allocation signal for entry 2. The allocation of the new entry causes the XY coordinate table selection unit 61 to assert a signal for the next XY table entry to be used. This allows ENV of entry 2 to be asserted and also allows "C" to be written as an XY coordinate, and the stamp number STN=4 is also written to the entry. An XY tag provided for the stamp STN=4 is "2", which is the same as the corresponding entry number in the XY table.

Now, with reference to FIG. 63, description will be given of the state of the XY table when the stamp with STN=5 is input to the table. The stamp with STN=5 has the same XY coordinate as that of the stamp with STN=4. This allows the entry unit 60-2 to assert the XY comparison result signal. Further, since the same XY coordinate inhibits the allocation of a new entry, the entry allocation unit 62 sets all the XY allocation signals to zero. This allows the stamp number STN=5 to be newly written to entry 2 in the XY table. Consequently, the XY tag for the stamp with STN=5 is 2 and is the same as that for the stamp with STN=4.

Then, the XY table selection unit 61 of the overlap detection unit 45 determines an entry of the thread holding unit 47 that is to be used to generate a new thread. For example, it is assumed that in the thread holding unit 47, entries 0 to 3 are in use, while entries 4 to (N−1) are unused. Then, the priority encoder 73 of the XY table selection unit 61 references ENVs of the entries to select entry 4, a free entry with the smallest entry number. The priority encoder 73 then outputs the thread write entry number="4". Since there remain other free entries in the thread holding unit 47, the comparator 81 of the XY table selection unit 61 does not assert the thread full signal.

The thread generation unit 46 then determines how to perform a quad merge operation. The thread generation unit 46 holds a table (truth table) containing information indicating how to configure the merged stamp on the basis of the relationship between the stamp data in the merge buffer and the new stamp data. FIG. 64 shows a part of the table. Numbers 0 to 3 in the figure indicate valid quads Q0 to Q3. Horizontal bars indicate that the other quads are invalid. "MGBUF" in an "unmerged" column indicates stamp data in the merge buffer on which the quad merge operation has not been performed yet. "NEWST" indicates newly input stamp data on which the quad merge operation has not been performed yet. "Leftover" in a "merged" column indicates stamp data left in the merge buffer after the quad merge operation. "MGBUF" and "NEWST" indicate stamp data contained in the new thread. For example, MGBUF=(0 - - - -) and NEWST=(0123) has the following meaning. In the stamp in the merge buffer, only quad Q0 is valid. In the newly input stamp, quads Q0 to Q3 are all valid. Quad Q0 in a thread resulting from the merge operation corresponds to quad Q0 in the stamp in the merge buffer. Quads Q1 to Q3 in the thread correspond to quads Q1 to Q3 in the newly input stamp. Quad Q0 in the newly input stamp is left in the merge buffer.

Figure 65:
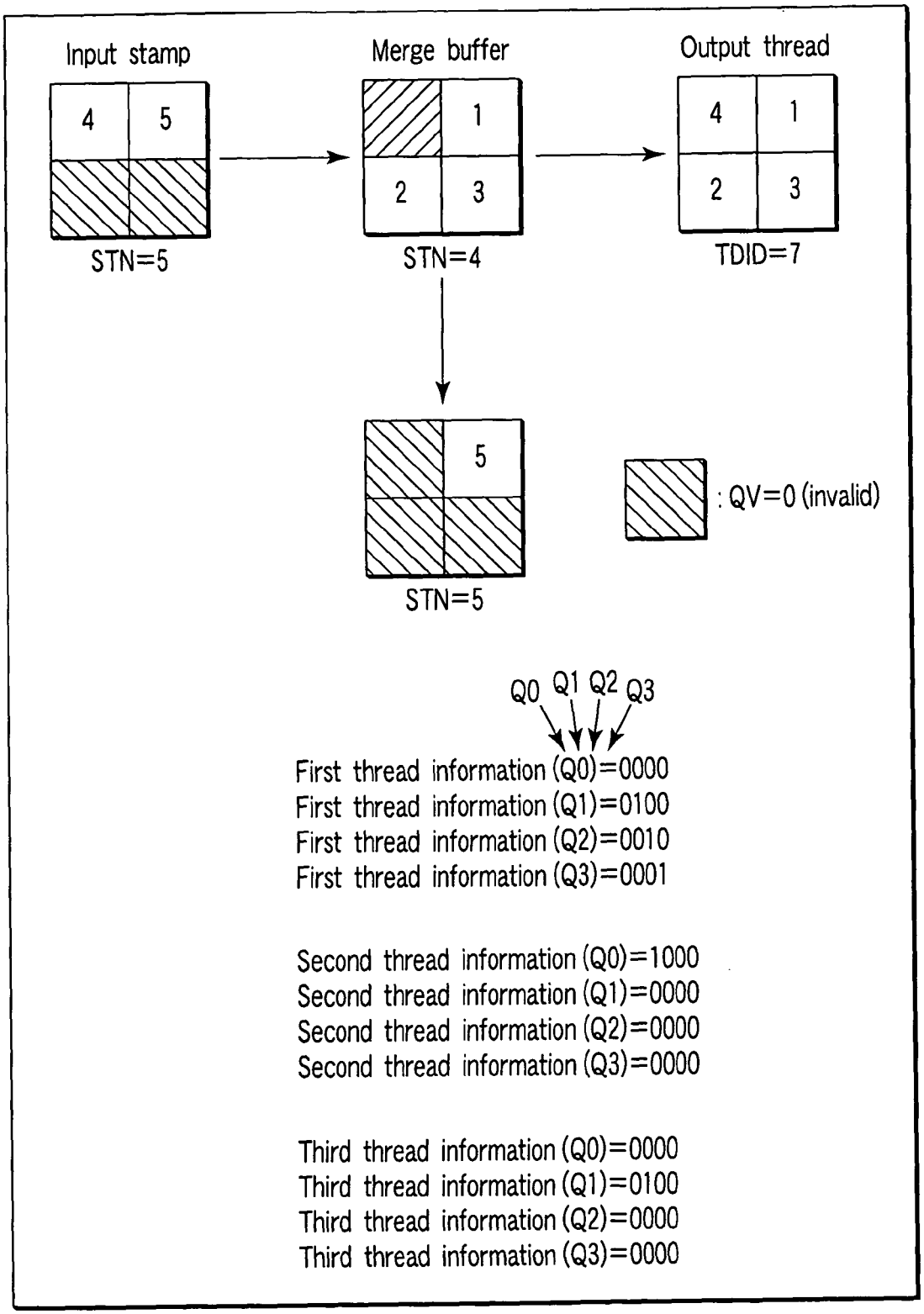
FIG. 65 is a conceptual drawing showing a newly input stamp, a stamp in a merge buffer, and a thread in the graphic processor in accordance with the first embodiment of the present invention.

In FIG. 60, the thread generation unit 30 determines that the quad merge operation is to be performed as shown in FIG. 65, on the basis of the quad valid signals QV for the stamp in the merge buffer and the quad valid signals QV for the new stamp. The merge operation is performed so that quads Q0 to Q3 for the new thread correspond to quad 4 in the stamp with STN=5 and quads 1 to 3 in the stamp STN=4. Quad 5 located at the same position as that of Quad 1 is left over. This information is generated as the first thread information to the third thread information.

The thread generation unit 46 performs a quad merge operation on the base of the first to third of thread information. The thread generation unit 46 further generates STNUM0 to STNUM3, QNUM0 to QNUM3, and quad valid signals QV for the new thread. The stamp numbers STN0 and STN1 and XY tags of the two stamps to be merged are output to the thread holding unit 47 by the thread generation unit 46. The above information and signals are then written to entry 4 in the thread holding unit 47. Entry 4 has been selected by the thread holding unit selection unit 63 of the overlap detection unit 45. FIG. 66 shows how the thread holding unit 47 operates in this case.

As shown in FIG. 66, the valid flag ENV of entry 4, selected by the XY table selection unit 61, is set. Moreover, the XY tag, STN0 and STN1 of entry 4 are set to "2", "4", and "5", respectively. STN0 and STN1 denote the stamp numbers of the stamp in the merge buffer and the newly input stamp, respectively. The quad valid signal QV for the new thread is also written to entry 4. The quad valid signal for the new thread has 4 bits corresponding to quads Q0 to Q3, respectively, in the thread. Consequently, since in FIG. 65, all the quads in the thread are valid, QV for the thread is set to "1111". Since only quad Q0 in the new thread is from the newly input stamp, STNUM0 to STNUM 3 are "1", "0", "0", and "0", respectively. Moreover, since the positions of quads in the new thread remains unchanged after a quad merge operation, QNUM0 to QNUM3 are "100", "01", "10", and "11", respectively.

The divide flag generator 87 of the thread generation unit 46 detects whether or not at least a part of the newly input stamp (stamp with STN=5) is left in the merge buffer, on the basis of the quad merge information. In the present example, quad 5 in the newly input stamp is left in the merge buffer. Consequently, the flag DIV is set to "1". DIV is written to entry 4 in the stamp holding unit 44, which holds the stamp with STN=5.

<Management of Execution of Executing Threads and Subpasses>

Once the quad merge operation is finished, the execution of executing threads and subpasses is managed (step S16). An image drawing process is executed for every thread, and the instruction control unit 35 manages the starting and stopping of the thread. Each thread is divided into execution units called subpasses for execution. To end the execution of a subpass, the operation of the thread is stopped and another executable thread is started. This enables plural threads to be switchably executed on the basis of time sharing. Further, the executability of the subpass is determined on the basis of the lock instruction and lock clear instruction to allow only the executable threads to be started.

The instruction control unit 35 manages threads and subpasses as described below. Each pixel shader unit 34 can process up to one thread. The instruction control unit 35 issues a thread to be processed. If no thread is issued, one of the issuable threads is selected from the thread holding unit 47. Executing the yield instruction stops the execution of the thread, while starting another thread that is issuable at that time. If the end instruction is executed and all the texture load instructions are confirmed to have been acquired, ENV of the entry in the thread holding unit 47 is cleared, with the thread dequeued. If the thread holding unit 47 has plural issuable threads, the threads are issued in order of increasing period of presence in the thread holding unit 47.

A thread is started as described below. Provided that no thread is being executed, a data cache preload request has been issued, all of the texture data has been loaded, and no other thread with the same XY coordinate takes a lock, an unexecuted thread with the smallest thread ID is issued. If plural threads are executable, a thread that issued a preload request earliest is issued. Preloading involves reading data required to execute the task from the local memory 26 and transferring the data to the drawing processing unit 36. Then, the flag RUN of the started thread is set.

With the thread started, the drawing processing unit 36 executes a task for the thread. While the task for the thread is being executed, the instruction control unit 35 manages the state of the thread. Specifically, executing the lock instruction causes the instruction control unit 35 to set LCK of the thread holding unit 47. Executing the lock clear instruction causes the instruction control unit 35 to clear LCK of the thread holding unit 47. Executing the texture load instruction group causes the instruction control unit 35 to increment the number of unacquired texture load instructions by one.

Executing the yield instruction for the thread causes the instruction control unit 35 saves the program counter for the instruction following the yield instruction to the thread holding unit 47. The instruction control unit 35 then increments the subpass number of the stopped thread by one. The instruction control unit 35 further changes the preload request state of the stopped thread to "unrequested" and sets PRELDTIME in an internal counter. The instruction control unit 35 then clears RUN of the stopped thread.

Executing the end instruction causes the instruction control unit 35 to perform a process of stopping the thread. The instruction control unit 35 further executes the subsequent process. Executing the end instruction causes the instruction control unit 35 to set END in the thread holding unit 47 and to record the end of the thread. The instruction control unit 35 also references DIV, in the stamp holding unit, for the (up to two) stamp that has been being executed. If DIV is 1, the instruction control unit 35 sets it to "0". If DIV is "0", the instruction control unit 35 determines that the process for the stamp has been finished. The instruction control unit 35 dequeues the stamp from the stamp holding unit and asserts a signal externally indicating that one stamp has been processed. If processes for two stamps are simultaneously finished, then assertion is executed twice. If END has been set and all the texture load instructions have been acquired, the corresponding entry in the thread holding unit 47 is invalidated.

The instruction control unit 35 also controls the lock. Some executable threads process stamps with the same XY coordinate. The instruction control unit 35 thus exclusively control threads with the same XY coordinate in association with the lock instruction and lock clear instruction. Specifically, a thread cannot be issued which has the same XY coordinate as that of another thread having a lock. The lock does not function between threads with different XY coordinates.

The instruction control unit 35 further controls the timing for the issuance of the preload instruction. A thread having finished a subpass enters a "halted state". When a specified time has passed since the thread entered the "halted state", the instruction control unit 35 can request a data area for the thread to be prefetched from the data cache. The instruction control unit 35 further internally holds the order of prefetch requests and starts the preload request earlier for earlier prefetch requests. However, for the first of the threads belonging to a certain task, the preload instruction is issued immediately after the issuance of the thread.

The process executed by the instruction control unit 35 as described above will be specifically described by focusing on the instruction management unit 48 and thread holding unit 47. It is assumed that three threads 1 to 3 are processed as shown in FIG. 67. The thread IDs of threads 1 to 3 are TDID="1" to "3", respectively. Threads 2 and 3 have the same XY coordinate.

FIG. 68 shows how the thread holding unit 47 operates immediately before the issuance of subpass 3 for thread 3. As shown in the figure, threads 1 to 3 are registered in entries 0 to 3 in the thread holding unit 47. At this time, the subpass IDs of threads 1 to 3 are 3, 3, and 4, respectively. For thread 2, the preload state is "10 (PLDON)" and the texture load counter TLC is zero. Consequently, the ready flag RDY is set to "1". Other threads 0 and 1 are not issuable.

FIG. 69 shows how the ready queue table in the instruction control unit operates in this case. In the instruction management unit 48, entries 0 to 2 hold thread entry numbers TDENTNOS of "0" to "2", respectively. The other entries 3 to (M−1) are unused. Consequently, the write pointer WRPTR points to entry 3. Threads 2 and 3 corresponding to entries 1 and 2 have the same XY coordinate and the same subpass ID (SPID). Consequently, SPRDY (of thread 3) of entry 2 is zero, prohibiting the issuance of a subpass.

Accordingly, thread 2 is first issued to execute subpass 3. FIG. 70 shows how the thread holding unit 47 operates while subpass 3 is being executed for thread 2. As shown in the figure, during this period, the preload state of thread 1 changes to "10". In other words, the issuance of the preload instruction is finished. Texture loading is also completed to zero the texture load counter. This sets RDY to "1". For thread 2, subpass 3 is started, and RUN is set to "1". The preload state PL thus changes to "11 (PLRUN)" to start counting up TLC. Finishing subpass 3 and executing the yield instruction zeroes RDY and RUN for thread 2. The subpass ID is incremented by one to four, and the program counter is also incremented by one. The preload state PL changes to "00 (PLWAT)". Further, the lock instruction is executed during the execution of subpass 3 to set the lock flag LCK to "1".

FIG. 71 shows how the instruction management unit operates after the yield instruction has been executed. As shown in FIG. 71, SPID of entry 1 is changed from 3 to 4, and SPTLCK is set to "1". Since the process for thread 1 steps ahead of the process for thread 2, SPRDY of entry changes from "0" to "1". Since threads 2 and 1 have the same SPID, SPRDY of thread 2 (entry 1) changes from "0" to "1".

Once the execution of subpass 3 for thread 2 is completed, thread 1 is issued. This is because as shown in FIG. 70, RDYs of entries 0 and 2 are "1" and "0", respectively, and thread 2 has a lock, so that thread 3 is not issuable.

Thus, thread 1 is first issued to execute subpass 4. FIG. 72 shows how the thread holding unit 47 operates while subpass 4 is being executed for thread 1. As shown in the figure, during this period, the preload state of thread 2 changes from "00" through "01" to "10". In other words, the issuance of the preload instruction is finished. Texture loading is also completed to zero TLC. This sets RDY to "1". For thread 2, subpass 4 is started, and RUN is set to "1". The preload state PL thus changes to "11" to start counting up TLC. Finishing subpass 4 and executing the yield instruction zeroes RDY and RUN for thread 2. The preload state PL changes to "00 (PLWAT)". SPID is incremented by one to five, and the program counter PC is incremented by one.

FIG. 73 shows how the instruction management unit operates after the execution of the yield instruction. As shown in the figure, SPID of entry 0 is changed from 4 to 5.

Once the execution of subpass 4 for thread 1 is completed, thread 2 is issued. The reason for the issuance of thread 2 is as follows: RDY of entry 1 is "1" and RDY of entry 2 is "0" as shown in FIG. 72, and thread 3 of entry 2 has the same XY coordinate as that of entry 1, which has a lock.

Thus, thread 2 is issued to execute subpass 4. FIG. 74 shows how the thread holding unit 47 operates while subpass 4 is being executed for thread 2. As shown in the figure, during this period, the preload state of thread 3 changes to "10". Texture loading is also completed to zero TLC. This sets RDY to "1". For thread 2, subpass 4 is started, and RUN is set to "1". The preload state PL thus changes to "11" to start counting up TLC. Finishing subpass 4 and executing the yield instruction zeroes RDY and RUN for thread 2. SPID is incremented by one to five, and the program counter PC is incremented by one. The preload state PL changes to "00 (PLWAT)". The unlock instruction is asserted during the execution of subpass 4 to set LCK of entry 1 to zero.

FIG. 75 shows how the instruction management unit operates after the execution of the yield instruction. As shown in the figure, the subpass ID of entry 1 changes from 4 to 5, and the lock flag SPTLCK is set to zero.

Once the execution of subpass 4 for thread 2 is completed, thread 3 is issued. The reason for the issuance of thread 3 is as follows: RDY of entry 3 is "1" and RDY of entry 0 is "0" as shown in FIG. 74, entry 2 has executed the unlock instruction to set LCK to "0", and SPRDY of entry 2 with the same XY coordinate is "1".

Thus, thread 3 is issued to execute subpass 3. FIG. 76 shows how the thread holding unit 47 operates while subpass 3 is being executed for thread 3. For thread 2, RUN is set to "1" to change the preload state PL to "11" to start counting up TLC. Finishing subpass 3 and executing the yield instruction zeroes RDY and RUN for thread 3. SPID is incremented by one to four, and the program counter PC is incremented by one. The preload state PL changes to "00 (PLWAT)". The unlock instruction is asserted during the execution of subpass 3 to set LCK of entry 2 to zero.

Figures 77, 78:
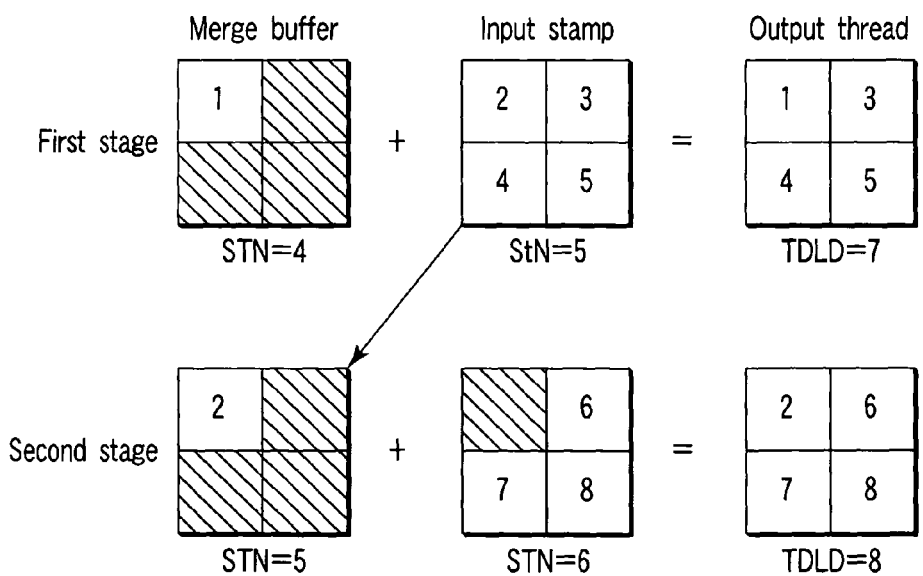
FIG. 77 is a conceptual drawing of the instruction management unit provided in the graphic processor in accordance with the first embodiment of the present invention.
FIG. 78 is a conceptual drawing showing a newly input stamp, a stamp in the merge buffer, and a thread in the graphic processor in accordance with the first embodiment of the present invention.

FIG. 77 shows how the instruction management unit operates after the execution of the yield instruction. As shown in the figure, SPID of entry 1 changes from 3 to 4, and SPTLCK is set to 1.

The above process is continued until all the threads execute the end instruction. Executing the end instruction and completing texture loading frees the corresponding entries in the thread holding unit 47.

In accordance with the above process, the drawing processing unit 36 executes a drawing process and also executes texture mapping as required (step S17). A texture read operation will be described below. When the drawing processing unit 36 issues the texture load instruction TLD, the texture unit 33 is requested to acquire texture. At this time, the instruction control unit 35 delivers the thread ID of the corresponding thread to the texture unit 33. Upon finishing this process, the texture unit 33 writes texture data acquired to the texture register, from which the drawing processing unit 36 can acquire the texture data. However, the acquisition cannot be executed until the subpass following the issuance of the texture load instruction.

Upon receiving the texture load instruction, the texture unit 33 acquires texture through a pipeline. Upon reaching the end of the pipeline, the process for the texture load instruction is finished, with the data stored in the texture register. Subsequently, the texture unit 33 returns the acknowledge signal to the instruction control unit 35. The number of texture load instructions depends on the pipeline of the texture unit 33 and is, for example, up to 63.

Every time the texture load instruction is issued, the instruction control unit 35 counts the number of texture load instructions issued. Every time the texture load instruction is finished, the instruction control unit 35 counts down the number. That is, the instruction control unit 35 performs a countdown operation every time it receives the acknowledge signal from the texture unit 33. Finishing all the texture load instructions (count=0) permits the next subpass for the same thread to be executed.

Stamp data drawn by the drawing processing unit 36 is stored in any of the local memories 28-0 to 28-3 to complete a drawing process.

As described above, the graphic processor in accordance with the first embodiment exerts effects (1) to (6) described below.

(1) Synchronization of an input signal is easy.

The graphic processor in accordance with the present embodiment provides a specific stamp number STN to received stamp data. Thus, upon receiving stamp data, the graphic processor stores its stamp number STN in an entry in the memory 54 of the reception unit 40. Each entry in the memory 54 has the flag SYNC as a synchronization bit, which is set (to "1") for the first stamp in the task. This enables the synchronization of a stamp and a task which correspond to each entry. That is, referencing SYNCs in the memory 54 makes it possible to easily determine to which task each stamp belongs. More specifically, a sequence from the entry for which SYNC is set to the entry preceding the next entry for which SYNC is set belongs to the same task. Accordingly, the entries following the one for which SYNC is set belong to a task different from the one to which the preceding entries belong.

Further, the second data can be easily synchronized with other data. The reception unit 40 receives the second data later than the other data by given cycles. The second data is thus held in an entry in the second holding unit 43 which has the same number as the stamp number STN. For example, the second data with STN=4 is held in entry 4 in the second data holding unit 43. This makes it possible to easily determine to which stamp the second data belongs. Referencing SYNCs in the memory 54 also makes it possible to determine to which task the second data belongs.

As described above, plural input signals can be easily synchronized with tasks, making it possible to improve the reliability of the graphic processor in terms of drawing.

(2) Drawing throughput can be reduced.

The graphic processor in accordance with the present embodiment references the quad valid signals for two stamps, and if any quad is invalid, merges these two stamps. This eliminates the process for the invalid quad to allow the execution of a drawing process to be limited to valid quads, enabling a reduction in throughput. This in turn reduces loads on the graphic processor to enable drawing speed to be increased.

(3) Drawing Efficiency can be increased (part 1).

In the graphic processor in accordance with the present embodiment, the overlap detection unit 45 comprises the XY table. The XY coordinate of a stamp held in the merge buffer 84 is compared with XY coordinate held in the XY table. If any XY coordinate in the XY table matches the XY coordinate of the stamp, the stamp is registered in the corresponding entry. Thus holding the XY table and managing the entry number as an XY tag allows a process for thread issuance to be simplified, enabling an increase in drawing efficiency.

Figure 79:
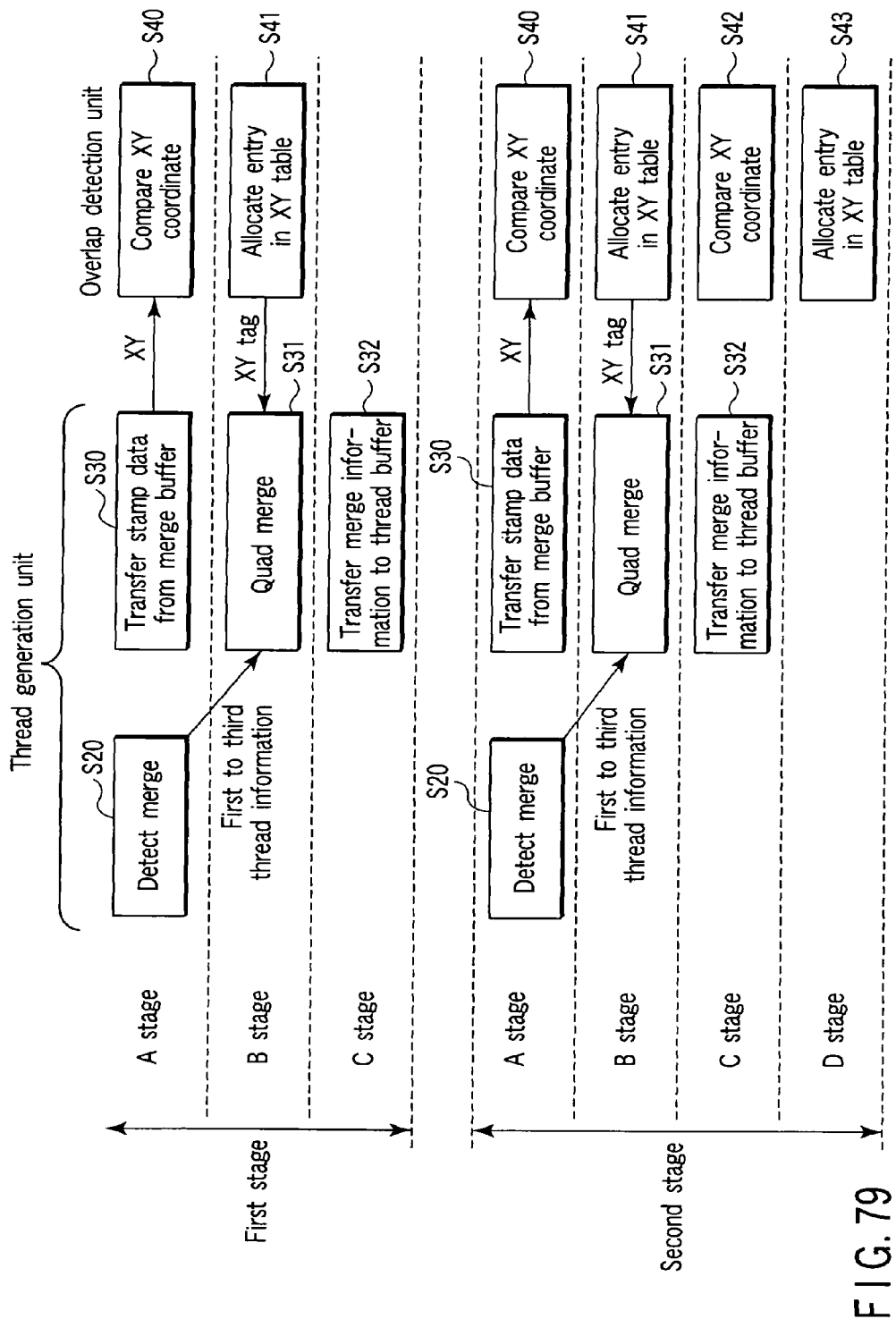
FIG. 79 is a flowchart of a process executed by the overlap detection unit 45 and thread generation unit of the graphic processor in accordance with the first embodiment of the present invention.

If two stamps are completely merged with no stamp remaining in the merge buffer 84, they are successively registered in the XY table. This will be described with reference to FIGS. 78 and 79. FIG. 78 is a conceptual drawing of a quad merge operation. FIG. 79 is a flowchart showing what processes the thread generation unit 46 and overlap detection unit 45 execute during the quad merge operation.

As shown in FIG. 78, in stage 1, with a stamp with the stamp number STN=4 held in the merge buffer, a stamp with the stamp number STN=5 is newly input. In this stage, in the stamp in the merge buffer, only quad 1 is valid, and in the newly input stamp, all quads 2 to 5 are valid. Accordingly, merging these stamps generates a thread (TDID=7) containing quads 1, 3, and 5. Quad 2 in the newly input stamp is left in the merge buffer.

In stage 2, with quad 2 in the stamp with STN=5 held in the merge buffer, a stamp with STN=6 is newly input. In this stage, in the newly input stamp, three quads 6 to 8 are valid. Accordingly, merging these stamps generates a thread (TDID=8) containing quads 2 and 6 to 8. In stage 2, the two stamps are completely merged, with no stamp remaining in the merge buffer.

Description will be given of what processes the thread generation unit 46 and overlap detection unit 45 execute in stages 1 and 2, described above. First, the first stage will be described. The first stage includes three processing stages, an A stage, a B stage, and a C stage. In the A stage, the thread generation unit 46 executes merge detection (step S20). This determines how to merge two stamps. The thread generation unit 46 further transfers data from the merge buffer to the overlap detection unit 45 (step S30). The overlap detection unit 45 compares XY coordinates (step S40).

In the B stage, the thread generation unit 46 performs a quad merge operation on the basis of the result of step S20 (step S31). The overlap detection unit 45 allocates the corresponding entry in the XY table and generates an XY tag on the basis of the result of step S40.

In the stage C, the thread generation unit 46 transfers information on the quad merge operation to the thread holding unit 47 (step S32). The process for the stage 1 is thus finished.

Now, a process for stage 2 will be described. Stage 2 includes not only the A to C stages but also the D stage. That is, in stage 2, steps S20, S31, S32, S40, and S41 are executed as is the case with stage 1. However, in stage 2, all the quads in the two stamps are merged. Consequently, the overlap detection unit 45 also compares XY coordinate for the newly input stamp in the C stage (step S42). In the D stage, the corresponding entry in the XY table is assigned to the newly input stamp.

As described above, if all the quads are merged, the drawing efficiency can be increased by successively registering hashes for the two stamps.

(4) Reliability of image drawing can be improved (part 1).

Figure 80:
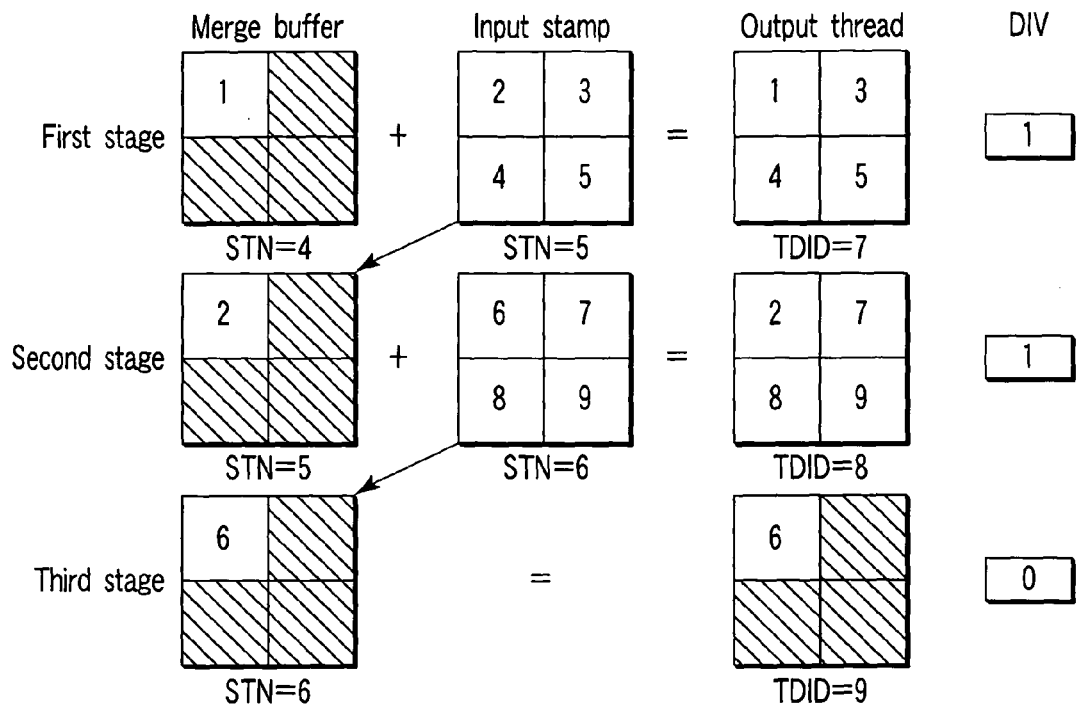
FIG. 80 is a conceptual drawing showing a newly input stamp, a stamp in the merge buffer, and a thread in the graphic processor in accordance with the first embodiment of the present invention.

In the graphic processor in accordance with the present embodiment, if some of the quads in the newly input stamp are held in the merge buffer, the thread generation unit 46 sets the flag DIV. This will be described with reference to FIG. 80. FIG. 80 is a conceptual drawing showing how a quad merge operation is performed.

As shown in FIG. 78, in stage 1, with a stamp with the stamp number STN=4 held in the merge buffer, a stamp with the stamp number STN=5 is newly input. In this stage, in the stamp in the merge buffer, only quad 1 is valid, and in the newly input stamp, all quads 2 to 5 are valid. Accordingly, merging these stamps generates a thread (TDID=7) containing quads 1, 3, and 5. Quad 2 in the newly input stamp is left in the merge buffer. The thread generation unit 46 thus sets DIV to "1".

In stage 2, with quad 2 in the stamp with STN=5 held in the merge buffer, a stamp with STN=6 is newly input. The stamp with STN=6 is the last in the task. In this stage, in the newly input stamp, quads 6 to 9 are all valid. Accordingly, merging these stamps generates a thread (TDID=8) containing quads 2 and 7 to 9. Quad 6 in the newly input stamp is left in the merge buffer. The thread generation unit 46 thus sets DIV to "1".

In the subsequent stage 3, no stamp is newly input, so that a thread is generated from quad 6, remaining in the merge buffer.

As described above, setting DIV to "1" makes it possible to easily determine whether or not any stamp remains in the merge buffer. Thus, even if the input stamp is the last, the stamp data remaining in the merge buffer can be formed into a new thread. This enables the reliability of the quad merge process to be improved.

(5) Drawing efficiency can be increased (part 2)

In the graphic processor in accordance with the present embodiment, the PLCNT register in the thread holding unit 47 functions as an age register after the issuance of the preload instruction. The age register enables the determination of order of threads for which the preload request has been issued. The threads are thus issued according to the order in the age register. The issuable threads are thus sequentially issued according to the order of preload instruction issuances. This prevents older threads from being stagnant, enabling an increase in drawing efficiency.

(6) Drawing efficiency can be increased (part 3)

In the graphic processor in accordance with the present embodiment, the instructions executed on each thread are separated into plural subpasses as described with reference to FIG. 47. The pixel shader unit then sequentially processes the executable threads during the respective subpasses regardless of the thread IDs, as shown in FIG. 48. Texture is loaded after the execution of each subpass, preventing the next subpass from being immediately executed on the thread. However, during this period, a subpass for another thread is executed, avoiding the waste of time. As a result, drawing efficiency can be increased.

To allow the threads to be issued during the respective subpasses as described above, the preload state has various states and the thread holding unit 47 includes the flags RUN and RDY. Each thread is issued only when the above conditions are met. The instruction management unit 48 controls the order of the threads so as to prevent a new thread from overtaking an older thread with the same XY coordinate. This enables the reliability of image drawing to be improved.

The instruction control unit 35 can further forcibly prohibit the issuance of a specified thread as required by setting the flag SPTLCK.

When the drawing processing unit 36 issues the texture load instruction, the instruction control unit 35 causes the texture unit 33 to start acquiring textures. Upon finishing acquiring the textures, the texture unit 33 returns the acknowledge signal to the instruction control unit 35. Issuing the texture load instruction causes the instruction control unit 35 delivers the thread ID of the corresponding thread to the texture unit 33. This enables the texture unit 33 to determine to which thread it return the acknowledge signal.

Now, description will be given of a graphic processor in accordance with a second embodiment of the present invention. The present embodiment relates to the control of the lock in the first embodiment. Accordingly, the configuration of the graphic processor is similar to that in the first embodiment and will not be described below. Only differences from the first embodiment will be described below.

Figure 81:
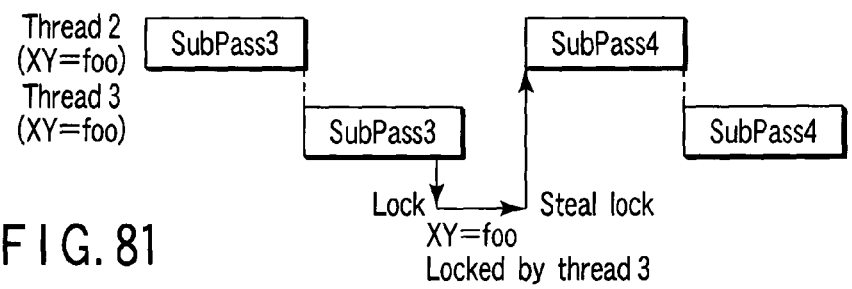
FIG. 81 is a timing chart showing how subpasses are executed by a graphic processor in accordance with a second embodiment of the present invention.

The instruction control unit 35 in the graphic processor in accordance with the first embodiment includes a function for forcibly invalidating the lock instruction. If plural threads are waiting for the same subpass to be executed and the older thread does not take a lock, all the threads waiting for the subpass to be executed have their locks invalidated. The invalidated locks are not recovered and the invalidation takes place regardless of the XY coordinate. This is shown in FIG. 81.

As shown in the figure, threads 2 and 3 with the same XY coordinate are waiting for a subpass to be executed. For both threads 2 and 3, the subpass ID of the next subpass to be executed is 3. In this state, if thread 3 has a lock, it is forcibly cleared.

The graphic processor in accordance with the present embodiment can exert not only the effects (1) to (6), described in the first embodiment, but also an effect (7) described below.

(7) Reliability of image drawing can be improved (part 2).

Figure 82:
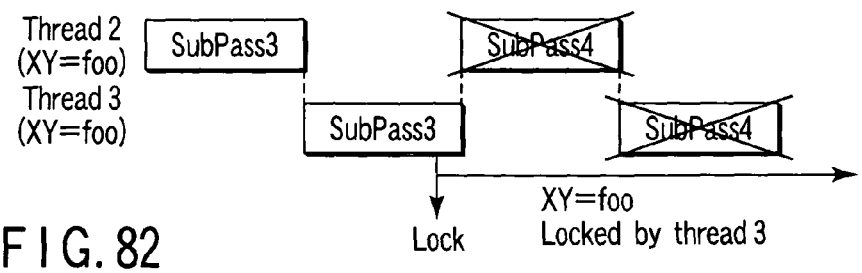
FIG. 82 is a timing chart showing how subpasses are executed by the graphic processor.

The graphic processor in accordance with the present embodiment includes the function for forcibly clearing a lock. This makes it possible to prevent a possible a "dead lock", enabling the reliability of the drawing process to be improved. This will be described with reference to FIG. 82. FIG. 82 shows a case under the same conditions as those in FIG. 81 except for the lack of the function for invalidating a lock.

If plural threads are waiting for the same subpass to be executed, the instruction control unit 35 makes only the older thread executable. This is to compensate for the order of issuance of the threads. However, in FIG. 82, the lock on thread 3 prevents thread 2 with the same XY coordinate from being executed. On the other hand, subpass 4 executed by thread 3 in this case overtakes subpass 4 for the older thread 2. Thus, subpass 4 for thread 3 cannot be executed either. In this state, no thread is executable (this state is called a "dead lock").

However, the present embodiment can clear the lock on thread 3 and thus prevent a possible dead lock.

The graphic processor according to the first and second embodiments are applicable to, e.g. game machines, home servers, TVs, mobile information terminals, etc. FIG. 83 is a block diagram of a digital board that is provided in a digital TV including the graphic processor according to the first or second embodiments. The digital board is employed to control communication information such as video/audio. As is shown in FIG. 83, the digital board 1000 comprises a front-end unit 1100, an image drawing processor system 1200, a digital input unit 1300, A/D converters 1400 and 1800, a ghost reduction unit 1500, a 3D YC separation unit 1600, a color decoder 1700, a LAN process LSI 1900, a LAN terminal 2000, a bridge media controller LSI 2100, a card slot 2200, a flash memory 2300, and a large-capacity memory (e.g. DRAM) 2400. The front-end unit 1100 includes digital tuner modules 1110 and 1120, an OFDM (Orthogonal Frequency Division Multiplex) demodulation unit 1130, and a QPSK (Quadrature Phase Shift Keying) demodulation unit 1140.

The image drawing processor system 1200 comprises a transmission/reception circuit 1210, an MPEG2 decoder 1220, a graphic engine 1230, a digital format converter 1240, and a processor 1250. For example, the graphic engine 1230 and processor 1250 correspond to the graphic processor which has been described in connection with the first or second embodiments.

In the above structure, terrestrial digital broadcasting waves, BS (Broadcast Satellite) digital broadcasting waves and 110-degree CS (Communications Satellite) digital broadcasting waves are demodulated by the front-end unit 1100. In addition, terrestrial analog broadcasting waves and DVD/VTR signals are decoded by the 3D YC separation unit 1600 and color decoder 1700. The demodulated/decoded signals are input to the image drawing processor system 1200 and are separated into video, audio and data by the transmission/reception circuit 1210. As regards the video, video information is input to the graphic engine 1230 via the MPEG2 decoder 1220. The graphic engine 1230 then renders an object by the method as described in the embodiments.

Figure 84:
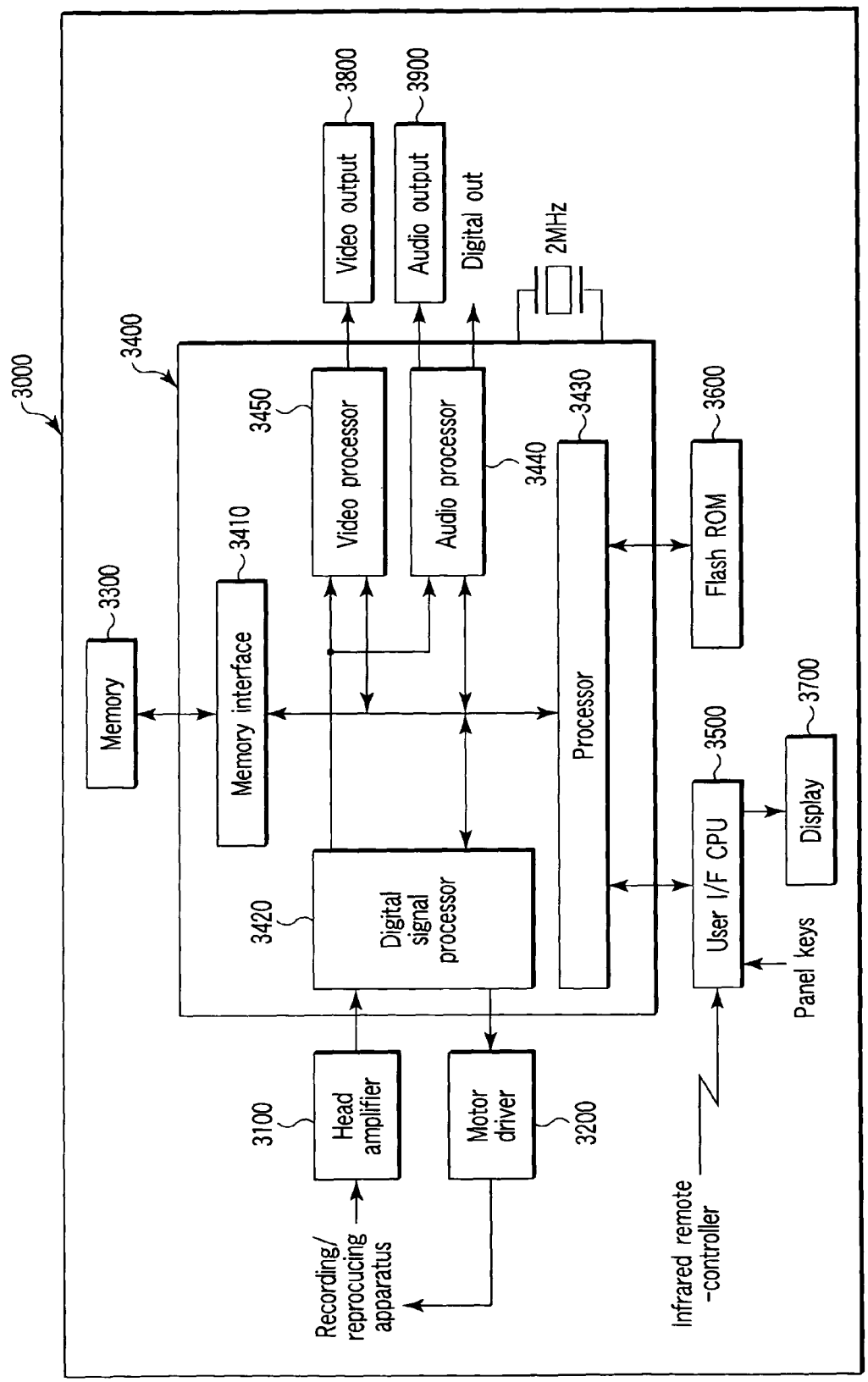
FIG. 84 is a block diagram of a recording and reproducing apparatus including the graphic processor in accordance with the first and second embodiments of the present invention.

FIG. 84 is a block diagram of a recording/reproducing apparatus that includes the graphic processor according to the first and second embodiments. As is shown in FIG. 84, a recording/reproducing apparatus 3000 comprises a head amplifier 3100, a motor driver 3200, a memory 3300, an image information control circuit 3400, a user I/F CPU 3500, a flash memory 3600, a display 3700, a video output unit 3800, and an audio output unit 3900.

The image information control circuit 3400 includes a memory interface 3410, a digital signal processor 3420, a processor 3430, a video processor 3450 and an audio processor 3440. For example, the video processor 3450 and digital signal processor 3420 correspond to the graphic processor which has been described in connection with the first and second embodiments.

With the above structure, video data that is read out of the head amplifier 3100 is input to the image information control circuit 3400. Then, graphic information is input from the digital signal processor 3420 to the video processor 3450. The video processor 3450 renders an object by the method as described in the embodiments of the invention.

In the above configuration, video data read by the head amplifier 3100 is input to the image information control circuit 3400. The digital signal processor 3420 then inputs graphic information to a video information processor. The video information processor 3450 draws graphics as described in the above embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drawing apparatus, comprising:
   a thread holding unit comprising a set of thread entries, each thread entry comprising an identifier of a first stamp, an identifier of a second stamp, lock information and XY coordinate information associated with the XY coordinates of the first stamp and the second stamp, wherein the first stamp and the second stamp each comprise a group of pixels;
   an instruction control unit that manages the execution of threads, wherein each thread is associated with a corresponding thread entry in the thread holding unit and a merge operation on the first stamp and the second stamp identified in the corresponding thread entry, each thread is divided into a set of subpasses for execution, and managing the execution of a thread comprises:
   issuing the thread, and
   updating the lock information of the thread entry corresponding to the issued thread, wherein issuing the thread comprises determining that no other thread entry has both the lock information set and XY coordinate information identical to the thread entry corresponding to the issued thread; and
   a drawing processing unit which executes a drawing process on the first stamp and the second stamp identified in the thread entry corresponding to the issued thread, wherein the drawing process comprises the execution of at least one of the set of subpasses associated with the issued thread.

2. The apparatus of claim 1, wherein the first stamp and the second stamp belong to a set of stamps, the set of stamps corresponding to a position occupied by a graphic to be drawn by the drawing apparatus.

3. The apparatus of claim 2, wherein the lock information is updated based on the execution of a lock instruction or a lock clear instruction associated with the at least one of the set of subpasses associated with the issued thread.

4. The apparatus of claim 2, wherein the set of subpasses comprises a last subpass, the last subpass is associated with an end instruction, each thread entry comprises an end field indicating the corresponding thread has reached an end instruction and the end field is set when the end instruction associated with the last subpass is executed.

5. The apparatus of claim 2, wherein each thread entry comprises a thread ID and the issued tread is the thread entry with the lowest thread ID.

6. The apparatus of claim 2, wherein if the thread holding unit comprises multiple thread entries the issued thread corresponds to the thread entry with the longest period of presence in the thread holding unit.

7. The apparatus of claim 2, further comprising an overlap detection unit comprising an XY table having a set of entries, each entry having an identifier associated with one of the set of stamps and XY coordinate information associated with the XY coordinates of the one of the set of stamps associated with the stamp identifier.

8. A method for implementing a drawing apparatus, comprising
   maintaining a thread holding unit comprising a set of thread entries, each thread entry comprising an identifier of a first stamp, an identifier of a second stamp, lock information and XY coordinate information associated with the XY coordinates of the first stamp and the second stamp, wherein the first stamp and the second stamp each comprise a group of pixels;
   managing the execution of threads, wherein each thread is associated with a corresponding thread entry in the thread holding unit and a merge operation on the first stamp and the second stamp identified in the corresponding thread entry, each thread is divided into a set of subpasses for execution, and managing the execution of a thread comprises:
   issuing the thread, and
   updating the lock information of the thread entry corresponding to the issued thread, wherein issuing the thread comprises determining that no other thread entry has both the lock information set and XY coordinate information identical to the thread entry corresponding to the issued thread; and
   executing a drawing process on the first stamp and the second stamp identified in the thread entry corresponding to the issued thread, wherein the drawing process comprises the execution of at least one of the set of subpasses associated with the issued thread.

9. The method of claim 8, wherein the first stamp and the second stamp belong to a set of stamps, the set of stamps corresponding to a position occupied by a graphic to be drawn by the drawing apparatus.

10. The method of claim 9, wherein the lock information is updated based on the execution of a lock instruction or a lock clear instruction associated with the at least one of the set of subpasses associated with the issued thread.

11. The method of claim 9, wherein the set of subpasses comprises a last subpass, the last subpass is associated with an end instruction, each thread entry comprises an end field indicating the corresponding thread has reached an end instruction and the end field is set when the end instruction associated with the last subpass is executed.

12. The method of claim 9, wherein each thread entry comprises a thread ID and the issued tread is the thread entry with the lowest thread ID.

13. The method of claim 9, wherein if the thread holding unit comprises multiple thread entries the issued thread corresponds to the thread entry with the longest period of presence in the thread holding unit.

14. The method of claim 9, further comprising maintaining an overlap detection unit comprising an XY table having a set of entries, each entry having an identifier associated with one of the set of stamps and XY coordinate information associated with the XY coordinates of the one of the set of stamps associated with the stamp identifier.

15. A non-transitory computer readable medium, comprising instructions for:
   maintaining a thread holding unit comprising a set of thread entries, each thread entry comprising an identifier of a first stamp, an identifier of a second stamp, lock information and XY coordinate information associated with the XY coordinates of the first stamp and the second stamp, wherein the first stamp and the second stamp each comprise a group of pixels;
   managing the execution of threads, wherein each thread is associated with a corresponding thread entry in the thread holding unit and a merge operation on the first stamp and the second stamp identified in the corresponding thread entry, each thread is divided into a set of subpasses for execution, and managing the execution of a thread comprises:
   issuing the thread, and
   updating the lock information of the thread entry corresponding to the issued thread, wherein issuing the thread comprises determining that no other thread entry has both the lock information set and XY coordinate information identical to the thread entry corresponding to the issued thread; and
   executing a drawing process on the first stamp and the second stamp identified in the thread entry corresponding to the issued thread, wherein the drawing process comprises the execution of at least one of the set of subpasses associated with the issued thread.

16. The computer readable medium of claim 15, wherein the first stamp and the second stamp belong to a set of stamps, the set of stamps corresponding to a position occupied by a graphic to be drawn by the drawing apparatus.

17. The computer readable medium of claim 16, wherein the lock information is updated based on the execution of a lock instruction or a lock clear instruction associated with the at least one of the set of subpasses associated with the issued thread.

18. The computer readable medium of claim 16, wherein the set of subpasses comprises a last subpass, the last subpass is associated with an end instruction, each thread entry comprises an end field indicating the corresponding thread has reached an end instruction and the end field is set when the end instruction associated with the iast subpass is executed.

19. The computer readable medium of claim 16, wherein each thread entry comprises a thread ID and the issued tread is the thread entry with the lowest thread ID.

20. The computer readable medium of claim 16, wherein if the thread holding unit comprises multiple thread entries the issued thread corresponds to the thread entry with the longest period of presence in the thread holding unit.

21. The A computer readable medium of claim 16, further comprising instructions for maintaining an overlap detection unit comprising an XY table having a set of entries, each entry having an identifier associated with one of the set of stamps and XY coordinate information associated with the XY coordinates of the one of the set of stamps associated with the stamp identifier.

* * * * *